(12) United States Patent
Ojima et al.

(10) Patent No.: US 7,978,261 B2
(45) Date of Patent: Jul. 12, 2011

(54) IMAGE PICKUP DEVICE, AUTOMATIC FOCUSING METHOD, AUTOMATIC EXPOSURE METHOD, ELECTRONIC FLASH CONTROL METHOD AND COMPUTER PROGRAM

(75) Inventors: Noriaki Ojima, Tokyo (JP); Kenji Shiraishi, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 276 days.

(21) Appl. No.: 11/745,686

(22) Filed: May 8, 2007

(65) Prior Publication Data
US 2007/0263933 A1    Nov. 15, 2007

Related U.S. Application Data

(62) Division of application No. 10/244,670, filed on Sep. 17, 2002, now Pat. No. 7,298,412.

(30) Foreign Application Priority Data

| Sep. 18, 2001 | (JP) | 2001-284162 |
| Sep. 18, 2001 | (JP) | 2001-284163 |
| Sep. 28, 2001 | (JP) | 2001-304342 |
| Sep. 28, 2001 | (JP) | 2001-304343 |
| Sep. 28, 2001 | (JP) | 2001-304638 |

(51) Int. Cl.
*H04N 5/222* (2006.01)
*G06K 9/00* (2006.01)

(52) U.S. Cl. ............ 348/371; 348/333.02; 382/118

(58) Field of Classification Search .......... 348/77, 348/78, 208.14, 216.1, 217.1, 370, 371; 382/117, 382/118; 396/155, 157, 158
See application file for complete search history.

(56) References Cited

U.S. PATENT DOCUMENTS

| 4,188,104 A | * | 2/1980 | Uchiyama et al. ............ 396/68 |
| 5,111,231 A | | 5/1992 | Tokunaga |
| 5,128,769 A | | 7/1992 | Arai et al. |
| 5,257,063 A | * | 10/1993 | Ishimaru et al. ............ 396/106 |
| 5,343,303 A | | 8/1994 | Delmas |
| 5,357,962 A | | 10/1994 | Green |
| 5,430,809 A | | 7/1995 | Tomitaka |
| 5,488,429 A | | 1/1996 | Kojima et al. |
| 5,550,580 A | | 8/1996 | Zhou |
| 5,629,752 A | | 5/1997 | Kinjo |

(Continued)

FOREIGN PATENT DOCUMENTS

EP    1 128 316    8/2001

(Continued)

OTHER PUBLICATIONS

Office Action issued Nov. 16, 2010, in Japanese Patent Application No. 2001-304343.

(Continued)

*Primary Examiner* — Sinh Tran
*Assistant Examiner* — Albert H Cutler
(74) *Attorney, Agent, or Firm* — Oblon, Spivak, McClelland, Maier & Neustadt, L.L.P.

(57) ABSTRACT

An image pickup device provided with an electronic flash function including an image pickup unit configured to input image data corresponding to a subject, a face detection unit configured to detect a human face from the image data input from the image pickup unit, an electronic flashing unit configured to emit electronic flash light, and an electronic flash control unit configured to control the electronic flashing unit based on the detection result of the human face by the face detection unit.

11 Claims, 36 Drawing Sheets

U.S. PATENT DOCUMENTS

| | | | |
|---|---|---|---|
| 5,781,650 A | 7/1998 | Lobo et al. |
| 5,835,616 A | 11/1998 | Lobo et al. |
| 6,249,317 B1 | 6/2001 | Hashimoto et al. |
| 6,292,575 B1 | 9/2001 | Bortolussi et al. |
| 6,388,707 B1 | 5/2002 | Suda |
| 6,396,540 B1 | 5/2002 | Ohkawara |
| 6,453,052 B1 | 9/2002 | Kurokawa et al. |
| 6,456,328 B1 | 9/2002 | Okada |
| 6,591,064 B2 | 7/2003 | Higashiyama et al. |
| 6,670,992 B2 | 12/2003 | Irie |
| 6,700,619 B1 * | 3/2004 | Hamamura | 348/370 |
| 6,727,948 B1 | 4/2004 | Silverbrook |
| 6,940,545 B1 * | 9/2005 | Ray et al. | 348/222.1 |
| 6,972,799 B1 | 12/2005 | Hashimoto |
| 6,989,731 B1 | 1/2006 | Kawai et al. |
| 7,038,715 B1 | 5/2006 | Flinchbaugh |
| 7,184,047 B1 | 2/2007 | Crampton |
| 7,298,412 B2 | 11/2007 | Sannoh et al. |
| 7,456,874 B1 | 11/2008 | Ono |
| 7,652,695 B2 | 1/2010 | Halpern |
| 2001/0014182 A1 | 8/2001 | Funayama et al. |
| 2002/0080257 A1 | 6/2002 | Blank |
| 2004/0042644 A1 | 3/2004 | Yuasa et al. |
| 2004/0170397 A1 | 9/2004 | Ono |
| 2005/0036688 A1 | 2/2005 | Froeba et al. |
| 2005/0063566 A1 | 3/2005 | Beek et al. |
| 2009/0167877 A1 | 7/2009 | Imamura |

FOREIGN PATENT DOCUMENTS

| | | |
|---|---|---|
| GB | 2 343 945 A | 5/2000 |
| JP | 6-6747 | 1/1994 |
| JP | 6/27537 | 2/1994 |
| JP | 7-38796 | 2/1995 |
| JP | 7/12980 | 3/1995 |
| JP | 07-128711 | 5/1995 |
| JP | 9-230489 | 9/1997 |
| JP | 10/334213 | 12/1998 |
| JP | 2000-36032 | 2/2000 |
| JP | 2000-194028 | 7/2000 |
| JP | 2000-259814 | 9/2000 |
| JP | 2000-347246 | 12/2000 |
| JP | 2000-347278 | 12/2000 |
| JP | 2001/51338 | 2/2001 |
| JP | 2001-067459 | 3/2001 |
| JP | 2001-167110 | 6/2001 |
| JP | 2001-197349 | 7/2001 |
| JP | 2001/215403 | 8/2001 |
| JP | 2001-215404 | 8/2001 |
| JP | 2001-218015 | 8/2001 |
| JP | 2001-229499 | 8/2001 |
| JP | 2002-269545 | 9/2002 |

OTHER PUBLICATIONS

Japanese Office Action dated Mar. 15, 2011 in Japanese Patent Application No. 2001-304343, 1 page.

* cited by examiner

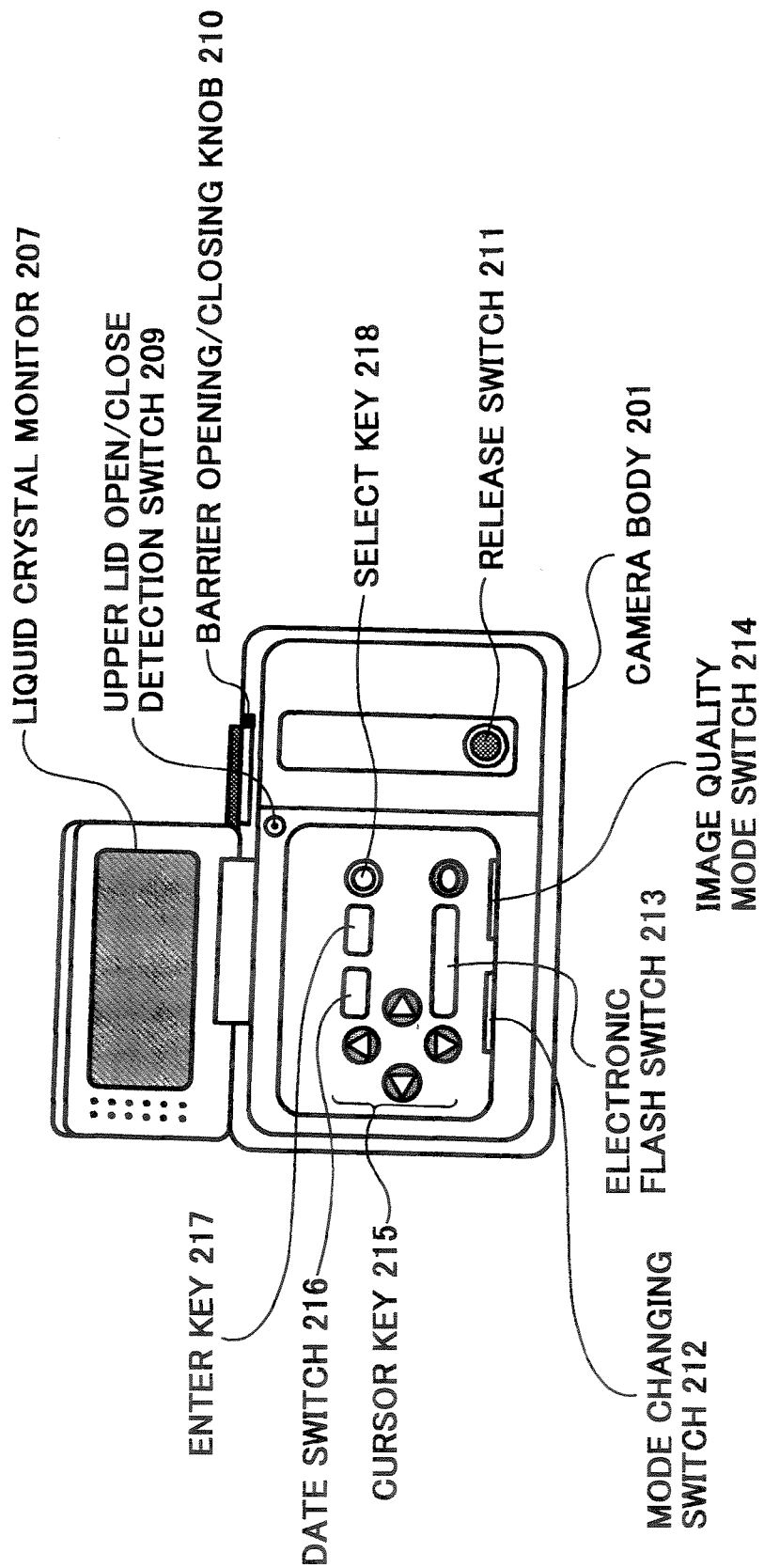

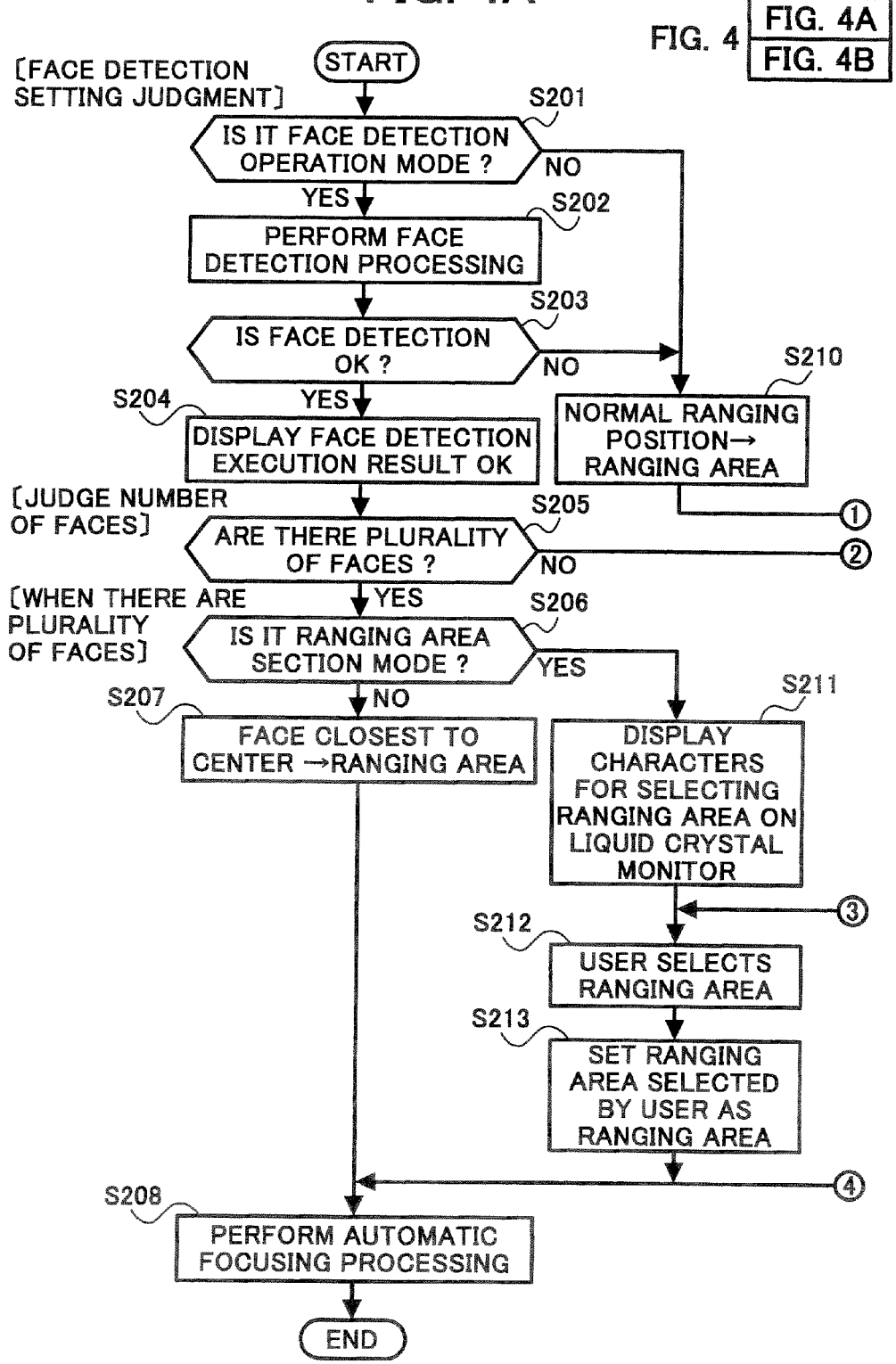

| Y1 | Y2 | Y2 | Y3 | Y4 | Y5 |
|----|----|----|----|----|----|
| Y6 | Y7 | Y8 | Y9 | Y10 | Y11 |
| Y12 | Y13 | Y14 | Y15 | Y16 | Y17 |
| Y18 | Y19 | Y20 | Y21 | Y22 | Y23 |
| Y24 | Y25 | Y26 | Y27 | Y28 | Y29 |
| Y30 | Y31 | Y32 | Y33 | Y34 | Y35 |

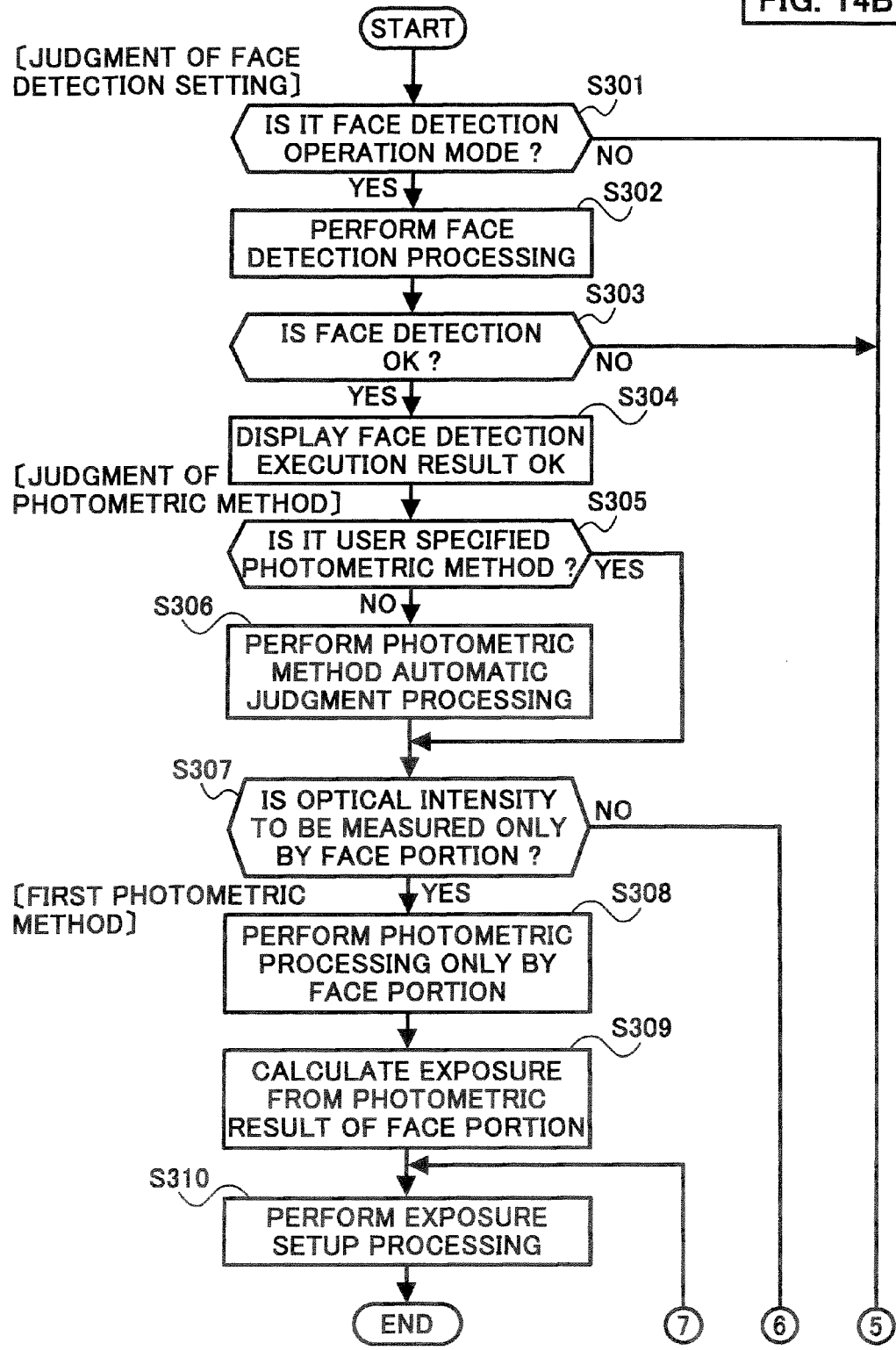

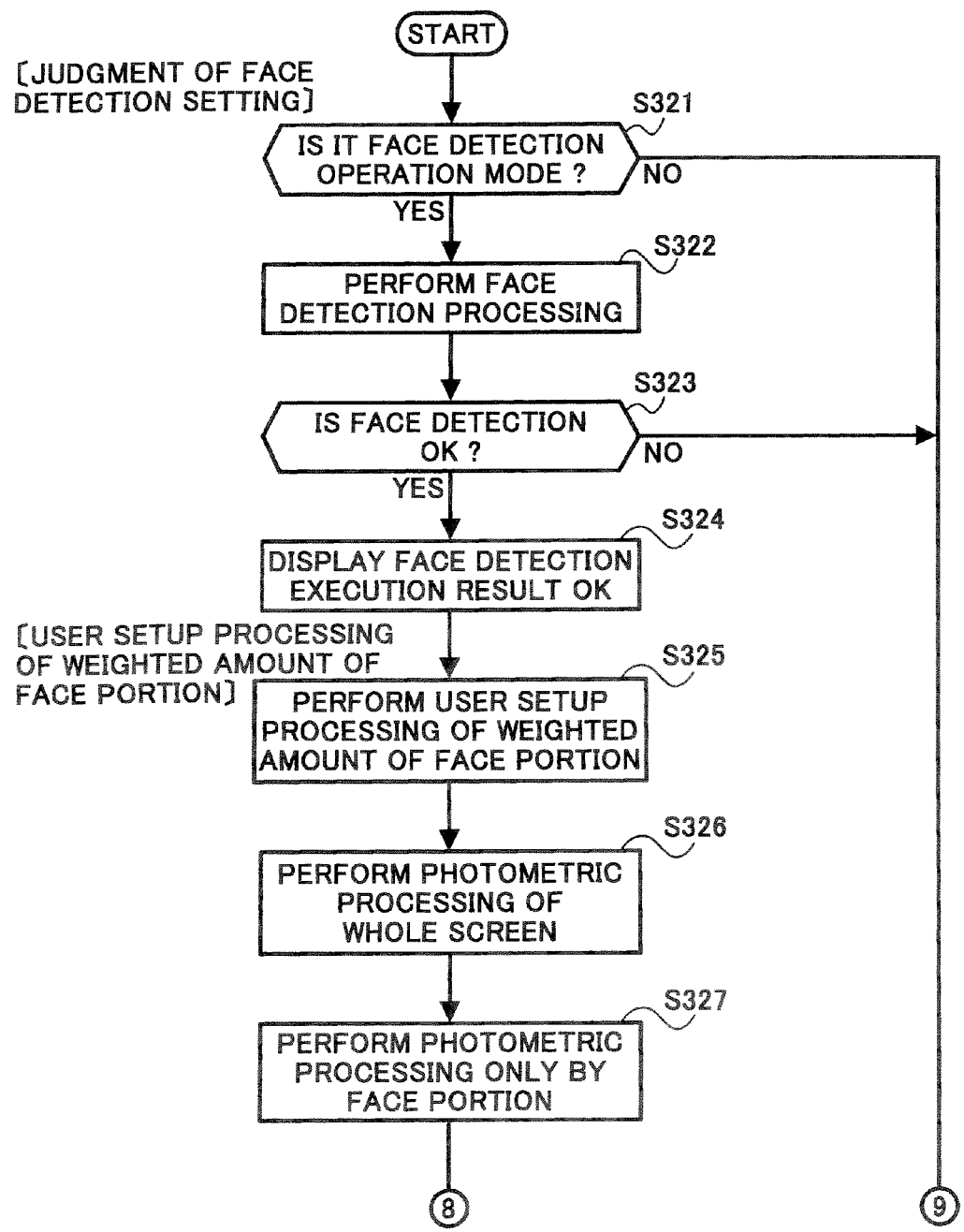

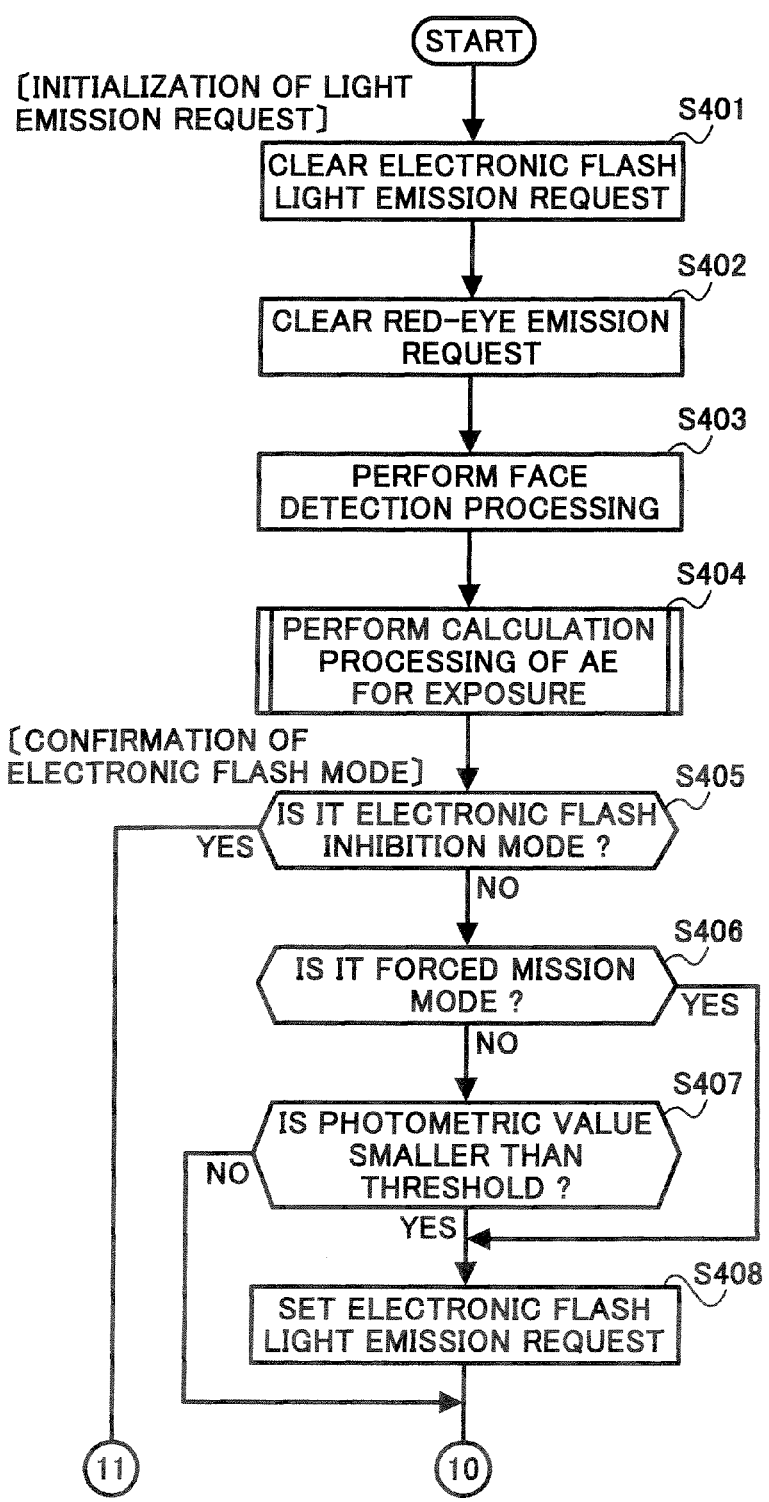

IMAGE PICKUP DEVICE, AUTOMATIC FOCUSING METHOD, AUTOMATIC EXPOSURE METHOD, ELECTRONIC FLASH CONTROL METHOD AND COMPUTER PROGRAM

CROSS-REFERENCE TO RELATED APPLICATIONS

This application is a division of U.S. application Ser. No. 10/244,670, filed Sep. 17, 2002, and is based upon and claims the benefit of priority from prior Japanese Patent Application Nos. 2001-284162 filed Sep. 18, 2001, 2001-284163 filed Sep. 18, 2001, 2001-304342 filed Sep. 28, 2001, 2001-304343 filed Sep. 28, 2001, and 2001-304638 filed Sep. 28, 2001 the entire contents of each of which are incorporated herein by reference.

BACKGROUND OF THE INVENTION

1) Field of the Invention

The present invention relates to an image pickup device, an automatic focusing method, an automatic exposure method, an electronic flash control method and a computer program, which have a face detection function for detecting a face of a subject.

2) Description of the Related Art

Recently, with a development of personal computers, use of digital cameras has become popular as image input devices thereof. Particularly, in many cases, photographers who do not have special techniques use digital cameras. Therefore, in many digital cameras, the shutter speed, exposure and focusing are automatically set, matched with a subject, in order to avoid a failure in taking a picture. In many cases, the subject for photographing is generally a human object. However, there has not been proposed a digital camera, which specially has a setting mode peculiar to human objects. It is a main object of the present invention to photograph a human object appropriately.

In order to always take a picture, which is in focus, while manually performing focus adjustment of the subject, the distance of which from the camera changes every moment, skilled camera work technique is required. Therefore, an automatic focusing function has been developed, so that even nonprofessionals can always photograph an image, which is in focus. In an image pickup device, which has a conventional automatic focusing function, it is common to perform automatic focusing, designating one or a plurality of areas in the center of a screen as a ranging area. In the above ranging method, however, when a human object is photographed, it is necessary to perform automatic focusing in a composition in which the human object and the ranging area are overlapped on each other, and after the focus is adjusted, to change the composition to a desired composition and photograph. Hence, there is a problem in that it takes time to photograph, with a human object being in focus.

As a technique for determining exposure with a conventional image pickup device such as a digital camera, there are used, (1) a multifractionated photometric method in which a photometric range in a screen is divided into a plurality of photometric areas, and exposure is determined from the photometric result of each photometric area, (2) a center-weighted photometric method in which optical intensity is measured by giving weight to the center of the screen, (3) a partial photometric method in which optical intensity is measured in only several tens % of the center of the screen, and (4) a spot photometric method in which optical intensity is measured in only several % of the center of the screen.

With the conventional photometric methods of (1) to (4), however, there is a problem in that a human object is not always exposed properly. More specifically, in the multifractionated photometric method (1), since the exposure is controlled so that the whole screen is exposed properly, there is a problem in that a human object in the screen may not be exposed properly. With the center-weighted photometric method (2), the partial photometric method (3) and the spot photometric method (4), a human object is exposed properly, only when the photometric area agrees with the position of the human object.

Further, when a color photograph is to be taken, using an electronic flash device, a so-called red-eye phenomenon may occur, in which human eyes appear red or gold. Such red-eye phenomenon occurs because flash of light of a light emitter of an electronic flashing device, which has passed through the pupil of the eye, is reflected by the retinal portion, and the reflected light is revealed in the film. More specifically, many capillary vessels exist in the retinal portion of the eye, and hemoglobin in the blood is red, and hence the reflected light thereof appears reddish. In order to prevent the red-eye phenomenon, there has been heretofore known a technique in which after light for preventing the red-eye phenomenon is emitted so as to reduce the size of the pupil of a human object, the main light emission is performed.

With a camera having a conventional electronic flash device, however, there are various problems described below. Firstly, there is such a problem that when a close-up of a face is to be shot, a place where the electronic flash light is strongly irradiated, such as forehead, reflects the electronic flash light, thereby causing blanking. Secondly, there is such a problem that since backlight judgment has been carried out by a difference between the brightness in the central portion of the screen and the ambient brightness, when a human object is not in the middle of the screen in the backlight situation, automatic electronic flashing for correcting the backlight is not performed, and it is necessary to switch to a forced emission mode in order to emit electronic flash light. Thirdly, there is such a problem that in order to prevent the red-eye phenomenon and blanking due to the electronic flash light, a user has to carry out red-eye mode switchover and a weak light emitting operation of the electronic flash.

In Japanese Patent Application Laid-Open No. 2001-51338, there is disclosed a camera in which the direction of the face of a subject can be recognized, and when the face turns to a predetermined direction, the subject recording operation can be performed. This camera has, a field image detection unit which detects image information of a field, a face recognition unit which recognizes the face of a subject, based on the image information from the field image detection unit, a judgment unit which judges whether the face is turning to a predetermined direction based on the information from the face recognition unit, and a control unit which allows to perform the subject recording operation according to the judgment result of the judgment unit.

However, with the image pickup device such as a digital camera, comprising a mode in which the shutter speed, exposure and focusing are automatically set depending on a subject, pushing of a release button to photograph the subject depends on the photographer's intention. Therefore, when a human object is to be photographed, even if the photographer recognizes the human object, the release timing may be shifted, thereby losing the photographing chance. In Japanese Patent Application Laid-Open No. 2001-51338, such a technique is used that the direction of the face is recognized, and when the face turns to a predetermined direction, the subject recording operation is performed. Therefore, if the human object moves or the camera is blurred, the face may not be photographed clearly.

In Japanese Patent Application Laid-Open No. H10-334213, there is disclosed a technique in which a face image of a target human object image is automatically recognized from color image data including the human object image, without being affected by the photographing background and illuminance, and an area corresponding to the size of the face image is cut out. According to this technique, the camera comprises, an image acquiring CPU which acquires a color image including a human object image, a color liquid crystal display section for displaying the acquired color image on a screen, a face recognition color memory which preliminarily stores a plurality of face recognition color data for recognizing a face image of the human object image from the color image, a recognition instructing section which instructs implementation of face image recognition processing, a face image recognizing CPU which compares color data in the entire color image area with the face recognition color data, in response to the instruction of implementation of the image recognition processing, to thereby recognize an area of color data which agrees with any of the face recognition color data as a face image, an area designator which designates an area to be cut out of the recognized face image, a frame forming CPU which forms a frame for the area corresponding to the size of the face image, in response to the designation of the cutout area, and a face image cutout CPU which cuts out the face image of an area enclosed by the frame.

However, when a photograph for certificate is taken, there has been heretofore such a problem that the face in the photographed image approaches left or right, or up or down, or inclines. When the face inclines, an operator has to specify the cutout position manually, watching the image, or specify the position of the face, thereby making the operation troublesome. Further, Japanese Patent Application Laid-Open No. H10-334213 is for automatically recognizing the face image of a target human object image from color image data including the human object image, without being affected by the photographing background and illuminance, and cutting out the area corresponding to the size of the face image. Hence, it is not taken into consideration to correct the balance of the size to be cut out or an inclination of the image.

SUMMARY OF THE INVENTION

It is a primary object of this invention to provide an image pickup device and an automatic focusing method, which can bring a human face in a screen into focus, regardless of the position and range of the human object in the screen, and photograph the human object without changing the composition between at the time of automatic focusing and at the time of photographing, and a program for a computer to execute the method.

And it is a second object of this invention to provide an image pickup device and an automatic exposure method, which can properly expose a human object, regardless of the position and range of the human object in the screen, and a program for a computer to execute the method.

And it is a third object of this invention to provide an image pickup device and an electronic flash control method, which can automatically judge whether a human object is to be photographed, without troubling the user, and can automatically emit light suitable for the human object photographing, and a program for a computer to execute the method.

And it is a fourth object of this invention to provide an image pickup device, in which a release button is automatically pushed by recognizing and judging a face image, thereby enabling recording only a clear image, and preventing photographing an unclear image, without losing a shutter chance.

And it is a fifth object of this invention to provide an image pickup device, in which a face image can be cut out, with the size and inclination being automatically corrected, by recognizing and judging the face image, and stored as another image file.

According to one aspect of the invention, there is provided an image pickup device provided with an automatic focusing function, comprising, an image pickup unit which inputs image data corresponding to a subject, a face detection unit which detects a human face from the image data input from the image pickup unit, and an automatic focusing control unit which performs automatic focusing control, designating at least a part of the human face detected by the face detection unit as a ranging area.

According to one aspect of the invention, there is provided an automatic focusing method comprising, an image input step of inputting image data corresponding to a subject, a face detection step of detecting a human face from the image data input at the image input step, and an automatic focusing control step of performing automatic focusing control, designating at least a part of the human face detected at the face detection step as a ranging area.

According to one aspect of the invention, there is provided a program for a computer to execute, an image input step of inputting image data corresponding to a subject, a face detection step of detecting a human face from the image data input at the image input step, and an automatic focusing control step of performing automatic focusing control, designating at least a part of the human face detected at the face detection step as a ranging area.

According to one aspect of the invention, there is provided an image pickup device provided with an automatic exposure function, comprising, an image pickup unit which inputs image data corresponding to a subject, a face detection unit which detects a human face from the image data input from the image pickup unit, a photometric unit which measures optical intensity, designating the human face detected by the face detection unit as a photometric area, and an exposure control unit which calculates the exposure based on the photometric result of the human face by the photometric unit, and performs exposure control based on the calculated exposure.

According to one aspect of the invention, there is provided an automatic exposure method comprising, an image input step of inputting image data corresponding to a subject, a face detection step of detecting a human face from the image data input at the image input step, a photometric step of measuring optical intensity, designating the human face detected at the face detection step as a photometric area, and an exposure control step of calculating the exposure based on the photometric result of the human face at the photometric step, and performs exposure control based on the calculated exposure.

According to one aspect of the invention, there is provided a program for a computer to execute, an image input step of inputting image data corresponding to a subject, a face detection step of detecting a human face from the image data input at the image input step, a photometric step of measuring optical intensity, designating the human face detected at the face detection step as a photometric area and an exposure control step of calculating the exposure based on the photometric result of the human face at the photometric step, and performing exposure control based on the calculated exposure.

According to one aspect of the invention, there is provided an image pickup device provided with an electronic flash function, comprising, an image pickup unit which inputs image data corresponding to a subject, a face detection unit which detects a human face from the image data input from the image pickup unit, an electronic flashing unit for emitting electronic flash light, and an electronic flash control unit which controls the electronic flashing unit based on the detection result of the human face by the face detection unit.

According to one aspect of the invention, there is provided an electronic flash control method comprising, an image input step of inputting image data corresponding to a subject, a face detection step of detecting a human face from the image data input by the image pickup unit and an electronic flash control step of controlling the electronic flashing unit for emitting the electronic flash light, based on the detection result of a human face at the face detection step.

According to one aspect of the invention, there is provided a program for a computer to execute, an image input step of inputting image data corresponding to a subject, a face detection step of detecting a human face from the image data input by the image pickup unit, and an electronic flash control step of controlling the electronic flashing unit for emitting the electronic flash light, based on the detection result of a human face at the face detection step.

According to one aspect of the invention, there is provided an image pickup device comprising, an image pickup unit which converts an optical image of a subject to image data and outputs this image data, a face image recognition unit which recognizes face image from the image data, and a face portion judgment unit which judges each portion in the face image recognized by the face image recognition unit, wherein when each portion in the face image can all be judged by the face portion judgment unit, a release button for executing photographing of the subject is automatically pressed, or the photographing operation is executed.

According to one aspect of the invention, there is provided an image pickup device comprising, an image pickup unit which converts a subject image to image data and outputs this image data, and a face image recognition unit which recognizes face image from the image data, wherein when the face image is recognized by the face image recognition unit, the face image portion is cut out and stored as a separate image file.

These and other objects, features and advantages of the present invention are specifically set forth in or will become apparent from the following detailed descriptions of the invention when read in conjunction with the accompanying drawings.

DETAILED DESCRIPTIONS

Preferred embodiments of a digital camera, which employs a image pickup device, an automatic focusing method, an automatic exposure method, an electronic flash control method and a program to be executed by a computer, will be explained in detail, in order of (a first embodiment), (a second embodiment), (a third embodiment), (a fourth embodiment) and (a fifth embodiment). The components, kinds, combinations, shapes and relative arrangements thereof described in each embodiment are not intended to limit the scope of the invention, and are only explanation examples, unless otherwise specified.

First Embodiment

A digital camera according to a first embodiment will be explained with reference to FIG. 1 to FIG. 9. In the first embodiment, a digital camera which can bring a human face in a screen into focus, regardless of the position and range of the human object in the screen, and photograph the human object without changing the composition between at the time of automatic focusing and at the time of photographing will be explained.

Figure 1B:
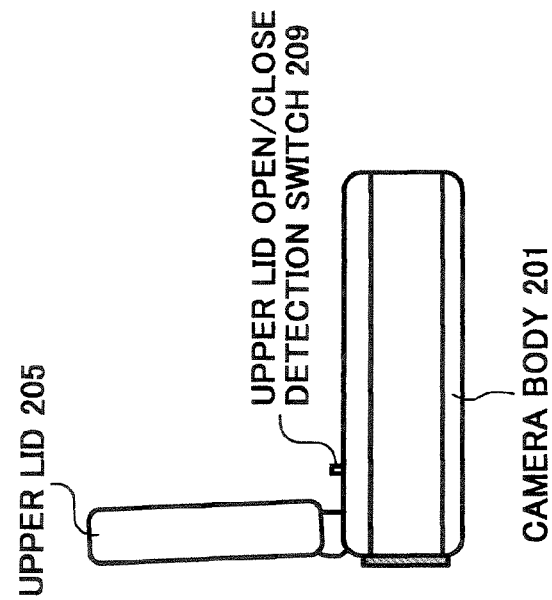
FIG. 1 is a block diagram which shows an appearance of a digital camera according to a first embodiment.
Figure 1A:
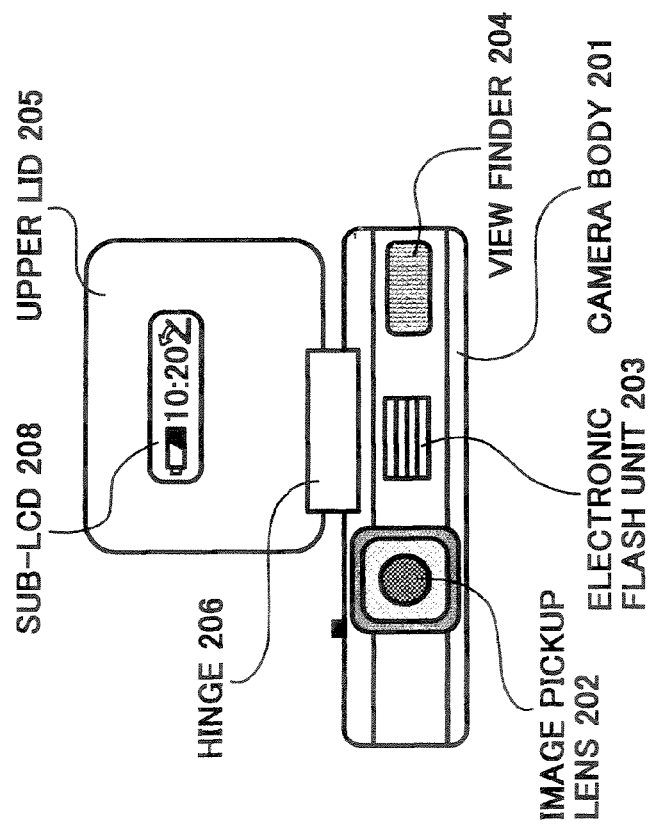

FIG. 1 is a block diagram which shows an appearance of a digital camera according to the first embodiment, in which FIG. 1A shows a front elevation, FIG. 1B shows a side view, and FIG. 1C shows a top view. FIG. 1 shows a state that an upper lid is opened. In this figure, reference number 201 denotes a camera body, 202 denotes an image pickup lens, 203 denotes an electronic flash unit, 204 denotes a viewfinder, 205 denotes the upper lid provided so as to be opened or closed, 206 denotes a hinge that supports the upper lid 205 so as to be opened or closed, 207 denotes a liquid crystal monitor provided inside of the upper lid 205, 208 denotes a sub-LCD provided outside of the upper lid 205, 209 denotes an upper lid open/close detection switch for detecting whether the upper lid 205 is opened or closed, 210 denotes a barrier opening/closing knob, 211 denotes a release switch for instructing operation such as photographing, 212 denotes a mode changing switch for selecting each mode, 213 denotes an electronic flash switch for performing electronic flashing, 214 denotes an image quality mode switch for setting photographing image quality, 215 denotes a cursor key, 216 denotes a DATE switch for inputting date, 217 denotes an ENTER key, and 218 denotes a SELECT key.

The mode changing switch 212 is for selecting, (1) a SETUP mode for changing or confirming the setting of the camera, (2) a still picture mode for recording a still picture, (3) a motion picture mode for recording a motion picture, (4) a reproduction mode for reproducing a recorded file, (5) a PC mode for sending a file to a personal computer or operating the camera from the personal computer, by connecting the camera to the personal computer, and (6) a communication mode for communicating via a network.

Figure 2:
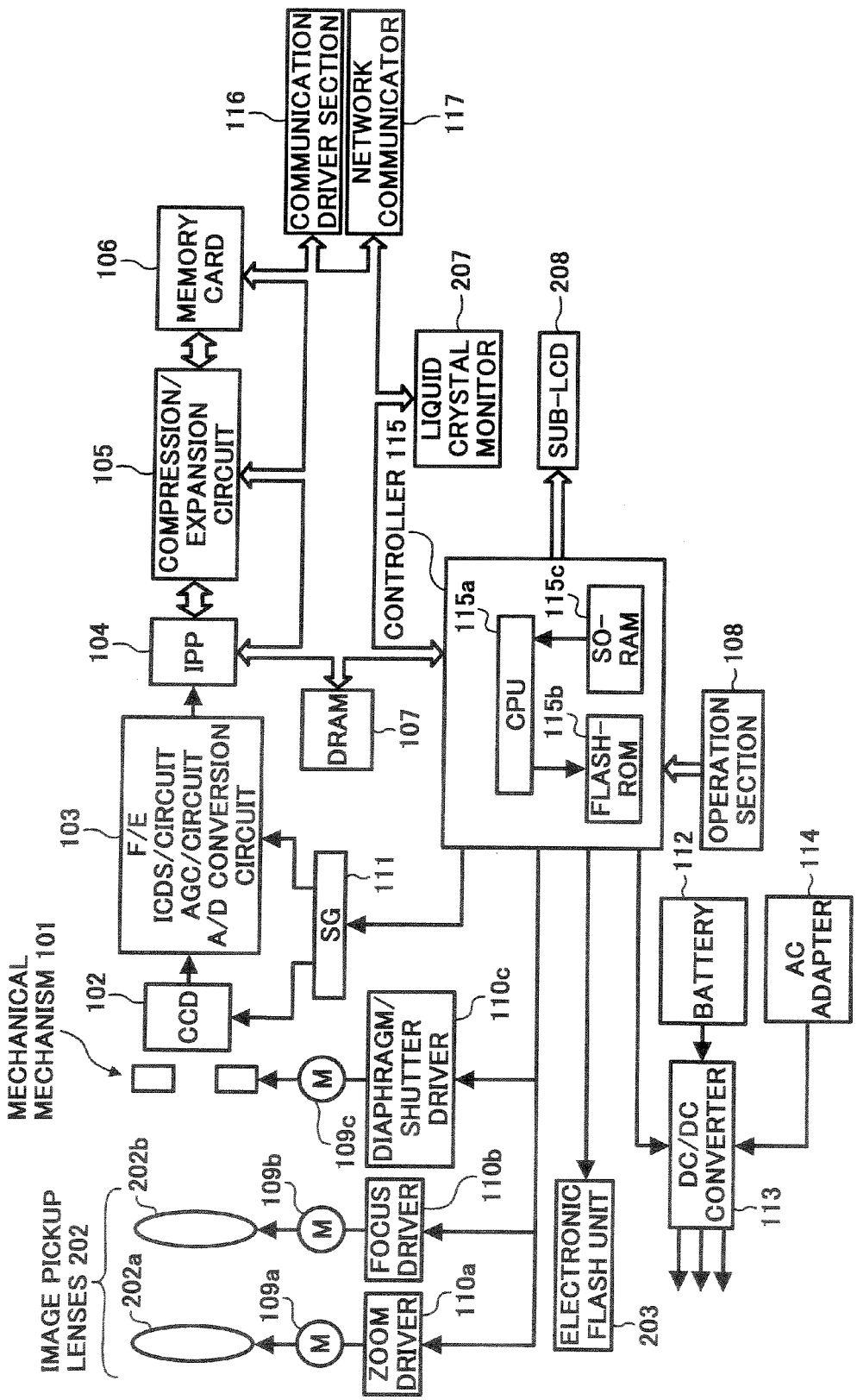
FIG. 2 is a block diagram which shows a configuration of the digital camera according to the first embodiment.

FIG. 2 is a block diagram which shows a configuration of the digital camera according to the first embodiment. The digital camera shown in this figure comprises, image pickup lenses 202 (zoom lens 202a, focus lens 202b), a mechanical mechanism (a mechanical shutter, a diaphragm, a filter, etc.) 101, a CCD 102, F/E (a CDS circuit, an AGC circuit and A/D conversion circuit) 103, an IPP 104, a compression/expansion circuit 105, a memory card 106, a DRAM 107, a liquid crystal monitor 207, a sub-LCD 208, an operation section 108, motors (a zoom lens motor 109a, a focus motor 109b, a diaphragm/shutter motor 109c) 109, drivers (a zoom driver 110a, a focus driver 110b, a diaphragm/shutter driver 110c) 110, an SG 111, a battery 112, a DC/DC converter 113, an AC adapter 114, a controller (CPU 115a, a FLASH_ROM 115b, an SD_RAM 115c) 115, a communication driver section 116, a network communicator 117 and an electronic flash unit 203.

The image pickup lens 202 is for forming an image of a subject, and comprises a zoom lens 202a for realizing a zoom function, and a focus lens 2b for bringing the subject into focus. The mechanical mechanism 101 comprises a mechanical shutter, a diaphragm for adjusting the brightness of the subject, a filter and the like. The CCD 102 converts the subject image formed by the image pickup lens 202 into an electric signal, and outputs the signal as analog image data to the F/E 103.

The F/E 103 is for performing preprocessing with respect to the analog image data input from the CCD 102, and comprises a CDS circuit for performing correlated double sampling of the analog image data input from the CCD 102, an AGC circuit for adjusting the gain of the analog image data output from the CDS circuit, and an A/D conversion circuit for performing A/D conversion with respect to the analog image data output from the AGC circuit and outputting the digital image data to the IPP 104.

The IPP 104 is for performing various image processing with respect to the input image data, and for example, after performing interpolation processing with respect to the color image data input from the F/E 103, it converts the color image data to YUV data (luminance Y data, color difference U and V data).

The compression/expansion circuit 105 performs compression processing with respect to the YUV data, with a compression method conforming to the JPEG method, or performs expansion processing with respect to the compressed image data stored in a memory card, with an expansion method conforming to the JPEG method.

The DRAM 107 is a frame memory which temporarily stores the picked up image data, the image data read from the memory card 106 and the like. The memory card 106 is provided detachably with respect to the digital camera body, and stores the compressed image data as an image file.

The liquid crystal monitor 207 is for displaying image data and the like. The sub-LCD 208 is for displaying modes and operation contents set in the digital camera.

The zoom driver 110a drives the zoom motor 109a, in response to a control signal input from the controller 115, to thereby shift the zoom lens 202a in the direction of optical axis. The focus driver 110b drives the focus motor 109b, in response to a control signal input from the controller 115, to thereby shift the focus lens 2b in the direction of optical axis. The diaphragm/shutter driver 110c drives the diaphragm/shutter motor 119c, in response to a control signal input from the controller 115, to thereby set a diaphragm stop of the diaphragm in the mechanical mechanism 101 and open or close the mechanical shutter in the mechanical mechanism 101.

The SG 111 drives the CCD 10 and the 2F/E 103, based on a control signal input from the controller 115. The battery 112 comprises, for example, a NiCd battery, a nickel hydrogen battery or a lithium battery, and supplies DC voltage to the DC/DC converter 113. The AC adapter 114 converts the AC voltage to the DC voltage and supplies the DC voltage to the DC/DC converter 113. The DC/DC converter 113 converts the DC voltage level input form the battery 112 and the AC adapter 114 to supply power to each section of the digital camera1.

The communication driver 116 is connected to an external equipment (for example, a personal computer) for performing data communication. The network communicator 117 is for performing data communication with the network.

The electronic flash unit 203 is a unit which emits electronic flash light, and emits light for preventing red-eye phenomenon or for main light emission, under control of the controller 115.

Figures 12, 13:
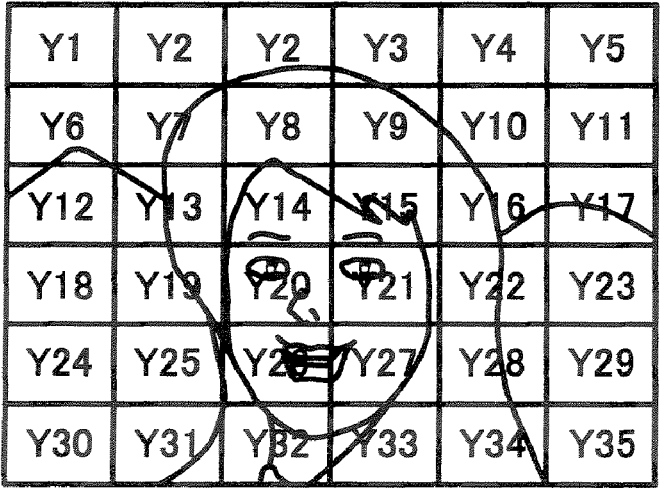
FIG. 12 is a diagram which explains the AE operation.
FIG. 13 is a diagram which explains the AE operation.

The operation section 108 comprises various keys and switches (a release switch 211, a mode changing switch 212, an electronic flash switch 213, an image quality mode switch 214, a cursor key 215, a DATE switch 216, an ENTER key 217 and a SELECT key 218), as shown in FIG. 13, for a user to give various instructions to the digital camera, and detects operation of various keys and switches and outputs it to the controller 115. The release switch 211 is a two-stage switch, such that a first SW is turned ON by half pushing (a first pushing stroke), and a second SW is turned ON by full pushing (a second pushing stroke). In the digital camera, when the first SW is turned ON, the AE operation and the AF operation are executed, and when the second SW is turned ON, the photographing operation is executed.

Figure 3:
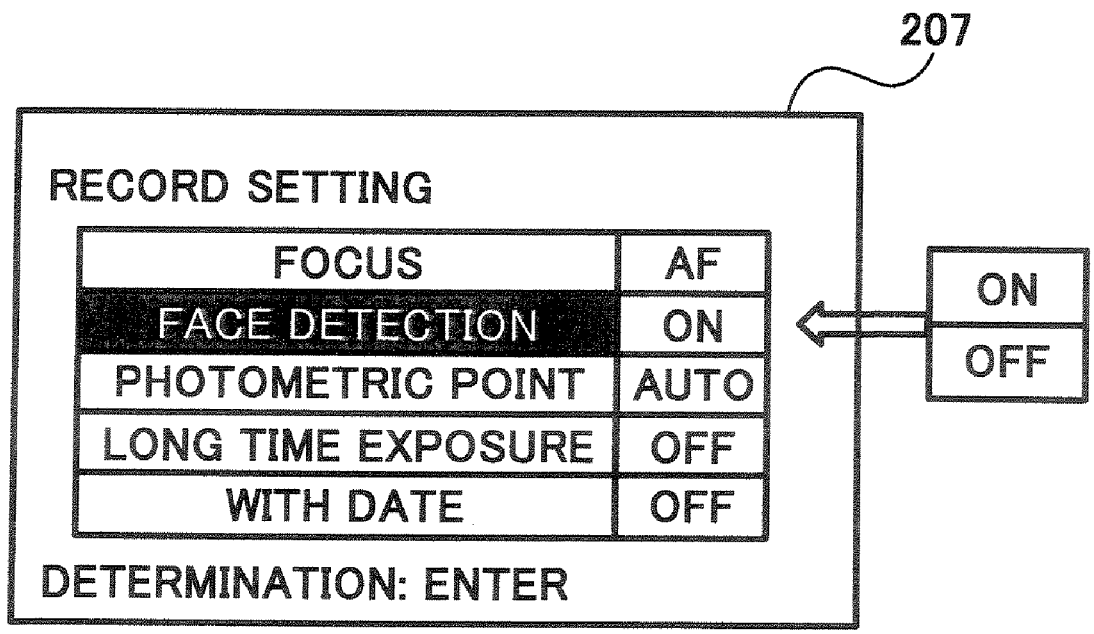
FIG. 3 is a diagram which shows a user setup screen for recording conditions displayed on a liquid crystal monitor, when a SETUP mode is selected by a mode changing switch in an operation section in the digital camera according to the first embodiment.

In FIG. 3, there is shown a user setup screen for recording conditions displayed on the liquid crystal monitor 207, when the SETUP mode is selected by the mode changing switch 212 in the operation section 108. The user setup screen for recording conditions shown in this figure is a screen for a user to set setting condition for each item ([AF/Manual] in "Focus", [ON/OFF] in "Face detection (face detection operation mode)", [Auto/manual] in "Photometric point", [ON/OFF] in "Long time exposure", and [ON/OFF] in "With date"). In the screen shown in this figure, a desired item is selected by the cursor key 215, a desired setting condition is selected by the SELECT key 218 in the selected item, and the selected setting condition is set by the ENTER key 217. In the example shown in this figure, the setting is made such that "Focus" is [AF], "Face detection (face detection operation mode)" is [ON], "Photometric point" is [Auto], "Long time exposure" is [OFF], and "With date" is [OFF].

The controller 115 is a unit which controls the overall operation of the digital camera, and comprises, the CPU 115a which controls the operation of each section in the digital camera, using the FLASH_RAM 115c as a work area, in accordance with a control program stored in the FLASH_ROM 115b, based on the instruction from the operation section 108, an SD_ROM 115b which stores various control programs executed by the CPU 115a, and parameters and data necessary for the control, and an SD_RAM 115c used as the work area of the CPU 115a. The control program, parameters and data stored in the FLASH_ROM 115b can be distributed through the network, and can be also stored by downloading these through the network. The program, parameters and data can be written in the FLASH_ROM 115b from an external equipment connected via the communication driver section 116.

The CPU 115a controls the monitoring operation, the AF operation, the AE operation, the photographing operation, the electronic flashing operation and the like. The outline of the basic operation of (1) monitoring operation, (2) AF operation and (3) still picture photographing operation, to be executed under control of the CPU 115a, will be explained below.

(1) Monitoring Operation

When the still picture mode or the motion picture mode is selected by the mode changing switch 212 in the operation section 108, the CPU 115a displays a monitored image of a subject on the liquid crystal monitor 207. Specifically, the image data of the subject input from the CCD 102 is processed by the F/E (CDS, AGC, A/D) 103, signal-processed by the IPP 104 and then written in the DRAM 107. The CPU 115a displays the monitored image corresponding to the image data stored in the DRAM 107 on the liquid crystal monitor 207. A user can determine the photographing composition, watching the monitored image of the subject displayed on this liquid crystal monitor 207.

(2) AF Operation

After the still picture mode or the motion picture mode has been selected by the mode changing switch 212 in the operation section 108, when the release switch 211 is half-pushed to turn on the SW 1, the CPU 115a executes the AF operation. Specifically, in the AF operation, when the face detection mode is set, the face detection processing is first executed to thereby detect a human face. More specifically, the image data input from the CCD 102 is processed in the F/E (CDS, AGC, A/D) 103, signal-processed by the IPP 104 and then written in the DRAM 107. The CPU 115a detects a human face from image data stored in the DRAM 107, by using the known face detection technique (Gabor Wavelet transform+ graph matching). The CPU 115a executes the automatic focusing processing, using a known automatic focusing method such as a mountaineering servo method, designating the detected human face as the ranging area (AF area), to shift the focus lens 202b to a focusing position, to thereby focus on the human face. In such automatic focusing processing, the focus lens 202b is moved, to sample an AF evaluation value indicating a contrast of the subject corresponding to the image data in the ranging area (AF area) of the image data input from the CCD 102, and designates the peak position of the AF evaluation value as the focusing position.

The CPU 115a executes the control program to thereby perform face detection by the software, but dedicated hardware for face detection may be provided.

(3) Still Picture Photographing Operation

When the still picture mode is selected by the mode changing switch 212 in the operation section 108, and the release switch in the operation section 108 is fully pushed to turn on the SW 2, the CPU 115a executes the still picture photographing operation. The imaged data taken in from the CCD 102 is signal-processed by the IPP 104, and subjected to the compression processing by the compression/expansion circuit 105, and then written in the DRAM 107. The CPU 115a then writes the compressed image data written in the DRAM 107 into the memory card 106 as a still picture file.

FIRST EXAMPLE

Figure 4B:
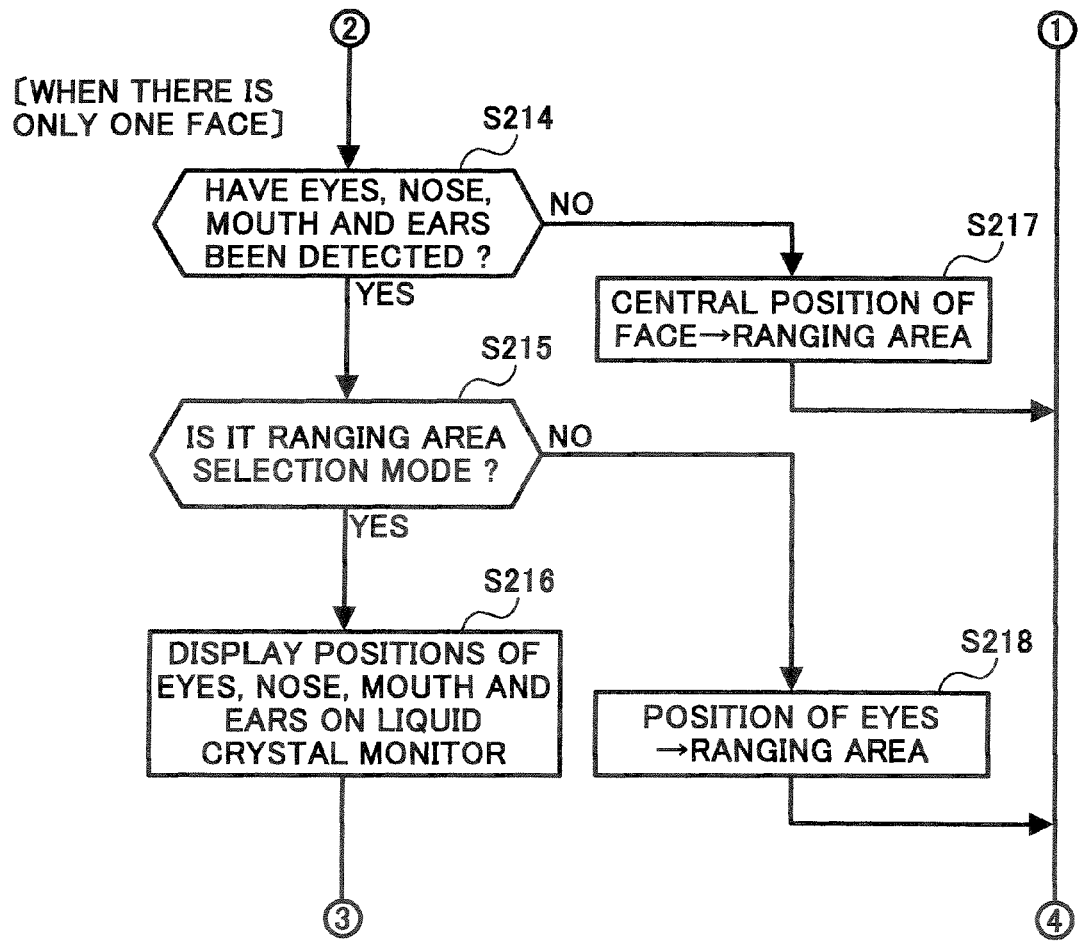
FIG. 4 is a flowchart which explains a first example of the AF operation.

FIG. 4 is a flowchart which explains a first example of the AF operation of the digital camera. FIG. 5 and FIG. 6 are diagrams which show display examples on the liquid crystal monitor 207. FIG. 5 shows a display example when the human face of the subject is one, and FIG. 6 shows a display example when the human face of the subject is plural (two). The AF operation of the digital camera will be explained in accordance with the flowchart in FIG. 4, with reference to the display examples on the liquid crystal monitor 207 shown in FIG. 5 and FIG. 6. The CPU 115a executes the AF processing, when the still picture mode or the motion picture mode is selected by the mode changing switch 212 in the operation section 108, and then the release switch 213 is half-pushed to turn on the SW 1.

In FIG. 4, the CPU 115a first judges whether the face detection operation mode is set, by which human face detection is to be executed (step S201). The face detection operation mode is set on the user setup screen for recording conditions (see FIG. 3). As a result of this judgment, when it is judged that the face detection operation mode has been set, the CPU 115a executes the face detection processing to detect a face (step S202).

Methods (1) to (3) shown below are known as the method of detecting a face in the subject image, and in a third embodiment, either one of these methods is used, (1) A method of forming a mosaic image of a color image, and extracting a face area by paying attention to the flesh-colored area, as shown in "Proposal of modified HSV color system effective in face area extraction", Television Society Magazine Vol. 49, No. 6, pp. 787-797 (1995), (2) A method of using geometrical shape characteristic relating to each portion which constitutes a head of front human object image, such as hair, eyes and the mouth, to extract a head area of the front human object image, as shown in "Method of extracting face area from still grayscale scene picture", Electronic Information Communication Society Magazine, Vol. 74-D-II, No. 11, pp. 1625-1627 (1991), and (3) A method of extracting a front human object image by using a profile edge of the human object image, which appears due to a delicate movement of the human object between the frames, in a case of a motion picture, as shown in "Face area detection for videophone and effect thereof", Image Laboratory 1991-11 (1991).

When the human face is detected, the CPU 115a detects the eyes, the nose, the mouth and the ears. Detection of the eyes, the nose, the mouth and the ears in the face can be performed, using a known method. For example, detection of eyes can be performed, using techniques disclosed in Japanese Patent Application Laid-Open No. H3-17696, Japanese Patent Application Laid-Open No. H4-255015, Japanese Patent Application Laid-Open No. H5-300601, Japanese Patent Application Laid-Open No. H9-21611 and Japanese Patent Application Laid-Open No. H9-251342.

Figure 5A:
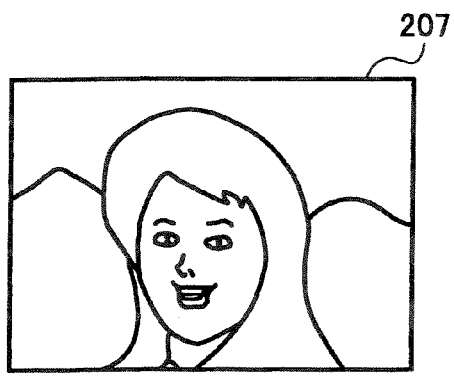
FIG. 5 is a diagram (1) which shows a display example on the liquid crystal monitor.
Figure 5B:
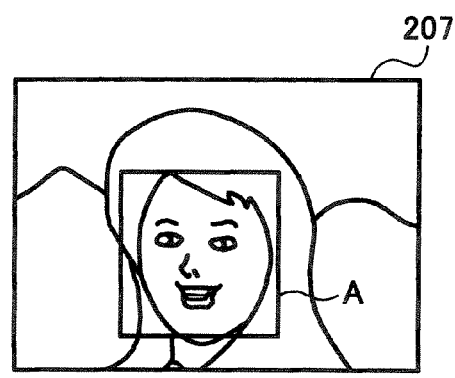
Figure 6A:
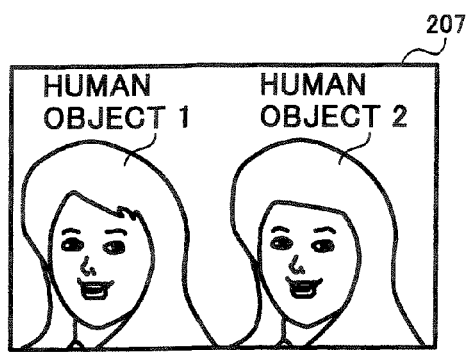
FIG. 6 is a diagram (2) which shows a display example on the liquid crystal monitor.
Figure 6B:
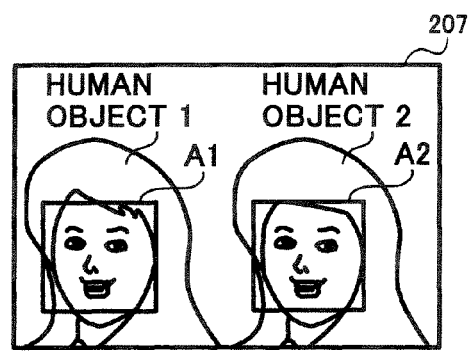

The CPU 115a then judges whether the face has been detected (step S203). As a result of this judgment, when the face has been detected, the CPU 115a displays a rectangular frame on the face portion of the human object (displays face detection execution result OK), in the image data displayed on the liquid crystal monitor 207, to thereby notify the user of the detection of the face (step S204). FIG. 5A shows a display example (when the human face is one) of the image data (monitored image) displayed on the liquid crystal monitor 207. FIG. 5B shows a display example, when a rectangular frame A is displayed on the human face portion in the image data in FIG. 5A. FIG. 6A shows a display example of the image data (monitored image) displayed on the liquid crystal monitor 207, when there is a plurality of (two) human faces. FIG. 6B shows a display example, when rectangular frames A1 and A2 are displayed on the human face portions in the image data in FIG. 6A.

The CPU 115a judges whether there is a plurality of faces (step S205) As a result of this judgment, when a plurality of faces are detected, the CPU 115a judges whether the ranging area selection mode has been set, by which a user selects the ranging area (step S206). The ranging area selection mode is set on the user setup screen for recording conditions (see FIG. 3) As a result of this judgment, when it is judged that the ranging area selection mode has not been set, the CPU 115a sets a face close to the center as the ranging area (step S207), and then executes the automatic focusing processing (step S208).

Figure 6C:
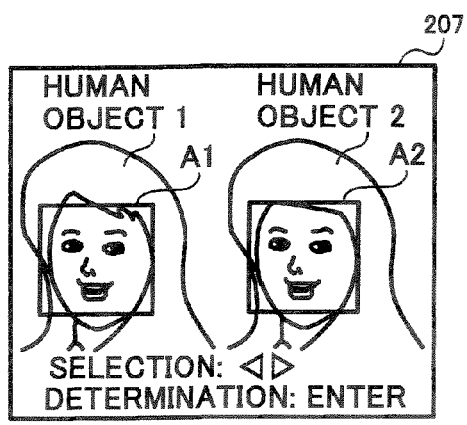

On the other hand, at step S206, when it is judged that the ranging area selection mode has been set, the CPU 115a displays characters or the like for the user to select the ranging area on the liquid crystal monitor 207 (step S211). FIG. 6C shows a display example in which characters or the like for the user to select the ranging area (guidance display for selecting the ranging area) on the screen in FIG. 6B.

Figure 6D:
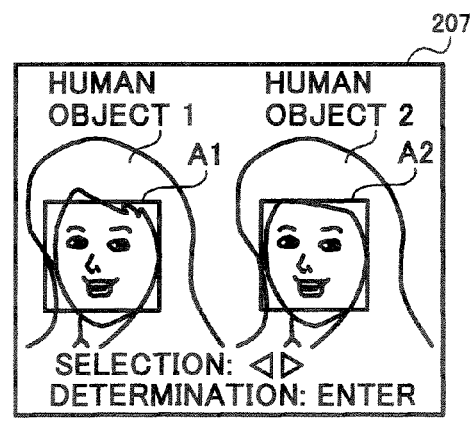

Subsequently, by the user operation of the operation section 108, a desired position is selected as the ranging area, among face-recognized positions displayed on the liquid crystal monitor 207 (step S212). In FIG. 6C, the user selects either one of the rectangular frames A1 and A2 by the operation of the cursor key 215, and the selected rectangular frame is determined as the ranging area by the ENTER key 217. FIG. 6D shows an example in which the rectangular frame A2 is selected as the ranging area in FIG. 6C.

After having set the inside of the selected rectangular frame as the ranging area (step S213), the CPU 115a executes the automatic focusing processing (step S208).

On the other hand, at step S205, if a plurality of faces are not detected, that is, only one face is detected, the CPU 115a judges whether eyes, nose, mouth and ears in the face are detected in the face (step S214). As a result of this judgment, when the eyes, nose, mouth and ears in the face cannot be detected, the CPU 115a sets the central position of the face as the ranging area (step S217), to perform the automatic focusing processing (step S208).

On the other hand, at step S214, when the eyes, nose, mouth and ears in the face cannot be detected, the CPU 115a judges whether the ranging area selection mode has been set, by which the user selects the ranging area (step S215) As a result of this judgment, when the CPU 115a judges that the ranging area selection mode has not been set, the CPU 115a sets the position of eyes as the ranging area (step S218), and executes the automatic focusing processing (step S208).

Figure 5C:
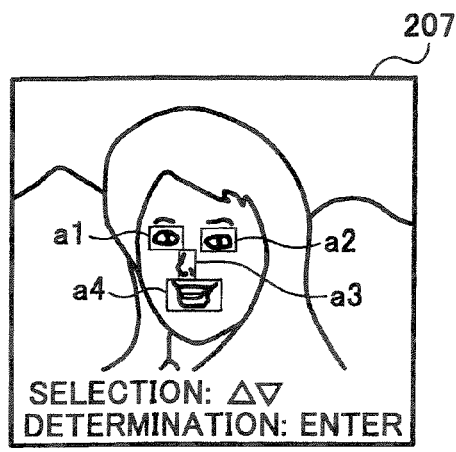

At step S215, when it is judged that the ranging area selection mode has been set, the CPU 115a displays a rectangular frame on the eyes, the nose, the mouth and the ears, respectively, on the liquid crystal monitor 207 (step S16). FIG. 5C is a diagram which shows a display example, when rectangular frames a1 to a4 are displayed respectively on the eyes, the nose and the mouth, in the image data of the subject in FIG. 5A.

Figure 5D:
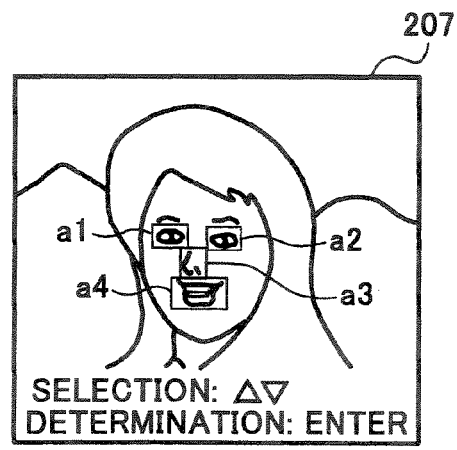

From the positions where the eyes, the nose, the mouth and the ears are recognized, which are displayed on the liquid crystal monitor 207, a desired position is selected as the ranging area by the user operation of the operation section 108 (step S212). In FIG. 5C, the user selects any one of the rectangular frames al to a4 by operating the cursor key 215, and determines a selected rectangular frame as the ranging area by the ENTER key 217. FIG. 5D shows an example in which a rectangular frame a3 has been selected as the ranging area in FIG. 5C.

After having set the face portion in the rectangular frame determined by the user (step S213) as the ranging area, the CPU 115a executes the automatic focusing processing (step S8).

On the other hand, at step S201, when it is judged that the face detection operation mode has not been set, or at step S203, when a face has not been detected, the CPU 115a sets the normal ranging area position as the ranging area (step S210), and then executes the automatic focusing processing (step S208). When the release switch 211 is fully pushed, photographing is carried out.

As described above, according to the first example, the CPU 115a detects a human face in the image data input by the CCD 102, and carries out the automatic focusing control, designating at least a part of the detected human face as the ranging area. Thereby, the CPU 115a executes the automatic focusing operation, designating the human face in the screen as the ranging area. Therefore, the human face can be brought into focus, regardless of the position of the human object in the screen. As a result, the human object can be photographed, without changing the composition between at the time of the automatic focusing operation and at the time of photographing.

According to the first example, when having detected a human face, the CPU 115a displays a rectangular frame (see FIG. 5) on the face in the image data displayed on the liquid crystal monitor 207. Therefore, the user is notified of the detection of the face, so that the user can recognize that the face has been detected.

According to the first example, when a plurality of faces are detected, the CPU 115a carries out automatic focusing control, designating a face close to the central portion as the ranging area. Thereby, the main subject can be brought into focus at a high probability. In an aggregate photograph, it is possible to increase the possibility that faces at the front, back, right, and left positions of the face in the center are also brought into focus at a high probability.

According to the first example, when a plurality of faces are detected, the user selects the ranging area from the faces (see FIG. 6), and the CPU 115a performs automatic focusing control based on the ranging area selected by the user. As a result, the user can select which human object is brought into focus.

According to the first example, the user can set permission/inhibition of the face detection operation (see FIG. 3). Therefore, the user can omit unnecessary face detection operation by setting permission or inhibition of the face detection operation, thereby enabling more prompt photographing.

According to the first example, when eyes of a human face are detected, and when the ranging area selection mode is not set, the CPU 115a carries out the automatic focusing control, designating the eyes as the ranging area. As a result, photographing can be performed by focusing on the eyes.

According to the first example, when any of the eyes, the mouth, the nose, and the ears of a human face is detected, and when the ranging area selection mode is set, the user selects the ranging area from the detected eyes, nose, mouth and ears, and the CPU 115a performs automatic focusing control based on the ranging area selected by the user. As a result, the user can focus the lens on a portion in the face on which the user wants to focus, and hence user's photographing intention can be reflected.

SECOND EXAMPLE

A second example of the AF operation will be explained, with reference to FIG. 7 to FIG. 9. In the second example of the AF operation, the size of the ranging area is changed depending on the size of the detected human face.

Figure 7:
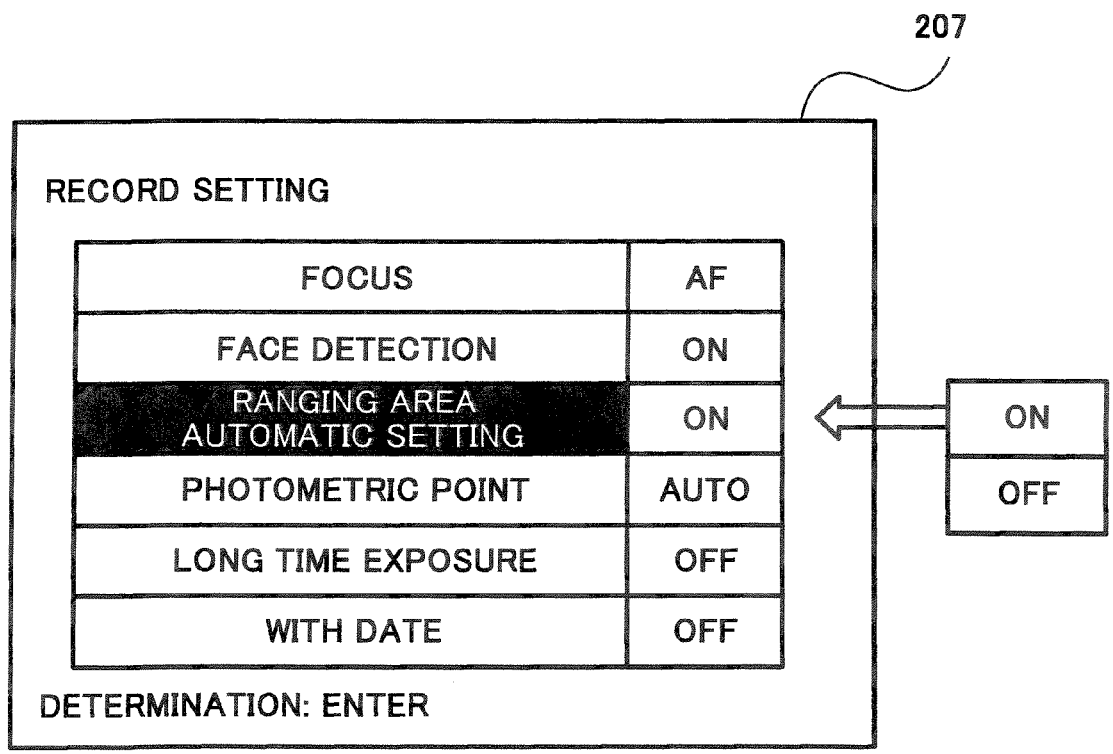
FIG. 7 is a diagram which shows a user setup screen for recording conditions displayed on a liquid crystal monitor, when a SETUP mode is selected by a mode changing switch in an operation section according to a second example.

FIG. 7 shows a user setup screen for recording conditions displayed on the liquid crystal monitor 207, when a SETUP mode is selected by the mode changing switch 12 in the operation section 108 in the second example. The user setup screen for recording conditions shown in this figure is a screen for a user to set setting condition for each item ([AF/Manual] in "Focus", [ON/OFF] in "Face detection (face detection operation mode)", [ON/OFF] in "Ranging area automatic setting (ranging area automatic setting mode)", [Auto/manual] in "Photometric point", [ON/OFF] in "Long time exposure", and [ON/OFF] in "With date"). In the screen shown in this figure, a desired item is selected by the cursor key 215, a desired setting condition is selected by the SELECT key 218 in the selected item, and the selected setting condition is set by the ENTER key 217. In the example shown in this figure, the setting is made such that "Focus" is [AF], "Face detection (face detection operation mode)" is [ON], "Ranging area automatic setting (ranging area automatic setting mode)" is [ON], "Photometric point" is [Auto], "Long time exposure" is [OFF], and "With date" is [OFF].

Figure 8:
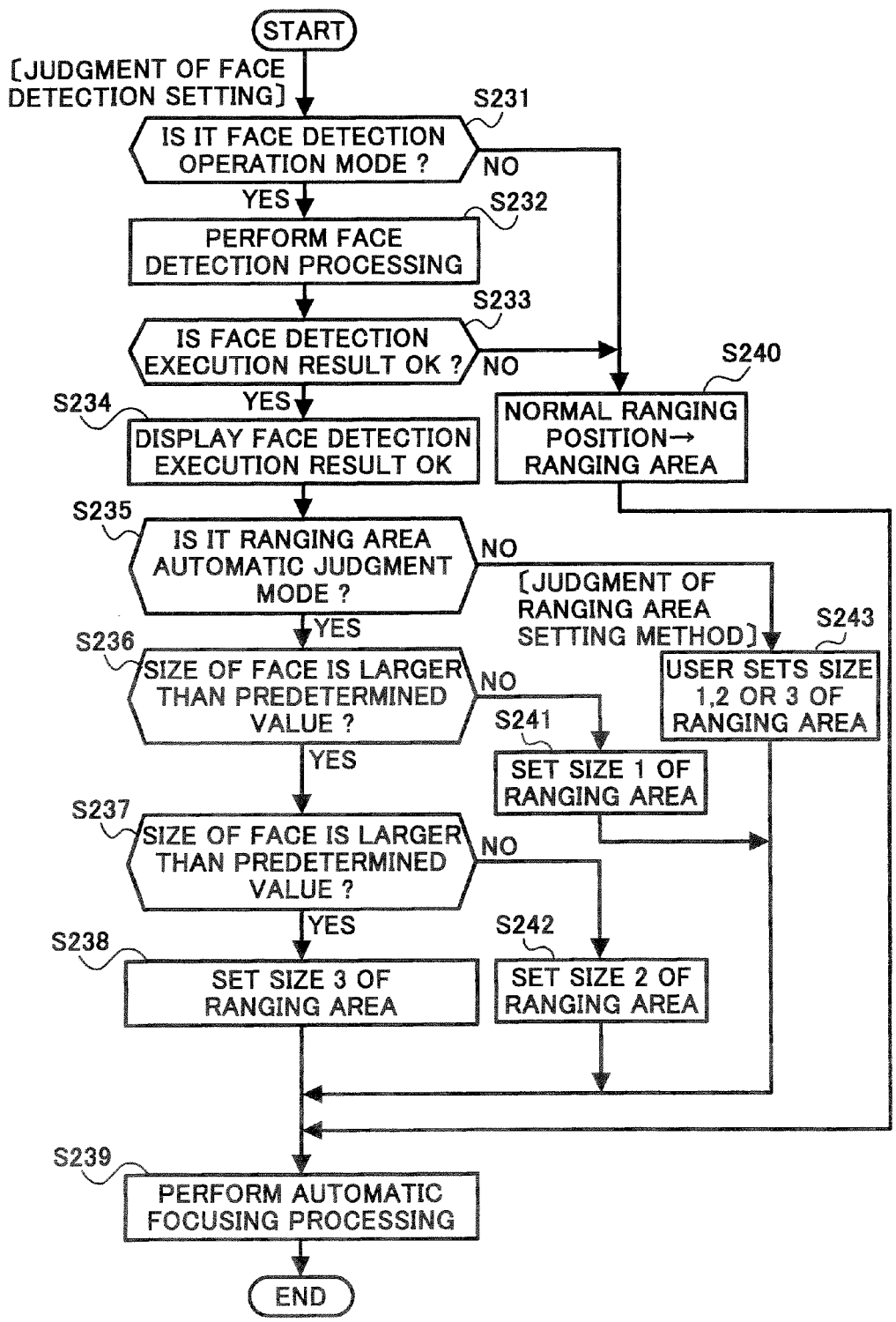
FIG. 8 is a flowchart which explains the second example of the AF operation.
Figure 9:
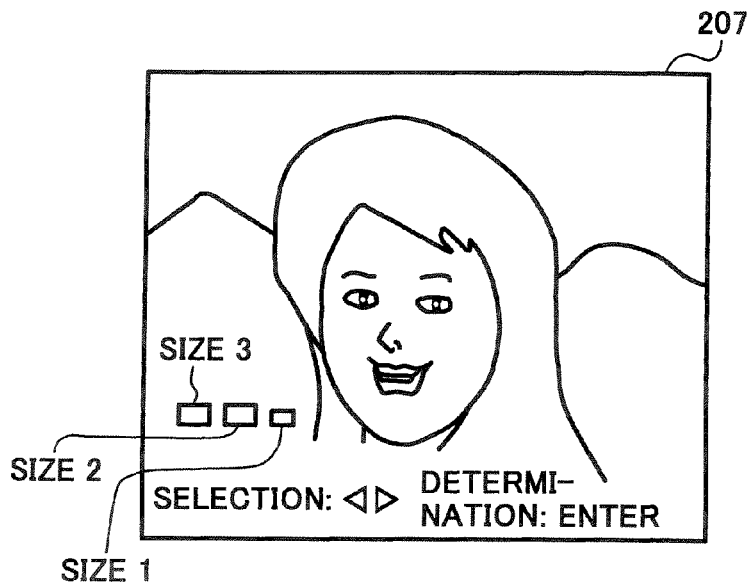
FIG. 9 is a diagram which shows a display example on the liquid crystal monitor.

FIG. 8 is a flowchart which explains the second example of the AF operation. FIG. 9 is a diagram which shows a display example on the liquid crystal monitor 207. The second example of the AF operation will be explained, with reference to the display example on the liquid crystal monitor 207 shown in FIG. 9, in accordance with the flowchart shown in FIG. 8. After the still picture mode or the motion picture mode has been selected by the mode changing switch 212 in the operation section 108, the CPU 115a executes the AF processing when the release switch 213 is half-pushed to turn on the SW 1.

In FIG. 8, the CPU 115a first judges whether the face detection operation mode in which face detection of a human object is executed, has been set (step S231). The face detection operation mode is set on the user setup screen for recording conditions (see FIG. 7). As a result of this judgment, when it is judged to be the face detection operation mode, the CPU 115a executes the similar face detection processing to that of the first embodiment (step S232).

The CPU 115a then judges whether the face has been detected (step S233). As a result of this judgment, when the face has been detected, the CPU 115a displays a rectangular frame on the face portion of the human object (displays face detection execution result OK), in the image data displayed on the liquid crystal monitor 207, to thereby notify the user of the detection of the face (step S234).

The CPU 115a judges whether the ranging area automatic setting mode has been set, in which the size of the ranging area is automatically set (step S235). The ranging area automatic setting mode is set on the user setup screen for the recording conditions (see FIG. 7). As a result of this judgment, when it is judged that the ranging area automatic setting mode has been set, the CPU 115a compares the size of the detected face and a predetermined value 1 (step S136), and when the face size is not larger than the predetermined value 1, the CPU 115a sets size 1 of the ranging area (step S241) On the other hand, if the face size is larger than the predetermined value 1, the CPU 115a compares the face size with a predetermined value 2 (however, predetermined value 2>predetermined value 1) (step S237), and when the face size is larger than the predetermined value 2, the CPU 115a sets size 3 of the ranging area (step S238). When the face size is not larger than the predetermined value 2, the CPU 115a sets size 2 of the ranging area (step S242).

On the other hand, at step S235, if the ranging area automatic setting mode has not been set, the user sets the size 1, 2 or 3 of the ranging area (step S243). FIG. 5A shows a display example of the image data (monitored image) displayed on the liquid crystal monitor 207. In FIG. 9, there is displayed a screen for a user to select the size of the ranging area, on the screen shown in FIG. 5A. In FIG. 9, there are displayed three sizes (size 1, size 2 and size 3) of ranging areas having different sizes, and the user operates the cursor key 215 to select one of size 1, size 2 and size 3, and determines the selected size as the size of the ranging area, by the ENTER key 217. In the example shown in FIG. 9, the size 2 of the ranging area has been selected.

After having set the ranging area of the size, automatically set or selected by the user, on the portion of the detected human face, the CPU 115a executes the automatic focusing processing (step S239).

On the other hand, when it is judged that the face detection operation mode has not been set at step S231, or when the face has not been detected at step S233, the CPU 115a sets the normal ranging area position as the ranging area (step S240), and then executes the automatic focusing processing (step S239).

As explained above, according to the second example, when the ranging area automatic judgment mode is set, the CPU 115a automatically sets the size of the ranging area based on the size of the detected human face, to perform automatic focusing control. As a result, the focusing accuracy can be improved.

Further, according to the second example, when the ranging area automatic judgment mode is not set, the user selects the size of the ranging area (see FIG. 9), the CPU 115a sets the ranging area of a size selected by the user, to perform automatic focusing control. As a result, the focusing accuracy can be improved, when a specific portion in the face is brought into focus.

The present invention is not limited to the first example and the second example, and various modification is possible within the range that does not change the essential point of the invention, and for example, modifications described below are possible.

FIRST MODIFICATION EXAMPLE

A human object photographing mode for taking a picture of a human object (first photographing mode) and a landscape photographing mode for taking a picture of landscape (second photographing mode) are provided in the digital camera of the present invention, such that the mode can be selected by, for example, the mode changing switch 212. When the human object photographing mode is selected, the CPU 115a performs automatic focusing control accompanied with the face detection processing (processing after "YES" at step S201 in FIG. 4). When the landscape photographing mode is selected, the CPU 115a does not perform the face detection processing, and may perform the automatic focusing control (processing after "NO" at step S201 in FIG. 4), based on the normal ranging area. This is because, in the human object photographing mode in which it is necessary to focus the lens on the face, the face detection processing is necessary, but in the landscape photographing mode in which it is not necessary to focus the lens on the face, the face detection processing is not necessary.

SECOND MODIFICATION EXAMPLE

Every time the CPU 115a performs the automatic focusing control, designating the face detected by the face detection processing as the ranging area, the CPU 115a stores the ranging result (focusing position) in the FLASH_ROM 115b, and the next focusing position may be predicted from the past ranging results stored in the FLASH_ROM 115b. Thereby, the next focusing position can be predicted from the past focusing positions to thereby focus the lens on the face quickly, thereby enabling prompt photographing.

Second Embodiment

A digital camera according to a second embodiment will be explained, with reference to FIG. 2 and FIG. 10 to FIG. 19. In the second embodiment, a digital camera that can properly expose a human object, regardless of the position and range of the human object in the screen will be explained. The visual configuration and the block configuration of the digital camera according to the second embodiment are the same as those in the first embodiment (FIG. 1 and FIG. 2), and hence explanation of the common parts is omitted, and only the different part will be explained.

Figure 10:
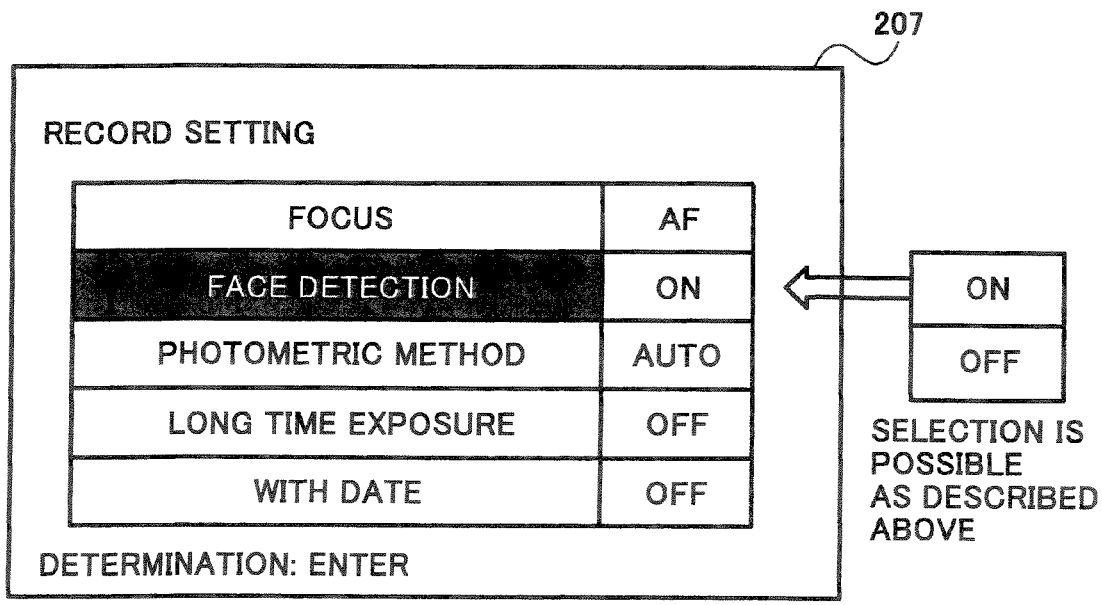
FIG. 10 is a diagram which shows a user setup screen for recording conditions displayed on a liquid crystal monitor, when a SETUP mode is selected by a mode changing switch in an operation section in the digital camera according to the second embodiment.
Figure 11:
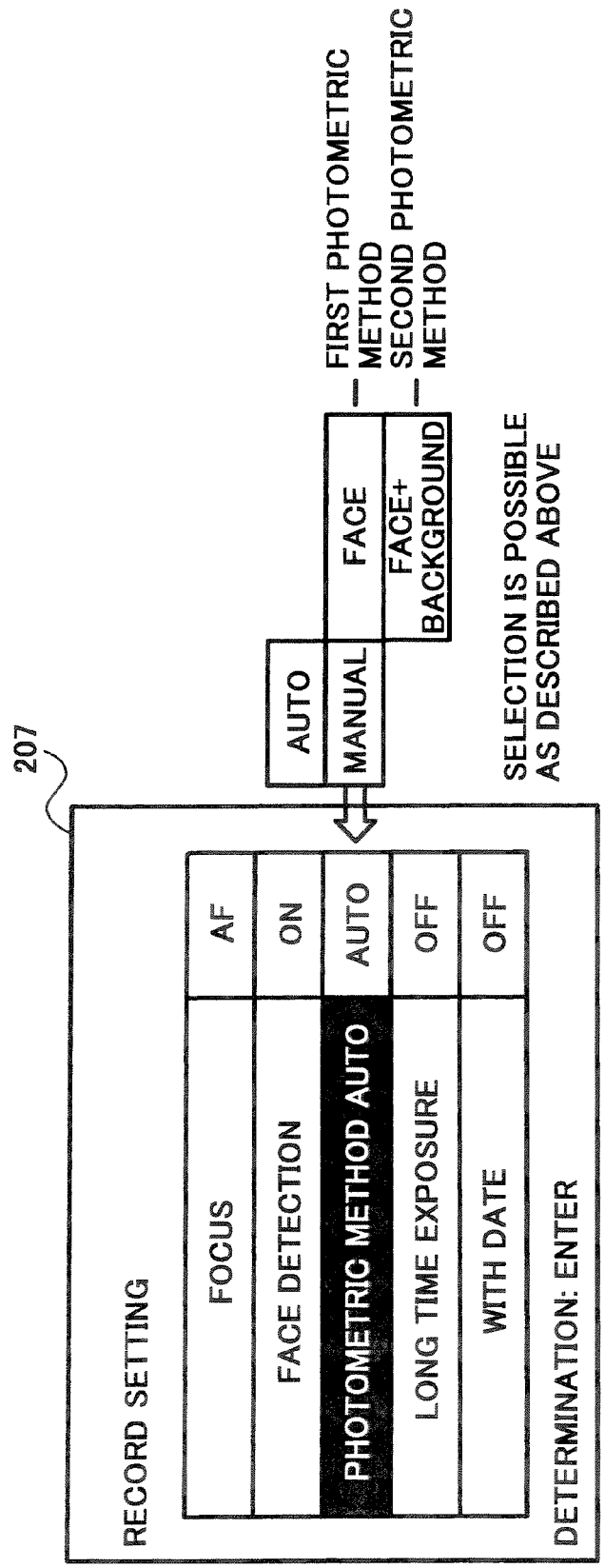
FIG. 11 is a diagram which shows a user setup screen for recording conditions displayed on the liquid crystal monitor, when the SETUP mode is selected by the mode changing switch in the operation section in a digital camera according to a second embodiment.

FIG. 10 and FIG. 11 show the user setup screen for recording conditions displayed on the liquid crystal monitor 207, when the SETUP mode is selected by the mode changing switch 212 in the operation section 108 in FIG. 2. The user setup screen for recording conditions shown in this figure is a screen for a user to set setting condition for each item ([AF/Manual] in "Focus", [ON/OFF] in "Face detection (face detection operation mode)", [Auto/manual (face (first photometric method)/face+background (second photometric method)] in "Photometric method", [ON/OFF] in "Long time exposure", and [ON/OFF] in "With date"). In the screen shown in this figure, a desired item is selected by the cursor key 215, a desired setting condition is selected by the SELECT key 218 in the selected item, and the selected setting condition is set by the ENTER key 217.

As described above, when the user selects [Auto] in the "photometric method", the CPU 115a selects either the first photometric method (face) or the second photometric method (face+background). On the other hand, when the user selects [Manual] in the "photometric method", the user then selects either [face (the first photometric method)] or [face+background (the second photometric method)]. In the example shown in FIG. 10 and FIG. 11, the setting is made such that "Focus" is [AF], "Face detection (face detection processing)" is [ON], "Photometric method" is [Auto], "Long time exposure" is [OFF], and "With date" is [OFF].

The CPU 115a in FIG. 2 controls the monitoring operation, the AF operation, the AE operation, the photographing operation, the electronic flashing operation and the like. The outline of the AE operation which is executed under control of the CPU 115a will be explained below. The monitoring operation and the photographing operation are the same as in the third embodiment.

[AE operation]

After the still picture mode or the motion picture mode has been selected by the mode changing switch 12 in the operation section 108, when the release switch 11 is half-pushed to turn on the SW 1, the CPU 115a executes the AE processing. Specifically, in the AE operation, when the face detection operation mode has been set (see FIG. 10 and FIG. 11), the CPU 115a first executes the face detection processing to detect a human face. Specifically, the image data input from the CCD 102 is processed by the F/E (CDS, AGC, A/D) 103 and input in the IPP 104. This image data is signal-processed by the IPP 104 and then written in the DRAM 107. The CPU 115a detects a human face from image data stored in the DRAM 107, by using the known face detection technique (Gabor Wavelet transform+graph matching). The CPU 115a calculates an AE evaluation value (photometric result), designating the detected human face as the photometric area (AE area), and calculates the exposure based on this AE evaluation value. Then the CPU 115a sets the exposure conditions (electronic shutter speed of the CCD 3, diaphragm stop of the diaphragm of the mechanical mechanism 101, gain of the AGC circuit in the F/E 103, and the like) corresponding to the exposure, to thereby perform exposure control.

The calculation method of the AE evaluation value will be specifically explained. FIG. 12 shows a division example when the screen of the CCD 102 (image frame) is divided into a plurality of areas Y1 to Y35. FIG. 13 is a diagram which shows one example of the image data of the subject in FIG. 12.

The IPP 104 calculates luminance data Y1 to Y35 for each area Y1 to Y35, whose optical intensity is to be measured, based on the image data (each pixel data (R, G, B)) input from the CCD 102. The calculation equation of the luminance data is shown below. In the calculation equation, Rn, Gn and Bn indicate a mean value of each pixel data (R, G, B) in each area, respectively.

Area 1 $Y1=0.299R1+0.587G1+0.114B1$

Area 2 $Y2=0.299R2+0.587G2+0.114B2$

Area $n$ $Yn=0.299Rn+0.587Gn+0.114Bn$

When the face detection operation mode has been set, and when the photometric processing is to be performed using only the face (first photometric method), the luminance data of the area including the face is respectively calculated, and a mean value of the luminance data of the calculated area is designated as luminance data Yy (AE evaluation value). In the example shown in FIG. 13, a mean value of the luminance data of areas Y14, Y20, Y21, Y26 and Y27 is designated as luminance data Yy (AE evaluation value).

When the face detection operation mode has been set, and when the photometric processing is to be performed using the face and the whole screen, the luminance data of the area including the face is respectively calculated, and a mean value of the luminance data of the calculated area is designated as luminance data Yface. The luminance data of areas Y1 to Y25 on the whole screen is respectively calculated, and a mean value of the luminance data of the calculated whole area is designated as luminance data Yall. The luminance data Yy (AE evaluation value)=Yface×n1+luminance data Yall×n2 is then calculated, designating weighting to the face portion as n1 and weighting to the whole screen as n2 (provided that, n1>n2, n1+n2=1).

At the time of normal photometric processing, any one of the following methods is used to calculate the luminance data Yy (AE evaluation value), (1) center-weighted photometric method (a method of determining luminance data by placing emphasis on the brightness in the center and adding the ambient brightness), (2) partial photometric method (a method of determining luminance data only by a mean value of luminance data only within an area in the screen), (3) spot photometric method (having the same idea as the partial photometric method, but the photometric area is as small as about 1 to 2%), and (4) divided photometric method (a method of dividing a screen into a plurality of areas, to obtain a mean value of luminance for each area, and determining luminance data from the distribution pattern of the luminance).

When the value of target luminance data Yx stored in the FLASH_ROM 115b in advance agrees with the value of luminance data Yy of the subject, being a result of measuring optical intensity of the subject, the CPU 115a judges it to be a proper exposure (brightness), calculates the exposure so that the luminance data Yy of the subject becomes the target luminance data Yx, and sets the exposure conditions (shutter speed of the CCD 102, diaphragm stop (opening degree) of the diaphragm of the mechanical mechanism 101, sensitivity of the CCD 102 (gain of an amplifier circuit in the F/E 103)) based on the calculated exposure.

Specifically, the CPU 115a carries out any one (or may be two or more) of "slowing down the shutter speed of the CCD 102", "increasing the size of the diaphragm", and "increasing the sensitivity of the CCD 102", in order to increase the value of the luminance data Yy, and carries out the opposite processing in order to decrease the value of the luminance data Yy.

The CPU 115a executes the control program to carry out face detection, but hardware dedicated for face detection may be provided.

FIRST EXAMPLE

Figure 14B:
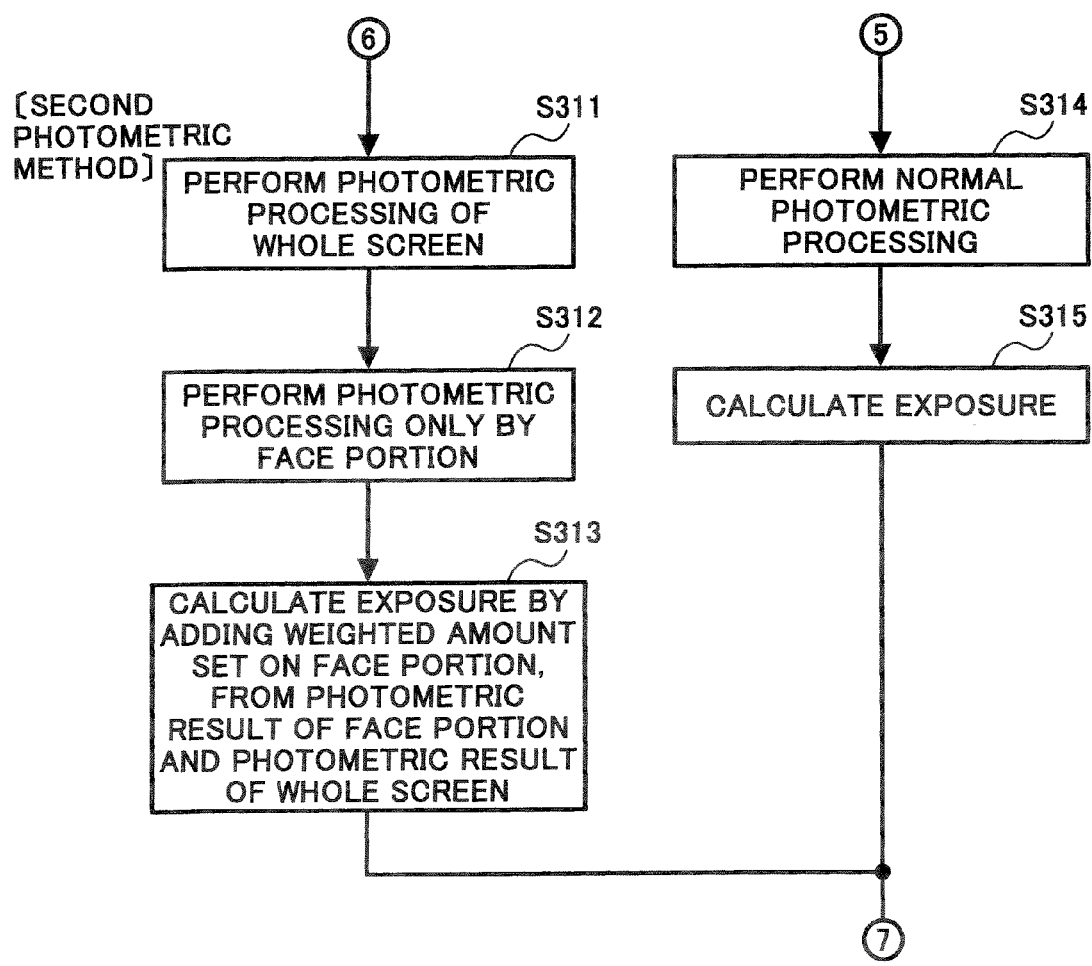
FIG. 14 is a flowchart which explains the first example of the AE operation.

FIG. 14 is a flowchart which explains a first example of the AE operation. FIG. 15 is a diagram which shows a display example on the liquid crystal monitor 207. The first example of the AE operation will be explained in accordance with the flowchart shown in FIG. 14, with reference to the display example of the liquid crystal monitor 207 in FIG. 15. After the still picture mode or the motion picture mode has been selected by the mode changing switch 212 in the operation section 108, when the release switch 211 is half-pushed to turn on the SW 1, the CPU 115a in FIG. 2 executes the AE processing.

In FIG. 14, CPU 115a in FIG. 2 first judges if the face detection operation mode for executing face detection of a human object has been set (step S301) The face detection operation mode is set on the user setup screen for recording conditions (see FIG. 10 and FIG. 11) As a result of this judgment, when it is judged to be the face detection operation mode, the CPU 115a executes the face detection processing (step S302). The method of detecting the human object image from the subject image is the same as that in the first embodiment, and hence the detailed explanation thereof is omitted.

Figure 15A:
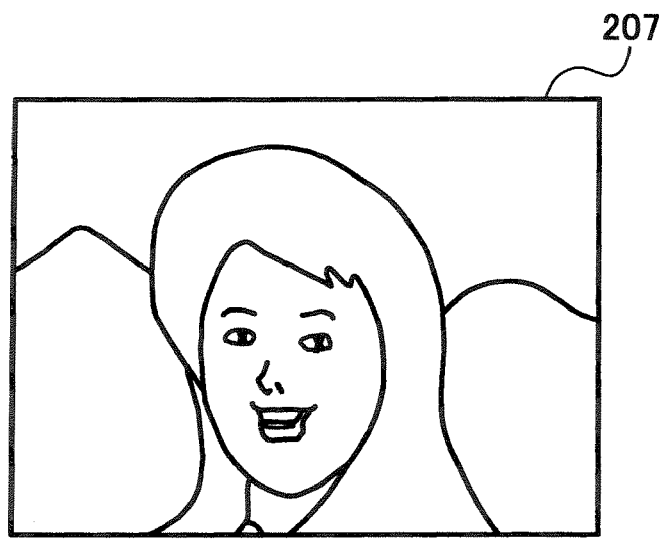
FIG. 15 is a diagram which shows a display example on the liquid crystal monitor.
Figure 15B:
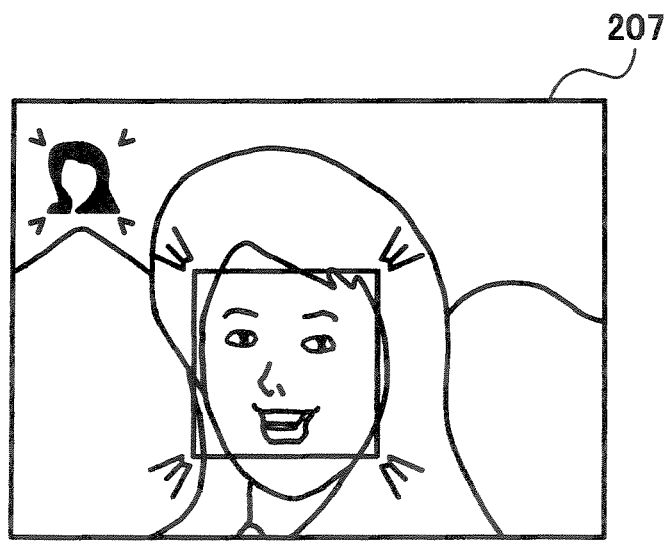

The CPU 115a then judges whether the face has been detected (step S303). As a result of this judgment, when the face has been detected, the CPU 115a displays a rectangular frame on the face portion of the human object (displays face detection execution result OK), in the image data displayed on the liquid crystal monitor 207, to thereby notify the user of the detection of the face (step S304). FIG. 15A shows a display example of the image data (monitored image) displayed on the liquid crystal monitor 207. FIG. 15B shows a display example when the rectangular frame is displayed on the face portion of the human object in the image data shown in FIG. 15A.

Subsequently, the CPU 115a judges if the photometric method has been set (step S305). The photometric method is set on the user setup screen for recording conditions (see FIG. 10 and FIG. 11). As a result of this judgment, when the photometric method has been set, control proceeds to step S307.

When the photometric method has not been set at step S305, the CPU 115a executes the photometric automatic judgment processing (step S306), and control proceeds to step S307. In this photometric automatic judgment processing, selection is carried out, based on the ratio of the face occupying in the screen or the position of the face or both, either of a "first photometric method in which only the face portion is optically measured, to calculate the luminance data Yy (AE evaluation value), to calculate the exposure", or a "second photometric method in which, based on the photometric result of the face and the photometric result of the whole screen, the luminance data Yy (AE evaluation value) is calculated, by placing emphasis on the photometric result of the face (by giving more weight to the photometric result of the face), to thereby calculate the exposure". Specifically, when the ratio of the face occupying in the screen is large or the face is in the central position of the screen or both, the first photometric method is selected, and in other cases, the second photometric method is selected.

When the selected photometric method is the first photometric method, the CPU 115a carries out the photometric processing, designating the face portion as the photometric area (AE area) (step S308). The CPU 115a calculates the exposure based on the photometric result in the photometric area (luminance data Yy (AE evaluation value)) (step S309), and executes the exposure setup processing, to thereby set the exposure conditions based on the calculated exposure (step S310).

At step S307, when the selected photometric method is the second photometric method, the CPU 115a executes the photometric processing for the whole screen, to optically measure the optical intensity on the whole screen (step S311) The CPU 115a carries out the photometric processing, designating the face portion as the photometric area (AE area) (step S312). Based on the photometric result of the face and the photometric result of the whole screen, the CPU 115a calculates the luminance data Yy (AE evaluation value), by placing emphasis on the photometric result of the face (by giving more weight to the photometric result of the face), corresponding to the ratio of the face occupying in the screen or the position of the face or both, to thereby calculate the exposure (step S313) based on the calculated luminance data Yy (AE evaluation value) The CPU 115a then executes the exposure setup processing, to thereby set the exposure conditions based on the calculated exposure (step S310).

When it is judged that the face detection operation mode has not been set at step S301, or when the face has not been detected at step S303, the CPU 115a executes the normal photometric processing (step S314), calculates the exposure based on the photometric result (step S315), and carries out the exposure setup processing to thereby set the exposure conditions based on the calculated exposure (step S310).

As explained above, according to the first example, the CPU 115a detects a human face in the subject, and carries out exposure control based on the photometric result for the detected human face. As a result, regardless of the range and position of the human object, the human object can be properly exposed.

According to the first example, the CPU 115a selects either of the first photometric method in which the exposure is calculated based on the photometric result of the human face, and the second photometric method in which weighting to the photometric result of the human face is increased compared with the photometric result of the whole screen, based on the photometric result of the human face and the photometric result of the whole screen, to thereby calculate the exposure, corresponding to the ratio of the face occupying in the screen or the position of the face or both. As a result, when the face occupying in the screen is large, or when the face is in the center, the first photometric method in which the exposure is calculated based on the photometric result of the human face is adopted, thereby priority can be given to the proper exposure of the human object.

According to the first example, since a user can select the first photometric method and the second photometric (see FIG. 10 and FIG. 11), the user can select either the photometric result of the whole screen or the photometric result of the face, to which much weight is given, thereby the user's photographing intention can be reflected.

According to the first example, when the second photometric method is to be executed, the CPU 115a sets weighting to the photometric result of the face with respect to the photometric result of the whole screen, according to the ratio of the face occupying in the screen or the position of the face or both. Therefore, if the ratio of the face occupying in the screen is large, weighting to the photometric result of the face portion is increased, and if the ratio of the face occupying in the screen is small, weighting to the photometric result of the face portion is decreased, thereby enabling exposure well balanced between the face and the background.

According to the first example, since the user can set permission/inhibition of the face detection (face detection operation mode) (see FIG. 10 and FIG. 11), the user can select whether a human object is to be properly exposed.

According to the first example, since a rectangular frame is displayed on the detected face on the liquid crystal monitor 207 to display for the user that the CPU 115a has succeeded in the face detection, the user can confirm whether the face detection is a success or not.

Figure 17:
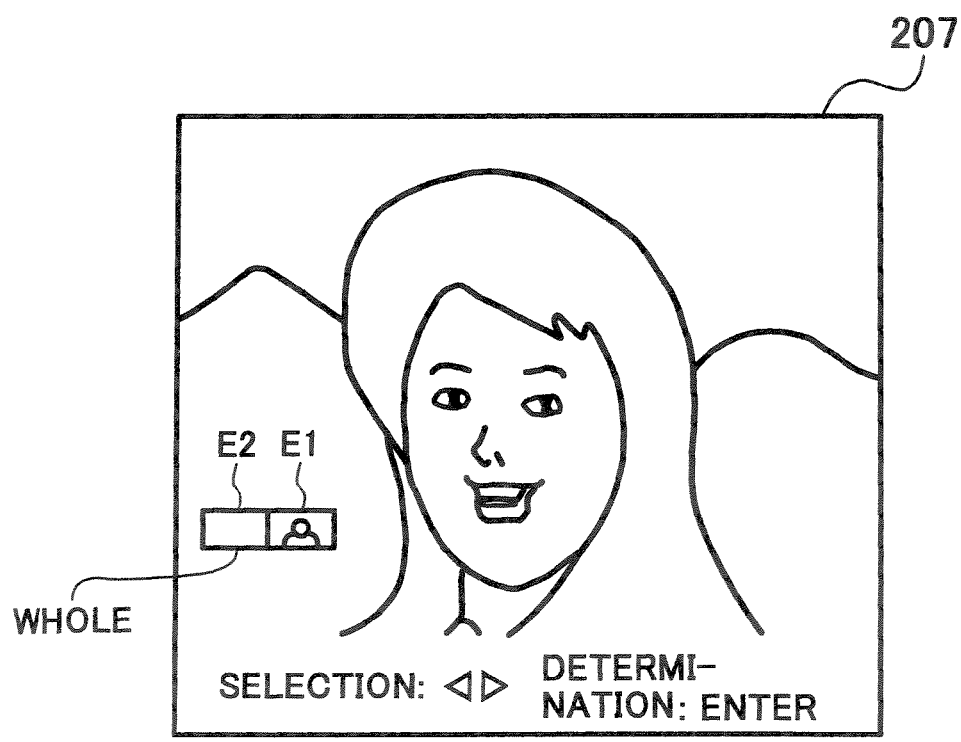
FIG. 17 is a diagram which shows a display example on the liquid crystal monitor of a digital camera.

According to the first example, on the user setup screen for recording conditions (see FIG. 10 and FIG. 11) displayed on the liquid crystal monitor 207, either the first photometric method or the second photometric method is selected. However, for example, on the screen where the monitored image is displayed on the liquid crystal monitor 207, either the first photometric method or the second photometric method may be selected. FIG. 17 shows a display example of the screen for selecting the first photometric method or the second photometric method. In this figure, E1 indicates the first selection method and E2 indicates the second selection method, and the user selects one of those.

SECOND EXAMPLE

In a second example of the AE operation, in the second photometric method (a method of calculating the exposure based on the photometric result of the human face and the photometric result of the whole screen, by giving more weight to the photometric result of the human face as compared with the photometric result of the whole screen), the user can set the weighting ratio between the face and the background.

Figure 18B:
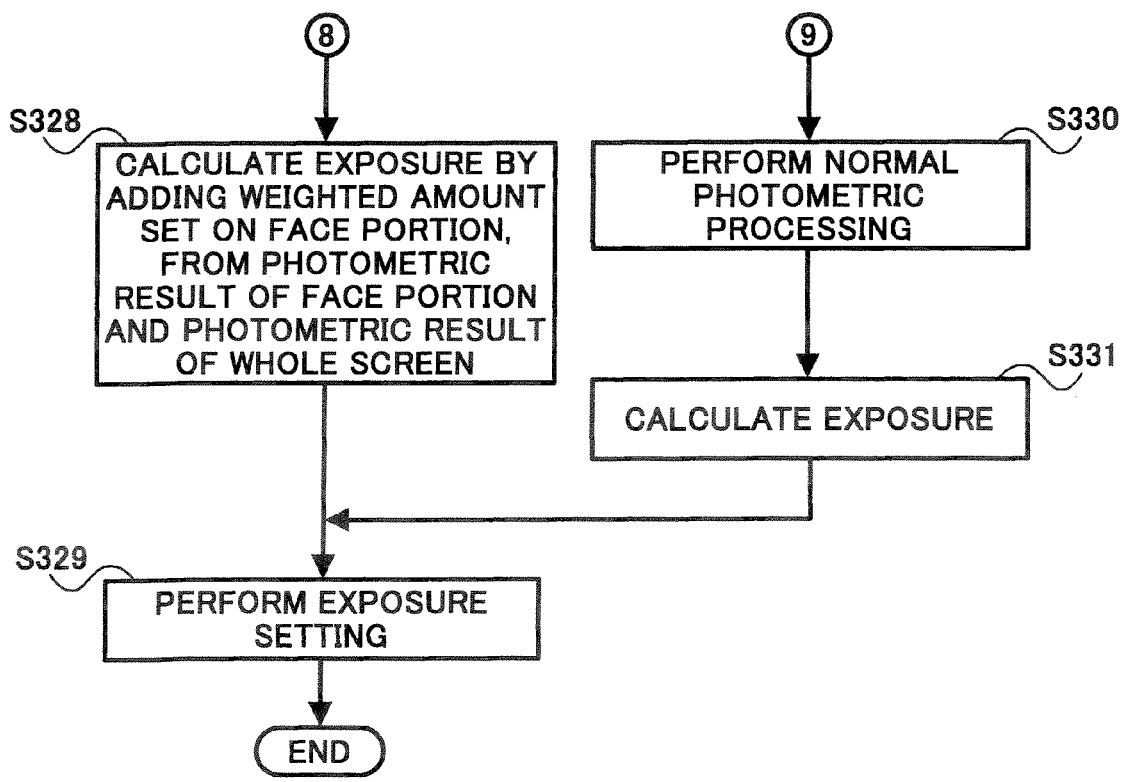
FIG. 18 is a flowchart which explains the second example of the AE operation.
Figure 19:
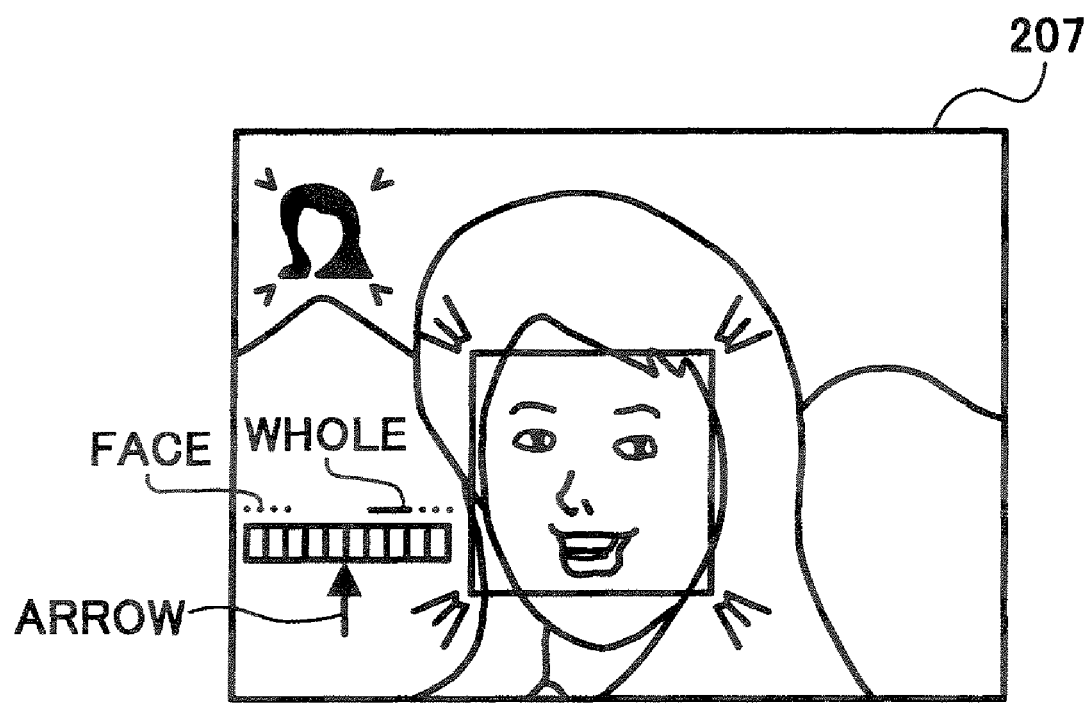
FIG. 19 is a diagram which shows a display example on the liquid crystal monitor.

FIG. 18 is a flowchart which explains the second example of the AE operation. FIG. 19 is a diagram which shows a display example on the liquid crystal monitor 207. The second example of the AE operation will be explained in accordance with the flowchart shown in FIG. 18, with reference to the display example of the liquid crystal monitor 207 in FIG. 19. After the still picture mode or the motion picture mode has been selected by the mode changing switch 212 in the operation section 108, when the release switch 211 is half-pushed to turn on the SW 1, the CPU 115a executes the AE processing.

In FIG. 18, CPU 115a in FIG. 2 first judges if the face detection operation mode for executing face detection of a human object has been set (step S321). The face detection operation mode is set on the user setup screen for recording conditions described above (see FIG. 10 and FIG. 11). As a result of this judgment, when it is judged that the face detection operation mode has been set, the CPU 115a executes the face detection processing as in the first embodiment (step S322).

The CPU 115a then judges whether the face has been detected (step S323). As a result of this judgment, when the face has been detected, the CPU 115a displays a rectangular frame on the face portion of the human object (displays face detection execution result OK), in the image data displayed on the liquid crystal monitor 207, to thereby notify the user of the detection of the face (step S24). FIG. 15A shows a display example of the image data (monitored image) displayed on the liquid crystal monitor 207. FIG. 15B shows a display example when the rectangular frame is displayed on the face portion of the human object in the image data shown in FIG. 15A.

Subsequently, the CPU 115a executes weighting user setup processing for the face portion (step S325). Specifically, in the weighting user setup processing of the face portion, the CPU 115a displays a screen for setting a weighting ratio between the face and the whole screen (background). FIG. 19 shows a display example of a screen for setting the weighting ratio between the face and the whole screen (background) The user moves the position of an arrow displayed on the screen to a desired position by the cursor key 215, and presses the ENTER key 217, thereby the weighting ratio between the face and the whole screen (background) is set.

Thereafter, the CPU 115a executes the photometric processing for the whole screen, to thereby measure the optical intensity on the whole screen (step S326). The CPU 115a carries out the photometric processing, designating the face portion as the photometric area (AE area) (step S327). Based on the photometric result of the face portion and the photometric result of the whole screen, the CPU 115a calculates the luminance data Yy (AE evaluation value), by putting weight set by the user, to thereby calculate the exposure (step S328) based on the calculated luminance data Yy (AE evaluation value). The CPU 115a then executes the exposure setup processing, to thereby set the exposure conditions based on the calculated exposure (step S329).

When it is judged that the face detection operation mode has not been set at step S321, or when the face has not been detected at step S323, the CPU 115a executes the normal photometric processing (step S330), calculates the exposure based on the photometric result, to set the exposure conditions based on the calculated exposure (step S329).

As explained above, according to the second example, a user can set weighting to the photometric result of the human face with respect to the photometric result of the whole screen. Therefore, when the exposure is adjusted based on the photometric result of the human face and the photometric result of the whole screen, it is possible to reflect the user's photographing intention.

The present invention is not limited to the first example and the second example, various modifications are possible within the range that does not change the essential point of the invention, and for example, modifications described below are possible.

FIRST MODIFICATION EXAMPLE

A human object photographing mode for taking a picture of a human object (first photographing mode) and a landscape photographing mode for taking a picture of landscape (second photographing mode) are provided in the digital camera of the present invention, such that the mode can be selected by, for example, the mode changing switch 212. When the human object photographing mode is selected, the CPU 115a performs exposure control accompanied with the face detection processing (processing after "YES" at step S1 in FIG. 14). When the landscape photographing mode is selected, the CPU 115a does not perform the face detection processing, and may perform the exposure control (processing after "NO" at step S1 in FIG. 14) by the normal photometric method. This is because, in the human object photographing mode in which it is necessary to properly expose the face, the face detection processing is necessary, but in the landscape photographing mode in which it is not necessary to properly expose the face, the face detection processing is not necessary.

SECOND MODIFICATION EXAMPLE

Figure 16:
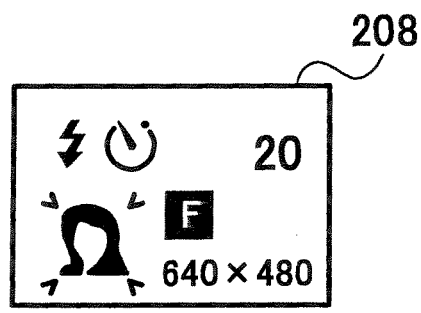
FIG. 16 is a diagram which shows a display example on a sub-LCD.

In the first example and the second example, the face detection execution result is displayed on the liquid crystal monitor 207, but it may be displayed on the sub-LCD 208. FIG. 16 shows a display example on the sub-LCD 208, when the CPU 115a has succeeded in the face detection. An LED may be provided for displaying the face detection execution result, instead of the sub-LCD 208.

Third Embodiment

A digital camera according to a third embodiment will be explained, with reference to FIG. 2 and FIG. 20 to FIG. 26. In the third embodiment, a digital camera that can automatically judge if photographing of a human object is to be performed, and automatically performs electronic flashing suitable for photographing of a human object, without troubling the user, will be explained. The visual configuration and the block configuration of the digital camera according to the third embodiment are the same as those in the first embodiment (FIG. 1 and FIG. 2), and hence explanation of the common parts is omitted, and only the different part will be explained.

Figure 20:
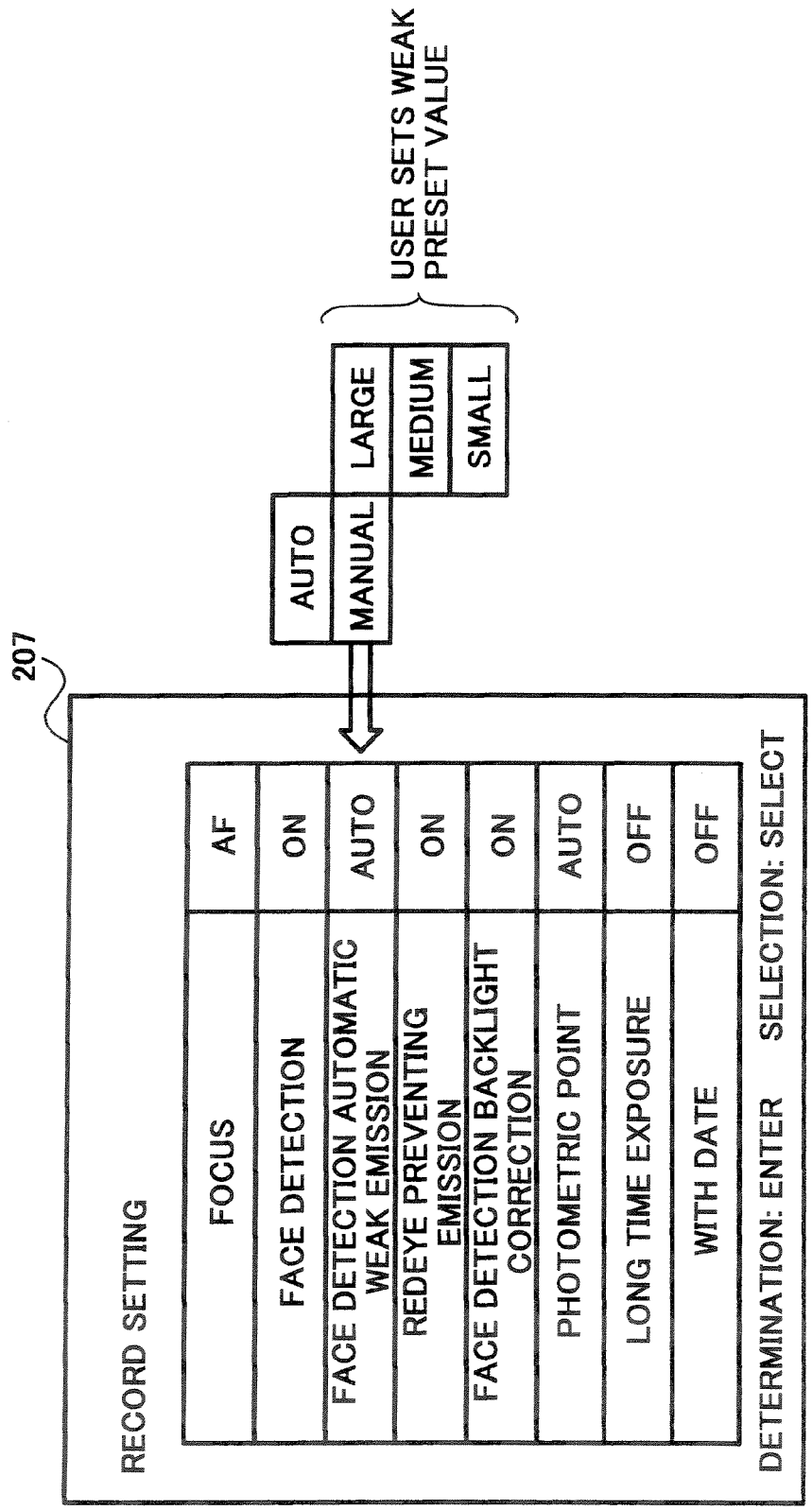
FIG. 20 is a diagram which shows a user setup screen for recording conditions displayed on a liquid crystal monitor, when a SETUP mode is selected by a mode changing switch in an operation section in a digital camera according to a third embodiment.

FIG. 20 shows the user setup screen for recording conditions displayed on the liquid crystal monitor 207, when the SETUP mode is selected by the mode changing switch 212 in the operation section 108 in FIG. 2. The user setup screen for recording conditions shown in this figure is a screen for a user to set setting condition for each item ([AF/Manual] in "Focus", [ON/OFF] in "Face detection (face detection operation mode)", [Auto/manual (weak user preset value, large, medium, small) in "Face detection automatic weak emission (setting of weak preset value", [ON/OFF] in "Red-eye preventing emission (red-eye emission mode)", [ON/OFF] in "Face detection backlight correction (permission of electronic flashing at the time of judging backlight)", [Auto/manual] in "Photometric point", [ON/OFF] in "Long time exposure", and [ON/OFF] in "With date"). In the screen shown in this figure, a desired item is selected by the cursor key 215, a desired setting condition is selected by the SELECT key 218 in the selected item, and the selected setting condition is set by the ENTER key 217.

As described below, when the user selects [Auto] in "Face detection automatic weak emission (setting of weak preset value", the CPU 115a sets the weak preset value. On the other hand, when the user selects [Manual] in "Face detection automatic weak emission (setting of weak preset value", the user further sets either one of [Large, Medium, Small] in the weak preset value (weak preset value set by user).

In the example shown in this figure, the setting is made such that "Focus" is [AF], "Face detection (face detection operation mode)" is [ON], "Face detection automatic weak emission (setting of weak preset value" is [Auto], "Red-eye preventing emission (red-eye emission mode)" is [ON], "Face detection backlight correction (permission of electronic flashing at the time of judging backlight)" is [ON], "Photometric point" is [Auto], "Long time exposure" is [OFF], and "With date" is [OFF].

The CPU 115a also controls the monitoring operation, the AF operation, the AE operation, the photographing operation, the electronic flashing operation and the like. Further, the CPU 115a comprises a still picture mode for recording still pictures and a motion picture mode for recording motion pictures and speech, and controls execution of each mode.

Figure 21:
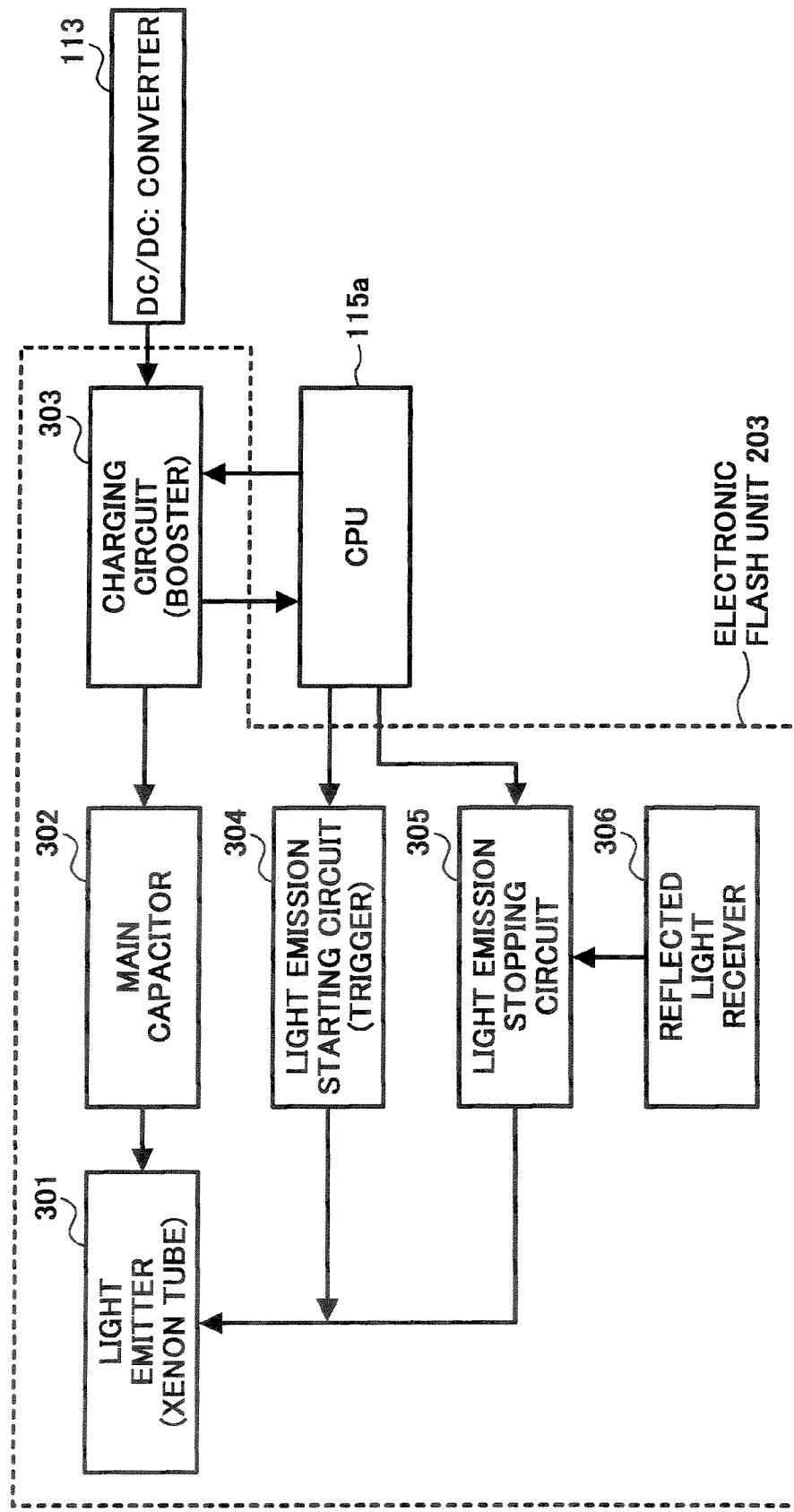
FIG. 21 is a block diagram which shows a detailed configuration of an electronic flash circuit in FIG. 2.

FIG. 21 is a block diagram which shows a detailed configuration of the electronic flash unit 203 in FIG. 2. The electronic flash unit 203 has an xenon tube, and comprises a light emitter 301 which emits electronic flash light, a main capacitor 302 which accumulates electric charge for light emission of the xenon tube in the light emitter 301, a charging circuit (booster circuit) 303 for charging the main capacitor 302, a light emission starting (trigger) circuit 304 which starts light emission of the xenon tube in the light emitter 301, a light emission stopping circuit 305 which stops light emission of the xenon tube in the light emitter 301, and a reflected light receiver 306 which receives the reflected light from a subject and outputs the light to the light emission stopping circuit 305.

The operation of the electronic flash unit 203 will be explained below. The CPU 115a outputs a charging start signal to the charging circuit 303 at the time of charging. When the charging start signal is input from the CPU 115a, the charging circuit 303 raises the pressure of the output voltage input from the DC/DC converter 113, to thereby start charging of the main capacitor 302. When charging is started, the CPU 115a regularly monitors the charging voltage of the main capacitor 302 via the charging circuit 303. When the main capacitor 302 has been charged up to an electronic flashing available voltage, which has been preset, the CPU 115a outputs a charging stop signal to the charging circuit 303. The charging circuit 303 stops charging of the main capacitor 302, when the charging stop signal is input from the CPU 115a.

When the CPU 115a allows the xenon tube in the light emitter 301 to emit light, the CPU 115a outputs a light emission signal to the light emission starting circuit 304. When the light emission signal is input from the CPU 115a, the light emission starting circuit 304 starts light emission from the xenon tube in the light emitter 301. The reflected light receiver 306 receives the reflected light from the subject, and outputs the light to the light emission stopping circuit 305. The light emission stopping circuit 305 integrates the reflected light input from the reflected light receiver 306. When the integral quantity of the reflected light becomes a predetermined value, the light emission stopping circuit 305 stops light emission from the xenon tube in the light emitter 301 (normal electronic flashing (main light emission)). When the integral quantity of the reflected light does not reach the predetermined value, even if a certain period of time has passed, or when the xenon tube is made to emit light only for very short time, like red-eye preventing emission, the CPU 115a outputs a light emission stop signal to the light emission stopping circuit 305, and the light emission stopping circuit 305 stops light emission from the xenon tube in response to this signal.

The outline of the electronic flashing operation which is executed under control of the CPU 115a will be explained below.

[Electronic Flashing Operation]

After the still picture mode or the motion picture mode has been selected by the mode changing switch 212 in the operation section 108 in FIG. 2, and in the state with the electronic flash switch 213 turned ON, when the release switch 211 is fully pushed to turn on the SW 2, the CPU 115a executes the electronic flashing operation. Specifically, in the electronic flashing operation, when the face detection operation mode has been set (see FIG. 20), the face detection processing is executed to detect a human face. Specifically, the image data input from the CCD 102 is processed by the F/E (CDS, AGC, A/D) 103, and input to the IPP 104. After signal processing has been carried out in the IPP 104, it is written in the DRAM 107. The CPU 115a detects a human face from image data stored in the DRAM 107, by using the known face recognition technique (Gabor Wavelet transform+graph matching). When the human face is detected, it can be judged that photographing of a human object is to be carried out. The CPU 115a controls the electronic flash unit 203, based on the face detection result. In other words, in the digital camera in this embodiment, a human face is detected to automatically judge that photographing of a human object is to be carried out, the electronic flash unit 203 is automatically controlled without troubling a user, and the human object is photographed with proper brightness. Here, the CPU 115a executes the control program to perform face detection, but hardware dedicated for face detection may be provided.

Figure 22B:
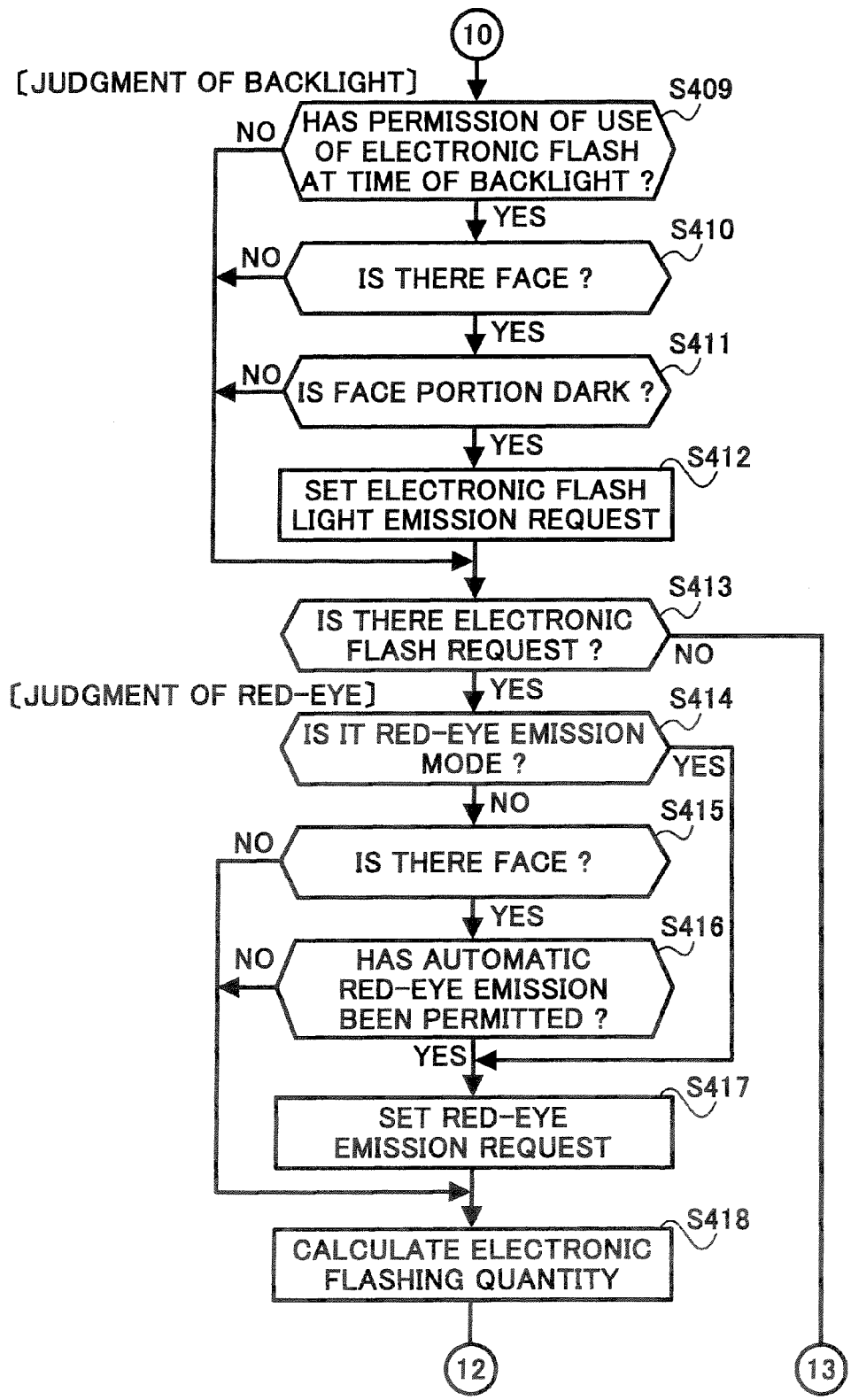
FIG. 22 is a flowchart which explains electronic flashing operation.
Figure 22C:
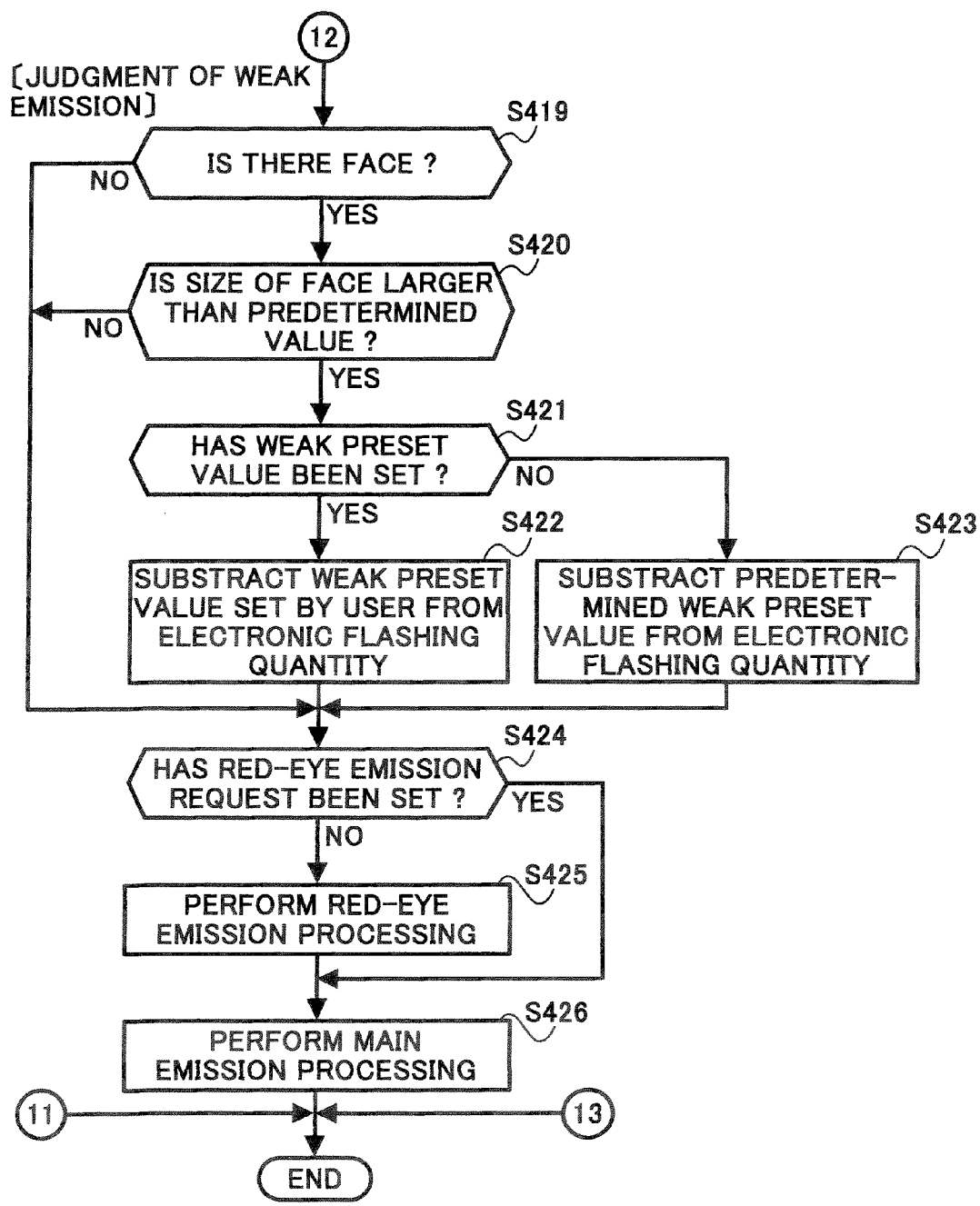

FIG. 22 is a flowchart which explains the electronic flashing operation of the digital camera according to this embodiment. The electronic flashing operation of the digital camera shown in FIG. 2 will be explained, with reference to the flowchart in FIG. 24. A case that the face detection operation mode has been set will be explained.

[Light Emission Request Initializing Processing]

In FIG. 22, the CPU 115a in FIG. 2 clears the electronic flashing request (step S401), and then clears the red-eye emission request (step S402) The CPU 115a then executes the face detection processing (step S403).

The face detection processing will be explained below. The method of detecting a human object image facing the front from a subject image is the same as in the first embodiment, and hence the explanation thereof is omitted.

The CPU 115a performs AE calculation processing for exposure, and performs AE calculation processing from the image data taken in from the CCD 102 (step S404) The AE calculation processing will be explained specifically. FIG. 12 shows a division example when the screen of the CCD 102 (image frame) is divided into a plurality of areas Y1 to Y35. FIG. 13 is a diagram which shows one example of the image data of the subject in FIG. 12

The IPP 104 calculates luminance data Y1 to Y35 for each area Y1 to Y35, whose optical intensity is to be measured, based on the image data (each pixel data (R, G, B)) input from the CCD 102. The calculation equation of the luminance data is shown below. In the calculation equation, Rn, Gn and Bn indicate a mean value of each pixel data (R, G, B) in each area, respectively.

Area 1 $Y1=0.299R1+0.587G1+0.114B1$

Area 2 $Y2=0.299R2+0.587G2+0.114B2$

Area n $Yn=0.299Rn+0.587Gn+0.114Bn$

The IPP 104 calculates the luminance data Yy (photometric value), by using any one of the following methods, (1) center-weighted photometric method (a method of determining luminance data by placing emphasis on the brightness in the center and adding the ambient brightness), (2) partial photometric method (a method of determining luminance data only by a mean value of luminance data only within the area on the screen), (3) spot photometric method (having the same idea as the partial photometric method, but the photometric area is as small as about 1 to 2%), and (4) divided photometric method (a method of dividing a screen into a plurality of areas, to obtain a mean value of luminance for each area, and determining luminance data from the distribution pattern of the luminance).

When the face detection operation mode has been set, the IPP 104 respectively calculates the luminance data of the area including the face, and calculates the mean value of the luminance data of the calculated area as luminance data YFace (brightness in the face portion). In the example shown in FIG. 13, a mean value of the luminance data of areas Y14, Y20, Y21, Y26 and Y27 is designated as luminance data Yface (brightness in the face portion).

When the face detection operation mode has been set, the IPP 104 also respectively calculates the luminance data of the other area excluding the area including the face (areas around the face), and calculates the mean value of the luminance data of the calculated other areas as luminance data YA (ambient brightness) In the example shown in FIG. 13, a mean value of the luminance data of areas Y1 to Y13, Y15 to Y19, Y22 to Y25 and Y28 to Y35 is designated as luminance data YA (ambient brightness).

[Electronic Flash Mode Confirmation Processing]

The CPU 115a judges whether the electronic flash inhibiting mode has been set (step S405). Such an electronic flash inhibiting mode is set when the electronic flash switch is turned OFF. As a result of this judgment, when the electronic flash inhibiting mode has been set, the flow is terminated, and on the other hand, when the electronic flash inhibiting mode has not been set, control proceeds to step 406.

At step S406, the CPU 115a judges whether the forced light emission mode has been set. Such a forced light emission mode is set on the user setup screen for recording conditions described above (see FIG. 20). As a result of this judgment, when the forced light emission mode has been set, control proceeds to step S408, and on the other hand, when the forced light emission mode has not been set, control proceeds to step S407.

At step S407, the CPU 115a refers to the photometric result of the AE calculation at step S404 to judge whether the photometric value is less than a predetermined threshold (predetermined brightness). As a result of this judgment, if the photometric value is not less than the predetermined threshold (predetermined brightness), control proceeds to step S409, and on the other hand, if the photometric value is less than the predetermined threshold (predetermined brightness), the CPU 115a sets the electronic flashing request (step S408).

[Backlight Judgment Processing]

The CPU 115a judges whether the electronic flashing is permitted at the time of backlight judgment (step S409). Permission/inhibition of the electronic flashing at the time of backlight judgment is set on the user setup screen for recording conditions described above (see FIG. 20). As a result of this judgment, if electronic flashing is not permitted at the time of backlight judgment, control proceeds to step S413. On the other hand, if electronic flashing is permitted at the time of backlight judgment, the CPU 115a then judges whether a face is detected in the screen in the above face detection processing (step S410).

As a result of this judgment, when the face has not been detected, control proceeds to step S413. On the other hand, at step S410, when the face has been detected, the CPU 115a refers to the photometric result of the AE calculation at step S404 to judge whether the face portion is darker than the ambient portion by a predetermined value or more (step S411) As a result of this judgment, if the face portion is not darker than the ambient portion by a predetermined value or more, control proceeds to step S413. On the other hand, if the face portion is darker than the ambient portion by a predetermined value or more, the electronic flashing request is set (step S412) and control proceeds to step S413.

Subsequently, the CPU 115a judges whether the electronic flashing request has been set in the processing up to now (step S413). As a result of this judgment, if the electronic flashing request has not been set, the flow is terminated, and on the other hand, if the electronic flashing request has been set, control proceeds to step S414.

[Red-eye Emission Processing]

At step S414, the CPU 115a judges whether the red-eye emission mode has been set. This red-eye emission mode is set on the user setup screen for recording conditions described above (see FIG. 20) As a result of this judgment, if the red-eye emission mode has been set, the CPU 115a sets the red-eye emission request (step S417), and control proceeds to step S418. On the other hand, if the red-eye emission mode has not been set, the CPU 115a judges whether a face has been detected in the screen (step S415) As a result of this judgment, if a face has not been detected in the screen, control proceeds to step S418. On the other hand, when a face has been detected in the screen, the CPU 115a judges whether permission of automatic red-eye emission has been set (step S416). This permission/inhibition of the automatic red-eye emission is set on the user setup screen for recording conditions described above (see FIG. 20). As a result of this judgment, if permission of automatic red-eye emission has not been set, control proceeds to step S418. On the other hand, if permission of automatic red-eye emission has been set, the CPU 115a sets the red-eye emission request (step S417) and control proceeds to step S418. At step S418, the CPU 115a calculates the electronic flash light quantity.

[Weak Emission Judgment Processing]

At step S419, the CPU 115a judges whether a face has been detected in the screen. As a result of this judgment, if a face has not been detected in the screen, control proceeds to step S424. On the other hand, if a face has been detected in the screen, it is judged whether the area of a portion judged to be a face is larger than a predetermined value (step S420) As a result of this judgment, if the area of the portion judged to be a face is not larger than the predetermined value, control proceeds to step S424. On the other hand, if the area of the portion judged to be a face is larger than the predetermined value, the CPU 115a judges whether a weak preset value has been set (step S421). This weak preset value is set on the user setup screen for recording conditions described above (see FIG. 20). As a result of this judgment, when the weak preset value has been set, the CPU 115a subtracts the weak preset value set by the user from the calculated electronic flashing quantity (step S422) When the weak preset value has not been set, the CPU 115a subtracts a predetermined weak preset value from the calculated electronic flashing quantity (step S423).

Subsequently, at step S424, the CPU 115a judges whether the red-eye emission request has been set. As a result of this judgment, if the red-eye emission request has been set, the CPU 115a performs the red-eye emission processing (step S425), and then performs the main emission processing (step S426). On the other hand, if the red-eye emission request has not been set, the CPU 115a performs the main emission processing (step S426) without performing the red-eye emission processing.

As explained above, according to the third embodiment, the CPU 115a judges whether photographing of a human object is to be carried out, by detecting a human face, and when photographing of a human object is to be carried out and electronic flash is used, after the red-eye preventing emission has been performed, the main emission is to be carried out. As a result, it can be judged automatically that photographing of a human object is to be carried out, and red-eye emission can be performed automatically, thereby time and energy of a user for changing over to the red-eye emission mode can be omitted.

According to the third embodiment, it is judged whether photographing of a human object is to be carried out by detecting a face. When photographing of a human object is to be carried out, and electronic flash is used, a user can set whether the red-eye preventing emission is to be carried out automatically. As a result, if the user does not want to use the red-eye emission, the user can inhibit the red-eye emission, thereby enabling photographing using a good shutter chance.

According to the third embodiment, when the ratio of the face occupying in the screen is not smaller than a predetermined value, the CPU 115*a* judges that a close-up picture of a face is to be taken, and the electronic flash light quantity is set weak. Therefore, blanking of a portion where the electronic flash light is strongly irradiated can be prevented. In this case, a user can set the quantity of the electronic flash light quantity to be weakened (user preset value), and hence photographing using the electronic flash can be performed depending on the situation.

According to the third embodiment, the CPU 115*a* compares the brightness at a position which has been judged as a face with the ambient brightness, and when the brightness at the position which has been judged as a face is darker than the ambient brightness by a predetermined value or more, it is judged to be backlight, and electronic flash is automatically used. As a result, even if a human object is not at the center of the screen, it becomes possible to use the electronic flash for correcting the backlight.

According to the third embodiment, when it is judged to be backlight, the user can set whether to use the electronic flash. Therefore, the user can select if backlight correction by the electronic flash is to be performed, thereby enabling photographing corresponding to the user s photographing intention and the situation.

According to the third embodiment, the user can set whether face detection operation is to be performed. Hence, the user can select whether face detection operation is to be performed, according to if photographing of a human object is to be performed or not. As a result, convenience of the user can be improved.

Figure 23:
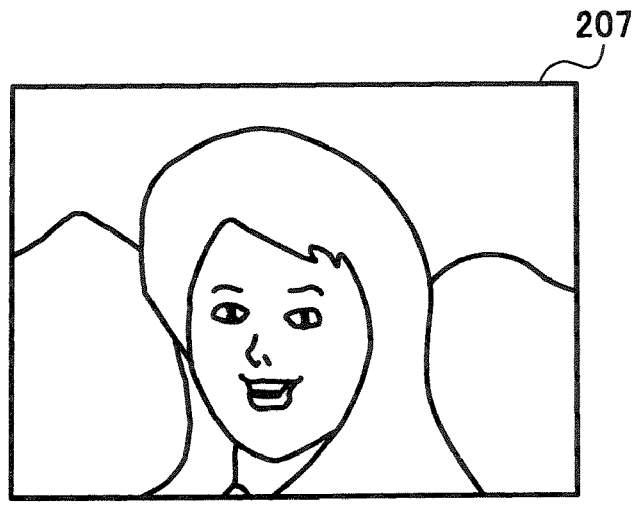
FIG. 23 is a diagram which shows a display example on the liquid crystal monitor.
Figure 24:
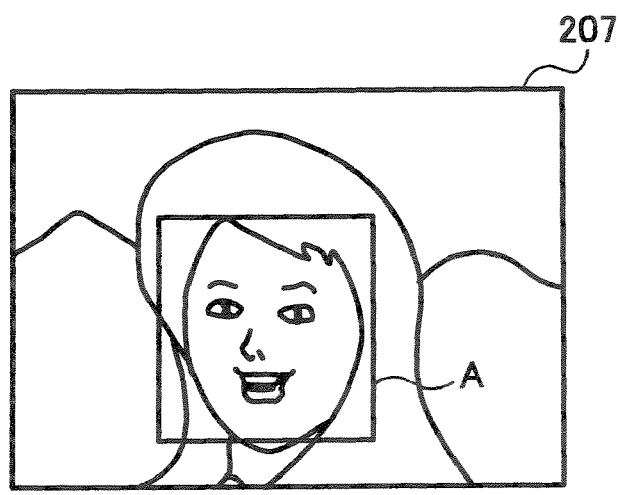
FIG. 24 is a diagram which shows a display example on the liquid crystal monitor.

In the third embodiment, the face detection result of the face detection processing may be informed to a user. For example, when a face has been detected, the CPU 115*a* displays a rectangular frame on the face portion of a human object, in the image data displayed on the liquid crystal monitor 207, to thereby notify the user that a face has been detected. FIG. 23 shows a display example of image data (monitored image) displayed on the liquid crystal monitor 207, and FIG. 24 shows a display example when a rectangular frame A is displayed on the face portion of the human object in the image data shown in FIG. 23.

Fourth Embodiment

A digital camera according to a fourth embodiment will be explained below, with reference to FIG. 33 to FIG. 31. In the fourth embodiment, a digital camera that performs photographing when face image of a subject is recognized and each part of the face is judged, will be explained.

Figure 25:
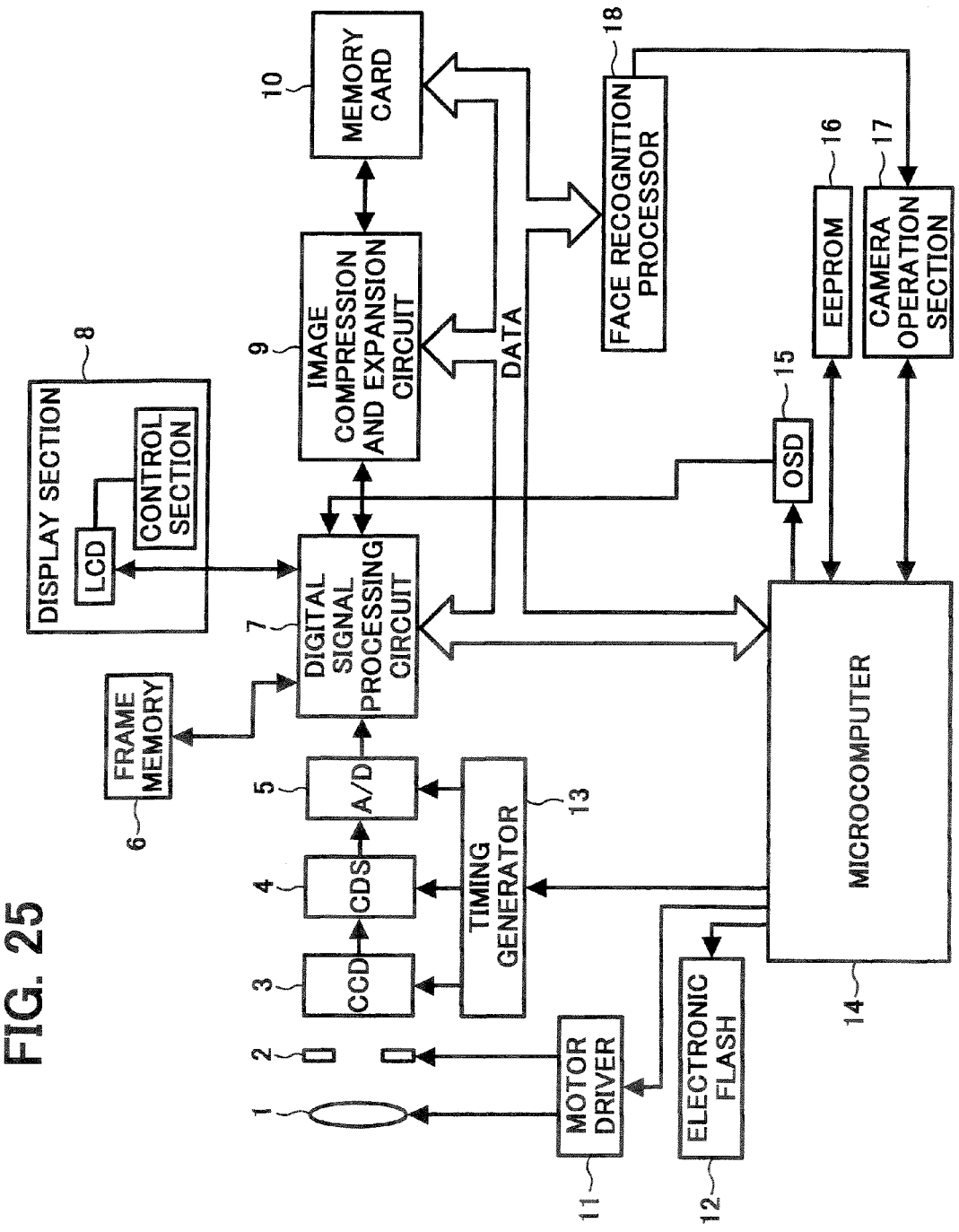
FIG. 25 is a block diagram which shows a digital camera according to a fourth embodiment.

FIG. 25 is a block diagram of a digital camera according to the fourth embodiment. A digital camera 100 comprises, a lens 1 which collects an optical image of a subject, a diaphragm section 2 which converges beams of light collected by the lens 1, a motor driver 11 which shifts a plurality of lenses (not shown) for focusing or drives the diaphragm section 2, a CCD (Charge Coupled Device) 3 which photoelectrically exchanges an optical image which has passed through the lens 1 and the diaphragm section 2, a CDS (Correlated Double Sampling) 4 which reduces noise included in the CCD 3, an A/D converter 5 which converts an analog signal from the CCD 3 to a digital signal, a timing generator 13 which generates timing for the CCD 3, the CDS 4 and the A/D converter 5, a digital signal processing circuit 7 which carries out image processing in accordance with the image processing parameter, a frame memory 6 which stores the record of picked up pixels and the image-processed image, a display section 8 which displays the picked up image on an LCD (Liquid Crystal Display), an image compression and expansion circuit 9 which compresses image data having been processed by the digital signal processing circuit 7 or expands the image data to the original image data, a memory card 10 which stores image data compressed by the image compression and expansion circuit 9, a microcomputer 14 (hereinafter, referred to as an MC) which executes a predetermined control based on the control program, an EEPROM (Electrically Erasable and Programmable Read Only Memory) 16 which stores parameters, a camera operation section 17 which has a release button or the like for an operator to operate the camera body, an OSD (On-Screen Display) 15 which monitors the number of films and the emission state of the electronic flash, an electronic flash 12 for illuminating the subject, and a face recognition processor 18 which performs recognition of a face image and judgment of each portion in the face image. The lens 1, the diaphragm 2 and the CCD 3 mainly constitute an image pickup unit, and the display section 8, the digital signal processing circuit 7 and the MC 14 mainly constitute a monitoring unit, and the camera operation section 17 mainly constitutes a selection unit.

The outline of the operation of the digital camera 100 in this configuration will be explained, with reference to FIG. 25. When an operator looks at a subject through a finder (not shown), and pushes the release button in the camera operation section 17, photographing is carried out. Specifically, the MC 14 detects the signal, and allows the motor driver 11 to drive the lens 1 and the diaphragm section 2, to focus the CCD 3 on the image of the subject. If necessary, the electronic flash 12 is emitted. The series of operation is automatically carried out by the MC 14 based on the information from the sensor (not shown). The image brought into focus of the CCD 3 is taken out sequentially by a clock generated by the timing generator 13, and the noise included in the data is reduced by the CDS4. Here, as the noise included in the output signal of the CCD 3, reset noise is predominant. In order to reduce this noise, by subtracting a picture signal and reset noise included in the signal period from each other, and a reset noise included only in the field through period, the reset noises are cancelled. The analog signal is converted to a 10-bit digital signal by the A/D converter 5, and the digital signal is input to the digital signal processing circuit 7, and temporarily stored in the frame memory 6. In response to the instruction from the MC 14, the data temporarily stored in the frame memory 6 is processed by parameters stored in the EEPROM 16, and the processed image is stored again in the frame memory 6. The white balance processing is included in this processing. Further, the data written in the frame memory 6 is transmitted to the control section in the display section 8, and the contents are displayed on the LCD.

The frame memory 6 is an image memory that can accumulate image data of at least one screen of the picked up image, and it uses a commonly used memory, for example, VRAM (Video Random Access Memory), SRAM (Static Random Access Memory), DRAM (Dynamic Random Access Memory) or SDRAM (Synchronous DRAM). When it is desired to record the image in the memory card 10, due to the intention of the operator, the MC 14 executes control of transferring the image to the memory card 10 with respect to the digital signal processing circuit 7, in response to the instruction of the camera operation section 17. That is to say, the image-processed image is read out from the frame memory 6, and transmitted to the image compression and expansion circuit 9. Here, the image is compressed by the JPEG (Joint Photographic Experts Group) method, and stored in the memory card 10. ADCT (adaptive discrete cosine) is used for this coding algorithm, and hierarchical coding is also employed in which an image having low resolution is first coded, and gradually the resolution becomes high. As described above, the memory card 10 is for compressing the image data stored in the frame memory 6, and storing the compressed data. Alternatively, for example, the configuration may be such that the data is recorded in an internal memory of about 8 MB or a smart media compact flash memory.

When the contents of the memory card 10 are displayed on the display section 8, or when it is desired to transfer the image data by connecting with another PC by an external terminal, a desired memory card is inserted to a connector (not shown) of the camera body, and an instruction is given from the camera operation section 17. The MC 14 then instructs the digital signal processing circuit 7 to read out the compressed image data in the memory card, and the image data is input to the image compression and expansion circuit 9, and expanded in accordance with the expansion algorithm to be recovered, and the image is displayed on the display section 8.

Figure 26:
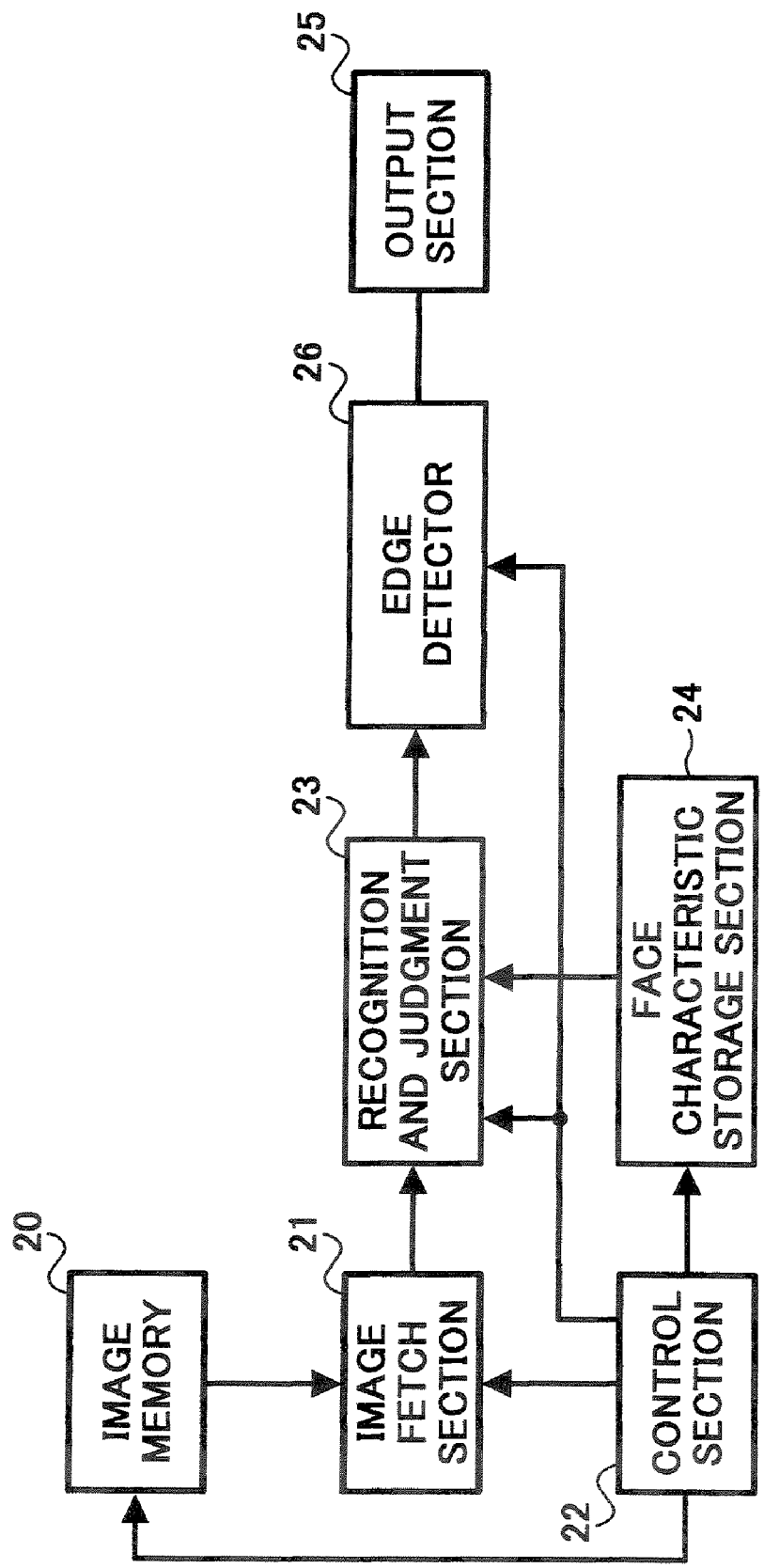
FIG. 26 is a schematic block diagram which shows a face recognition processor in the digital camera in the first embodiment.

FIG. 26 is a schematic block diagram which shows a face recognition processor 18 in FIG. 25. The face recognition processor 18 comprises an image memory 20 which stores one image of the subject, an image fetch section 21 which takes an image from the image memory 20 to an other memory or register in a predetermined unit, a control section 22 which takes charge of the overall control, a face characteristic storage section 24 which stores a plurality of characteristics of a face, a recognition and judgment section 23 which recognizes a face from the data from the image fetch section 21 and the data from the face characteristic storage section 24 and judges each portion, an edge detector 26 which detects an edge detection value from the result data thereof, and an output section 25 which outputs the final judgment result to the outside. The image memory 20 may use the frame memory 6 in FIG. 25. The other portions may be realized by the MC 14 in FIG. 25, or may be realized by a dedicated LSI. The recognition and judgment section 23 and the face characteristic storage section 24 mainly constitute the face image recognition unit and the face portion judgment unit, and the edge detector 26 mainly constitutes the edge detection unit.

Before explaining detection of the face image, known face image recognition technique will be explained schematically. Face recognition in the present invention needs not to be a level that can reliably recognize an individual face as in the conventional technique, and an either-or recognition level for recognizing that the subject is a face or other objects is sufficient. The object items in the face image recognition are largely divided into the following two items, (1) Identification of human object, To identify who the human object is, and
(2) Identification of expression, To identify how the expression of the human object is.

In other words, it can be said that the identification of human object of (1) is structural recognition of the face and statistic identification. It can be said that the identification of expression is recognition of shape change of the face, and dynamic identification. It can be said that the present invention is simpler identification than the above two. As these methods of identification, there are (1) two-dimensional method and (2) three-dimensional method, and in the computers, (1) two-dimensional method is mainly used. Detailed contents thereof are omitted herein. As a method of identification of expression, there is a concept by means of the FACS (Facial Action unit System), and by using this, the expression can be expressed by using the position of a characteristic point of the expression component.

Application of these techniques to an admission control system, a human object image database system, a recognition communication system and the like can be considered in the future.

FIRST EXAMPLE

Figure 27:
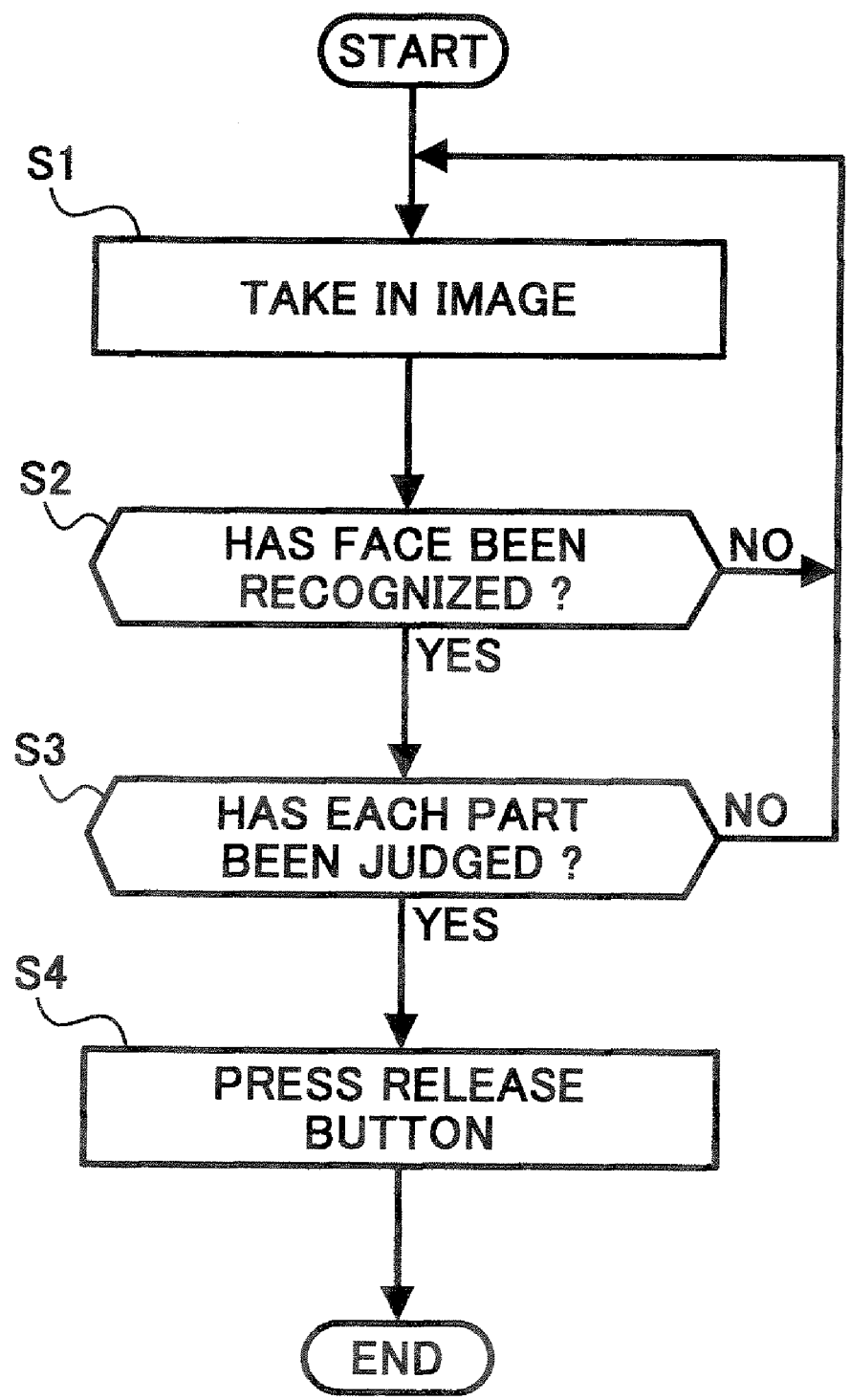
FIG. 27 is a flowchart which explains the first example.

FIG. 27 is a flowchart which explains a first example of the digital camera. Explanation will be made, with reference to FIG. 27, together with FIG. 25 and FIG. 26. The image data of the subject is photoelectrically exchanged by the CCD 3 in FIG. 25 and image processed, and then stored in the image memory 20 in the face recognition processor 18 in FIG. 26. The image data is taken into the image fetch section 21 in a predetermined unit (frame, byte) (step S1). The image data is input to the recognition and judgment section 23, and subjected to face recognition and judgment of each portion of the face, from the data in the face characteristic storage section 24 which stores various face characteristic data stored in advance. This recognition method is carried out based on various algorithms. The result thereof is transmitted in detail to the control section 22, and the face image is recognized (step S2), and each portion is judged from the data (step S3) As a result, when the face image is recognized and each portion is judged (YES route), the control section 22 outputs a result signal to the output section 25, thereby the release button (not shown) in the camera operation section 17 is automatically pushed (step S4). Thereby, photographing of the subject is carried out. On the other hand, when the face image is not detected at step S2 and step S3, or when each portion is not judged (NO route), the control section 22 outputs a result signal to the output section 25, and returns to step S1 to continue the face image recognition and judgment operation.

As described above, most probable subject of the camera is a human object. Therefore, when a human object is to be photographed, it is important to photograph without losing a shutter chance. For this purpose, it has to be recognized that the subject is a human object. The most suitable portion to identify a human object is a face. A clear image can be photographed only when the face image is extracted from the subject, and each part such as the eyes, the mouth, the nose and the eyebrows can be judged from the face image. Particularly, since the digital camera stores the digitalized image data, analysis by the computer is easy. As a result, the operability is improved, and a clear image can be photographed without losing a shutter chance.

Judgment of the face image is carried out by catching the outline of the face and features of shapes of the eyes, the nose, the eyebrows and the ears. If it is to be judged simply as a face, the face can be judged just by catching the outline. However, in order to clearly photograph the whole face, it is necessary to continue the judgment operation until all of the respective portions can be judged. Thereby, it is possible to photograph a clear image.

SECOND EXAMPLE

Figure 28:
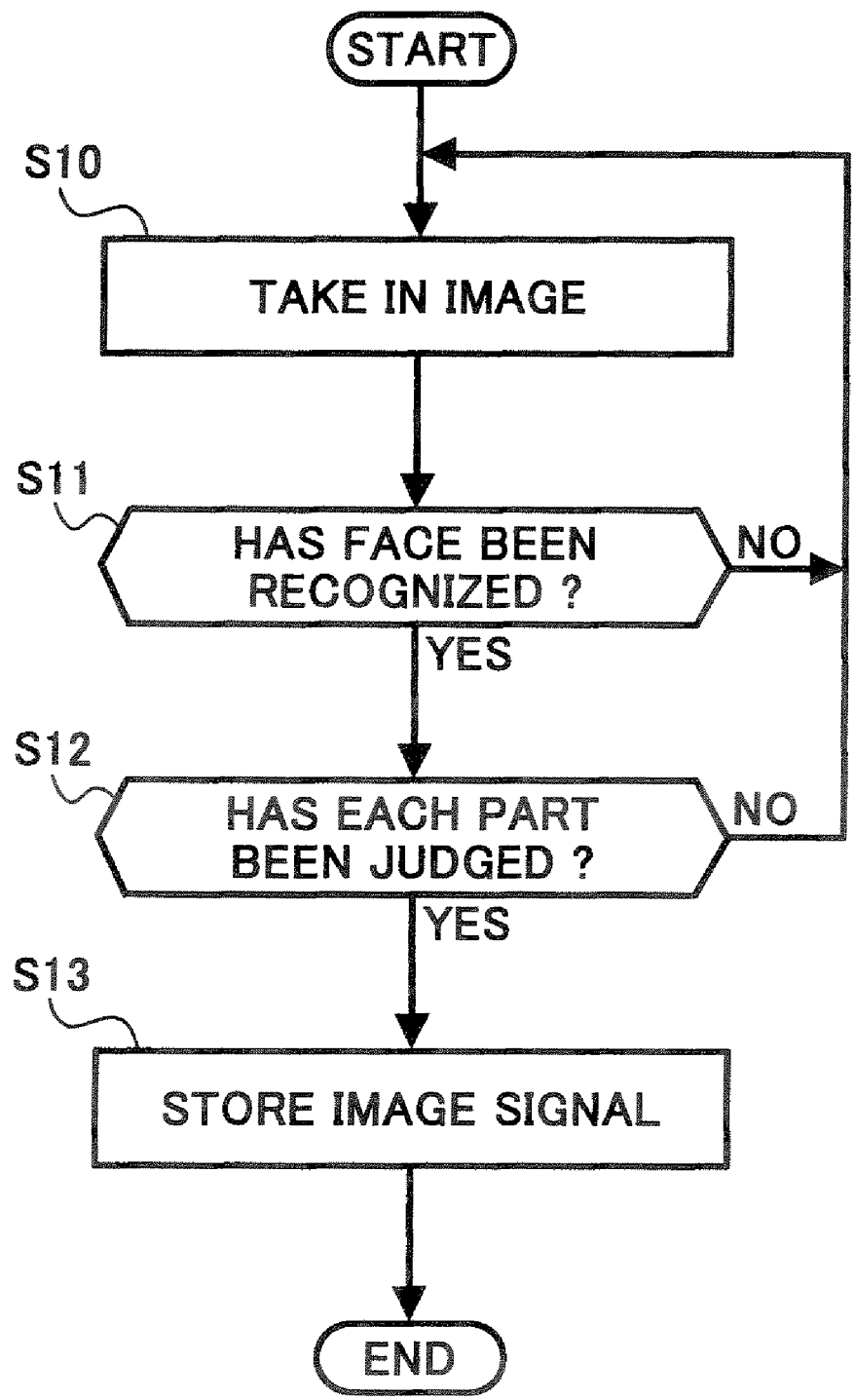
FIG. 28 is a flowchart which explains the second example.

FIG. 28 is a flowchart which explains a second example of the digital camera. Explanation will be made, with reference to FIG. 28, together with FIG. 25 and FIG. 26. The image data of the subject is photoelectrically exchanged by the CCD 3 in FIG. 1 and image processed, and then stored in the image memory 20 in the face recognition processor 18. The image data is taken into the image fetch section 21 in a predetermined unit (frame, byte) (step S10). The image data is input to the recognition and judgment section 23, and subjected to face recognition and judgment of each portion of the face, from the data in the face characteristic storage section 24 which stores various face characteristic data stored in advance. This recognition method is carried out based on various algorithms. The result thereof is transmitted in detail to the control section 22, and the face image is recognized (step S11), and each portion is judged from the data (step S12). As a result, when the face image is recognized and each portion is judged (YES route), the control section 22 outputs a result signal to the output section 25, compresses the image data and stores the image data in the memory card 10 (step S13). On the other hand, when the face image is not detected at step S11 and step S12, or when each portion is not judged (NO route), the control section 22 outputs a result signal to the output section 25, and returns to step S10 to continue the face image recognition and judgment operation.

The memory capacity of the memory is limited. Further, a photographer may select a necessary image from the image recorded in the memory or delete an unnecessary image. At this time, when an unclear image is recorded in the memory, this operation becomes complicated, and the memory is used wastefully. However, by storing the image data only when all of the respective portions of the face image can be judged, the operability is improved and wasteful use of the memory can be avoided.

THIRD EXAMPLE

Figure 29:
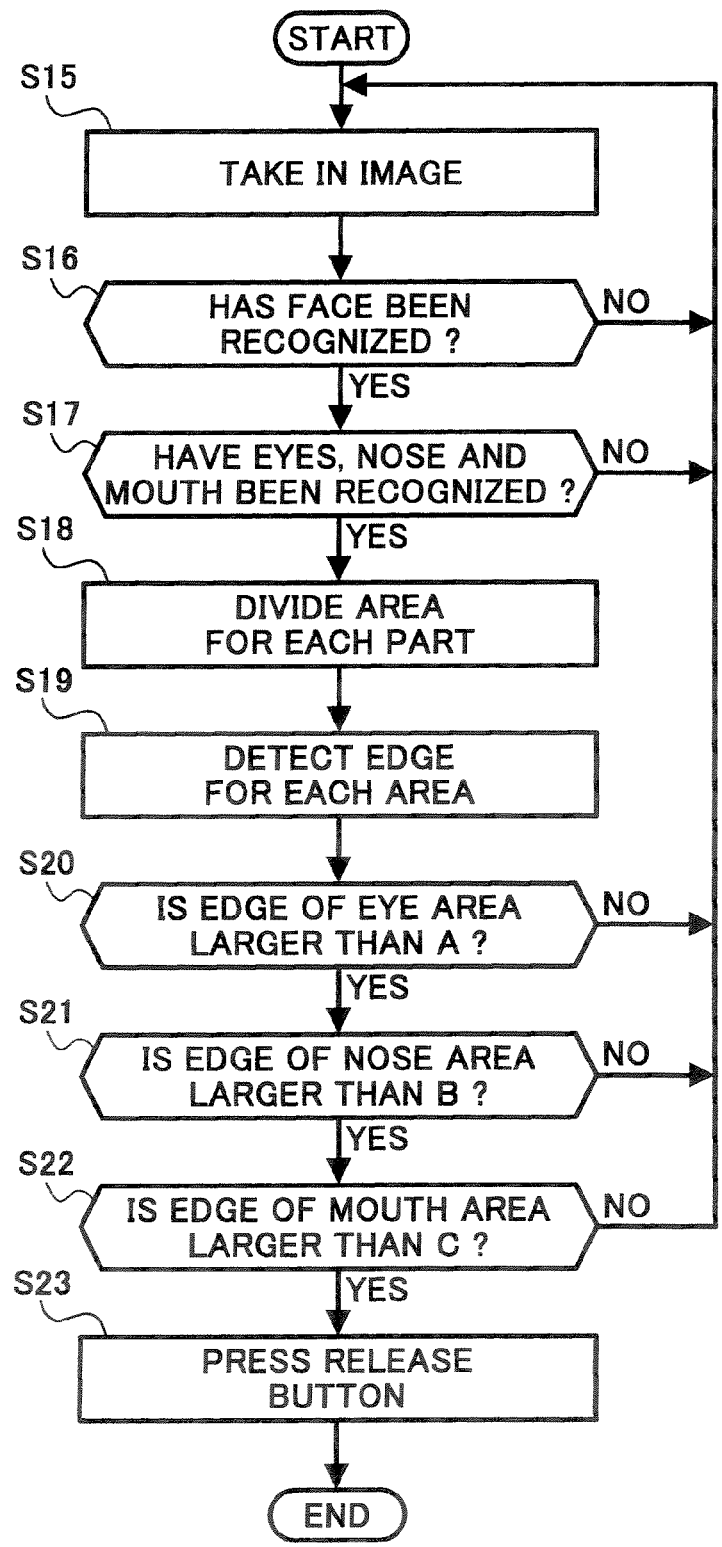
FIG. 29 is a flowchart which explains a third example.

FIG. 29 is a flowchart which explains a third example of the digital camera. Explanation will be made, with reference to FIG. 29, together with FIG. 25 and FIG. 26. The image data of the subject is photoelectrically exchanged by the CCD in FIG. 1 and image processed, and then stored in the image memory 20 in the face recognition processor 18. The image data is taken into the image fetch section 21 in a predetermined unit (frame, byte) (step S15). The image data is input to the recognition and judgment section 23, and subjected to face recognition and judgment of each portion of the face, from the data in the face characteristic storage section 24 which stores various face characteristic data stored in advance. This recognition method is carried out based on various algorithms. The result thereof is transmitted in detail to the control section 22, and the face image is recognized (step S16), and each portion is judged from the data (step S17). As a result, when the face image is recognized and each portion is judged (YES route), the area is divided into each part of the face (step S18), and the data is transmitted to the edge detector 26. The edge detector 26 detects an edge for each area (step S19), and judges whether the edge in the eye area is not smaller than an edge threshold A (step S20), judges whether the edge in the nose area is not smaller than an edge threshold B (step S21), and judges whether the edge in the mouth area is not smaller than an edge threshold C (step S22). If the results of all of these judgments are YES, the control section 22 outputs a result signal to the output section 25, thereby the release button (not shown) in the camera operation section 17 is automatically pushed (step S23). Thereby, photographing of the subject is carried out. On the other hand, when the edges are less than the threshold, respectively, at step S20, step S21 and step S22 (NO route), the control returns to step S15 to continue the face image recognition and judgment operation and the edge detection operation.

As described above, features of respective portions of the face are characterized by the edge. Therefore, the edge in each portion has a peculiar threshold, and it is possible to judge by comparing the edge detection value from the edge detector 26 with these thresholds. Thereby, control waits until the edge detection value exceeds the threshold, or the operation of the edge detector 26 is continued. As a result, a clear picture of the image of each portion can be reliably taken.

In the above explanation, the edge detection operation is continued until the edge detection value exceeds the threshold. However, in this case, time may be required for the detection. Therefore, allowable ranges may be given to the detection time and the threshold, and when the tolerance is exceeded, the image data may be fetched, or the release button may be pushed to carry out photographing. Thereby, when the edge detection value from the edge detector 26 exceeds a predetermined threshold for a predetermined period of time, the image data is fetched, or the release button is pushed, and hence the operation time is accelerated.

FOURTH EXAMPLE

Figure 30:
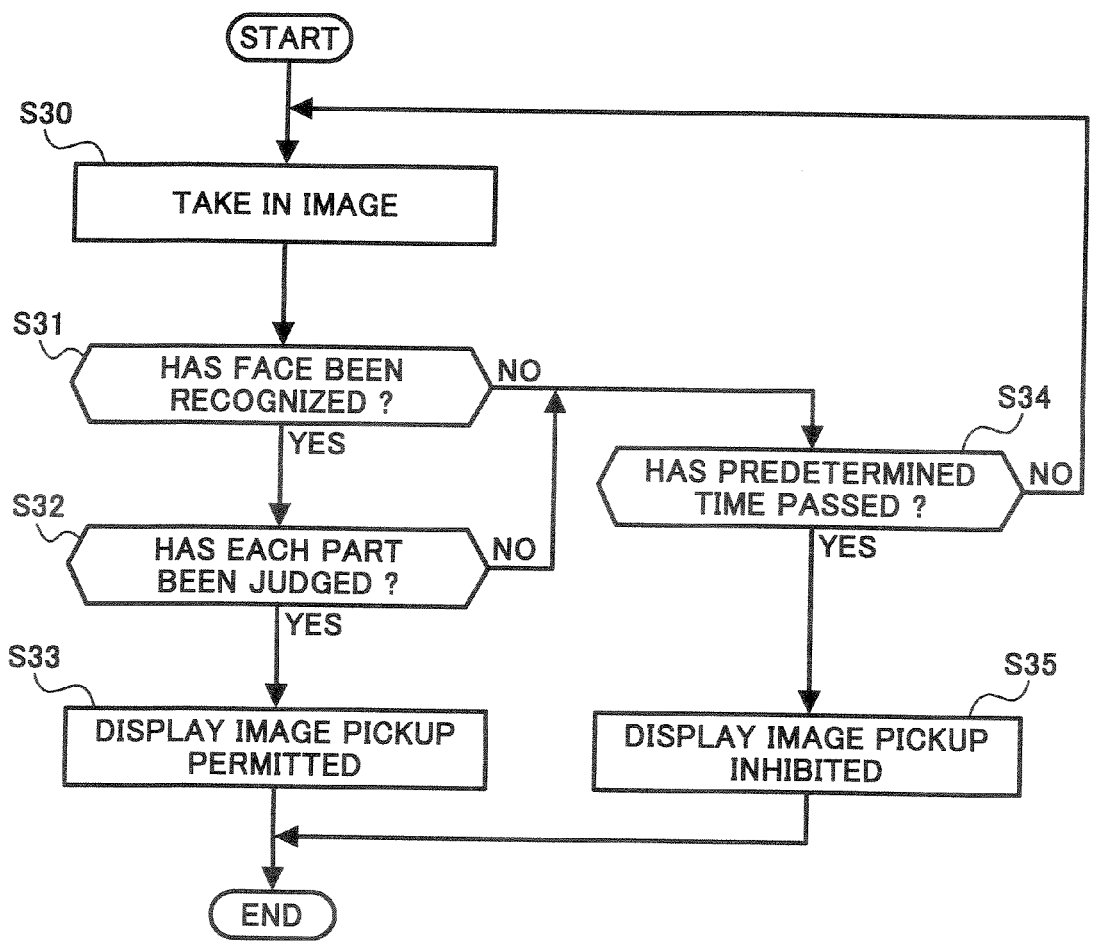
FIG. 30 is a flowchart which explains a fourth example.

FIG. 30 is a flowchart which explains a fourth example of the digital camera. Explanation will be made, with reference to FIG. 30, together with FIG. 25 and FIG. 26. The image data of the subject is photoelectrically exchanged by the CCD in FIG. 1 and image processed, and then stored in the image memory 20 in the face recognition processor. The image data is taken into the image fetch section 21 in a predetermined unit (frame, byte) (step S30) The image data is input to the recognition and judgment section 23, and subjected to face recognition and judgment of each portion of the face, from the data in the face characteristic storage section 24 which stores various face characteristic data stored in advance. This recognition method is carried out based on various algorithms. The result thereof is transmitted in detail to the control section 22, and the face image is recognized (step S31), and each portion is judged from the data (step S32). As a result, when the face image is recognized and each portion is judged (YES route), it is displayed on the LCD in the display section 8 in FIG. 1 that photographing is possible (step S33). When it is judged NO at step S31 or step S32, it is judged whether predetermined time has passed (step S34), and if the predetermined time has passed (YES route), it is displayed on the LCD in the display section 8 in FIG. 25 that photographing is not possible (step S35).

As described above, it is necessary for a photographer to recognize when judgment of the face image has finished. Therefore, it is preferable that a liquid crystal display unit or the like be provided in the camera. Thereby, when the conditions for photographing are satisfied, this matter is displayed on the display section 8. As a result, the shutter chance can be caught precisely, thereby improving the operability. If the conditions for photographing are not satisfied, this matter is displayed on the display section 8. As a result, the photographer can carry out the subsequent operation quickly.

FIFTH EXAMPLE

Figure 31:
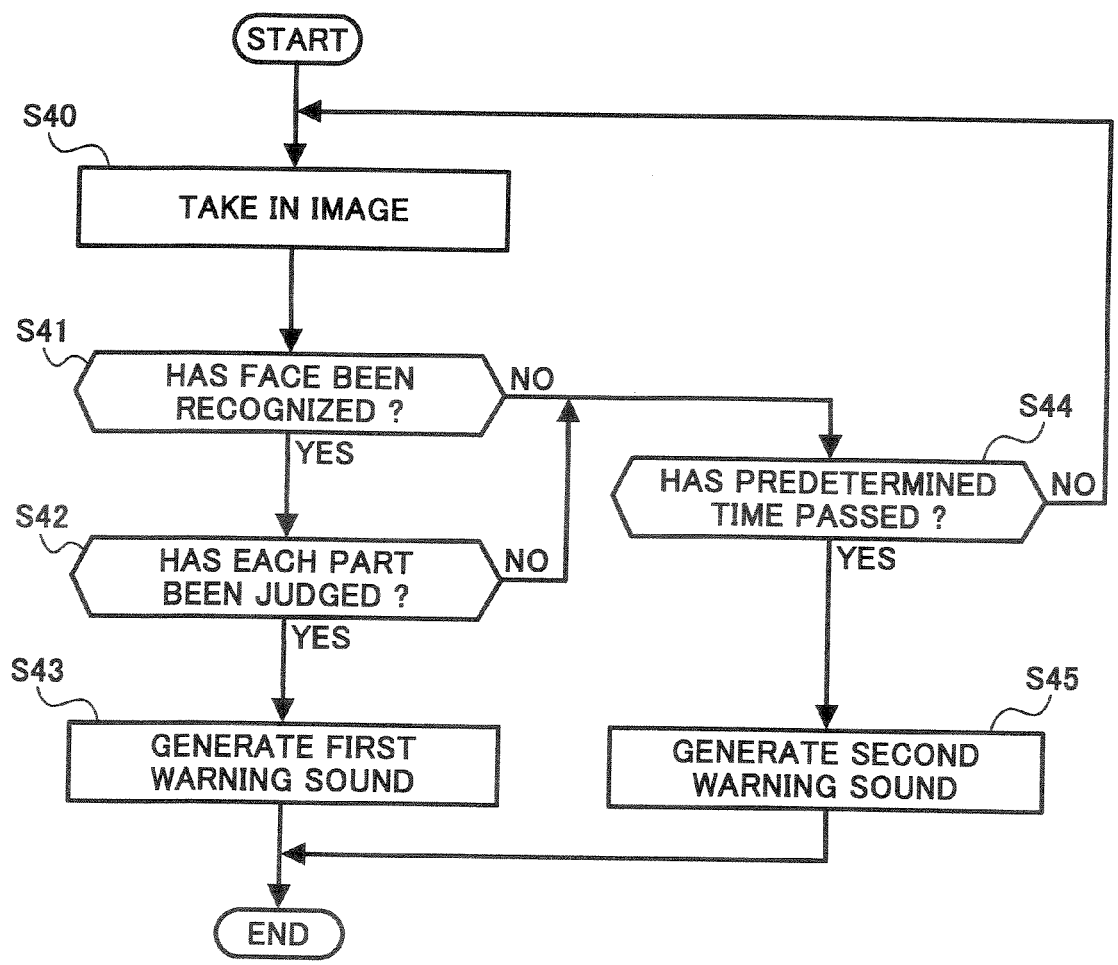
FIG. 31 is a flowchart which explains a fifth example.

FIG. 31 is a flowchart which explains a fifth example of the digital camera. Explanation will be made, with reference to FIG. 31, together with FIG. 27 and FIG. 28. The image data of the subject is photoelectrically exchanged by the CCD 3 in FIG. 1 and image processed, and then stored in the image memory20 in the face recognition processor 18. The image data is taken into the image fetch section 21 in a predetermined unit (frame, byte) (step S40) The image data is input to the recognition and judgment section 23, and subjected to face recognition and judgment of each portion of the face, from the data in the face characteristic storage section 24 which stores various face characteristic data stored in advance. This recognition method is carried out based on various algorithms. The result thereof is transmitted in detail to the control section 22, and the face image is recognized (step S41), and each portion is judged from the data (step S42). As a result, when the face image is recognized and each portion is judged (YES route), a first warning sound is generated by a sound producing device (not shown) in the camera operation section 17 in FIG. 25 (step S43). If the judgment result is NO at step S41 or step S42, it is judged if predetermined time has passed (step S44), and when predetermined time has passed (YES route), a second warning sound is generated by the sound producing device (not shown) in the camera operation section 17 in FIG. 25 (step S45).

As described above, it is necessary for a photographer to recognize when judgment of the face image has finished. But the photographer does not always watch the display section. Therefore, by judging by sound, it becomes easy for the photographer to recognize. As a result, when photographing conditions are satisfied, sound is generated by the sound producing device, and hence the user will not fail to notice the display, thereby further improving the operability. After the predetermined time has passed, when the photographing conditions are not satisfied, the image pickup device generates sound by the sound producing device. Thereby, the photographer can carry out the subsequent operation quickly If the sound producing device generates only one type of sound, regardless of the warning content, it cannot be judged which warning it is. Therefore, it is preferable to change the sound depending on the warning content. As a result, the warning content can be judged, thereby further improving the operability.

In the explanation above, the photographer does not always photograph a human object, or there is a human object which the photographer does not want to photograph. Therefore, if the photographer can select either of automatic pressing of the release button and manual pressing thereof, the operability of the photographer can be further improved.

Fifth Embodiment

A digital camera according to a fifth embodiment will be explained below, with reference to FIG. 25 and FIG. 32 to FIG. 36. In the fifth embodiment, such a digital camera that face image is judged, to thereby cut out a face image whose size and inclination are automatically corrected, and the cut out face image is stored as a separate image file will be explained. The block configuration of the digital camera according to the fifth embodiment is the same as that of the fourth embodiment (FIG. 25), and the common portions will not be explained here, and only a different portion will be explained.

Figure 32:
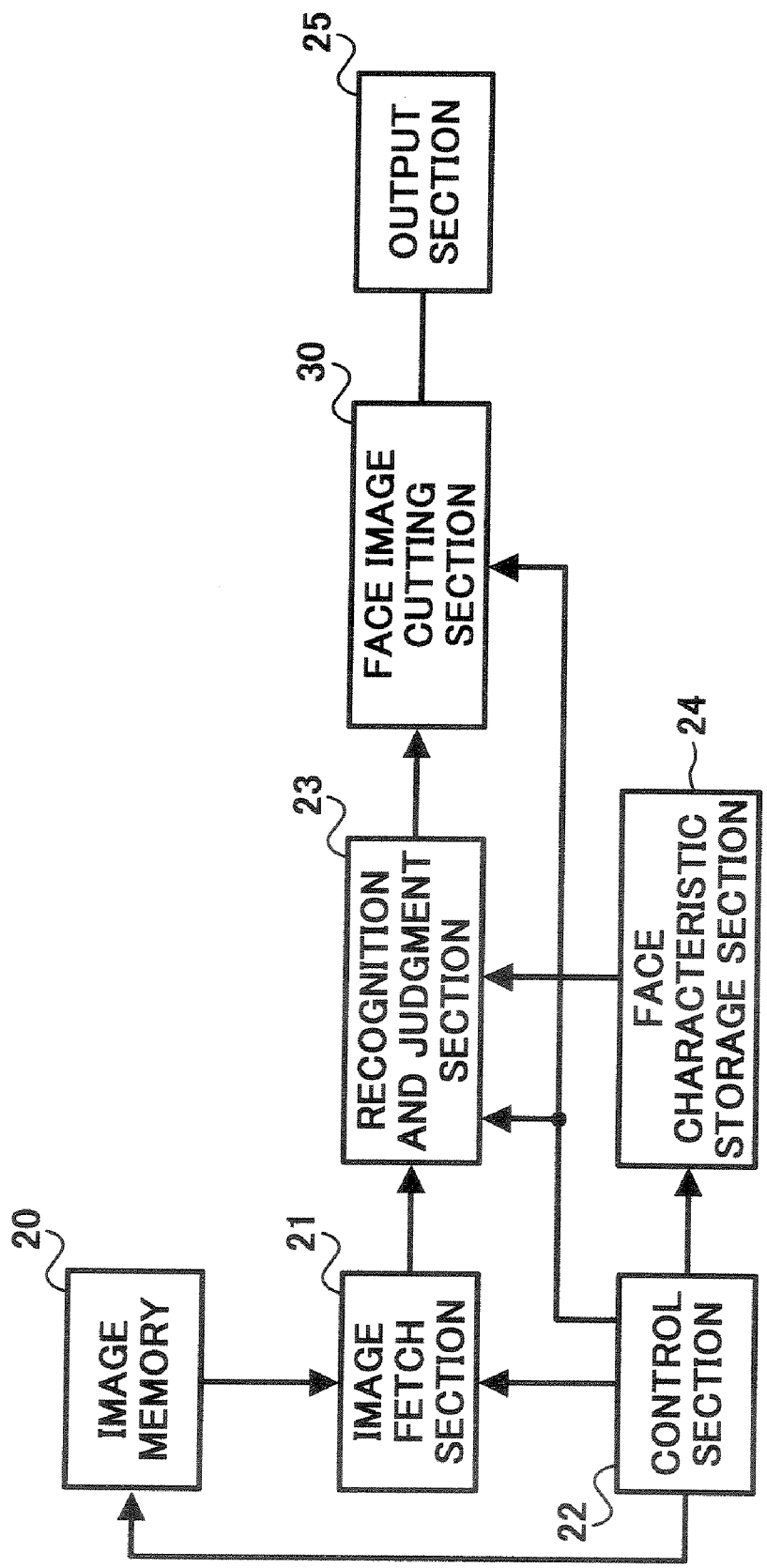
FIG. 32 is a schematic block diagram which shows a face recognition processor in a digital camera in a fifth embodiment.

FIG. 32 is a schematic block diagram of the face recognition processor 18 in FIG. 25. As shown in FIG. 32, the face recognition processor 18 comprises, an image memory 20 which stores one image of the subject, an image fetch section 21 which takes an image from the image memory 20 to another memory or register in a predetermined unit, a control section 22 which takes charge of the overall control, a face characteristic storage section 24 which stores a plurality of characteristics of a face, a recognition and judgment section 23 which recognizes a face from the data from the image fetch section 21 and the data from the face characteristic storage section 24 and judges each portion, a face image cutting section 30 which cuts out a predetermined face image from the result data, and an output section 25 which outputs the final judgment result to the outside. The image memory 20 may use the frame memory 6 in FIG. 25. The other portions may be realized by the MC 14 in FIG. 25, or may be realized by a dedicated LSI. The recognition and judgment section 23 and the face characteristic storage section 24 mainly constitute the face image recognition unit and the face portion judgment unit.

Figure 33:
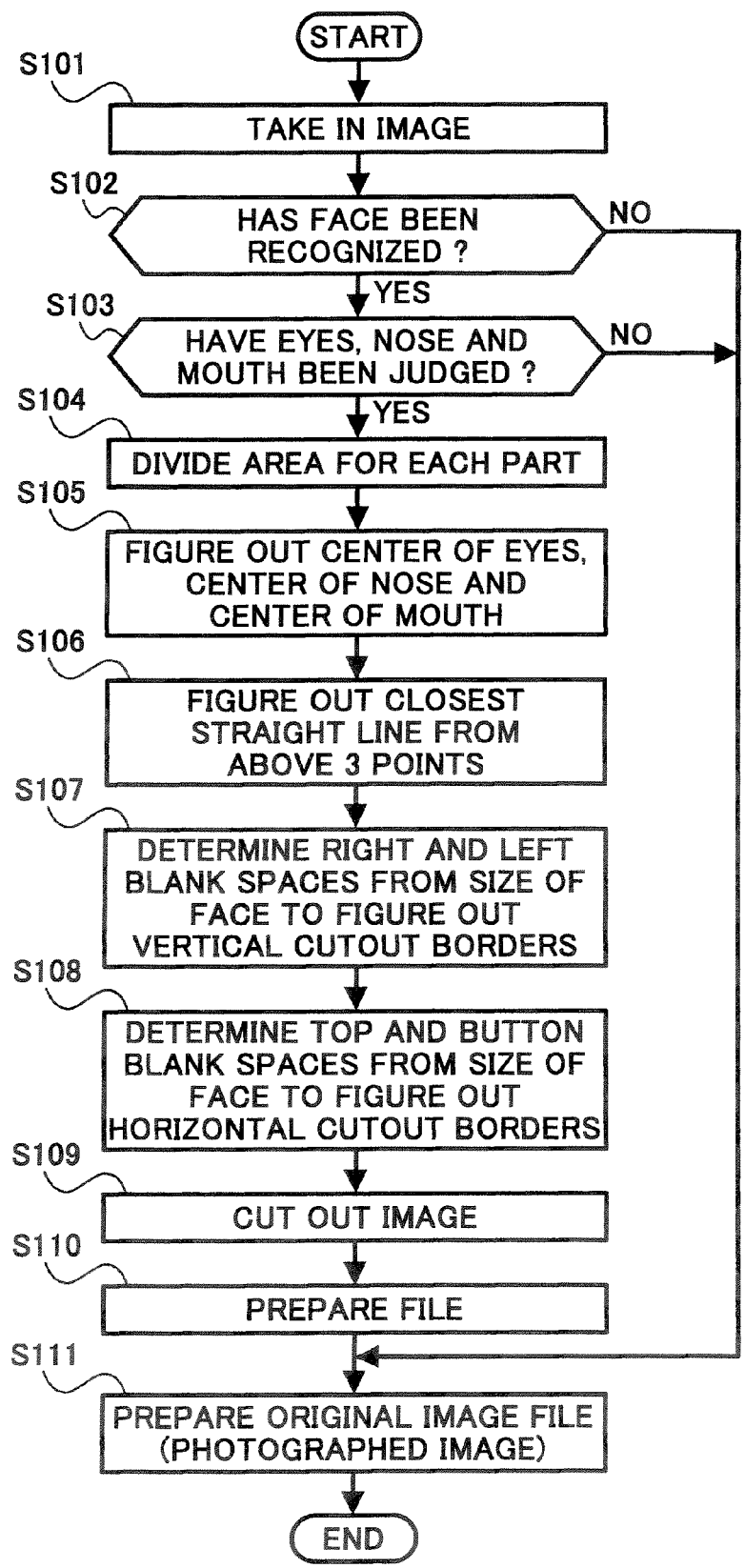
FIG. 33 is a flowchart which explains the operation of the digital camera according to the fifth embodiment.
Figure 34:
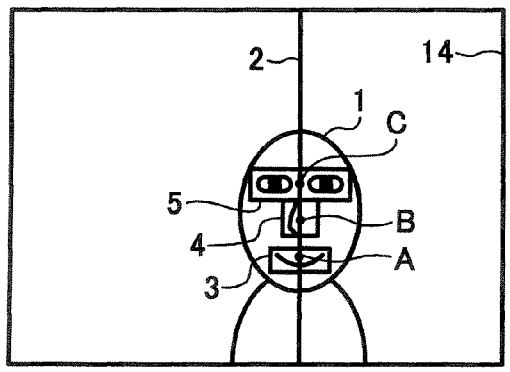
FIG. 34 is a diagram (1) which explains a face image.
Figure 35:
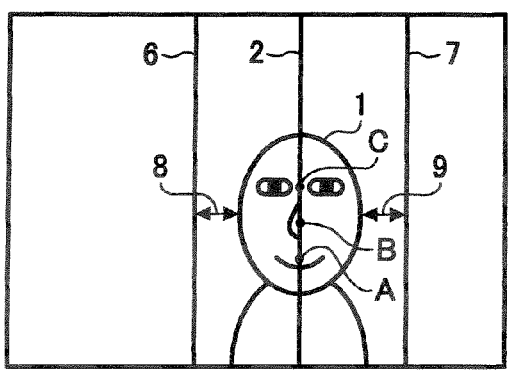
FIG. 35 is a diagram (2) which explains the face image.
Figure 36:
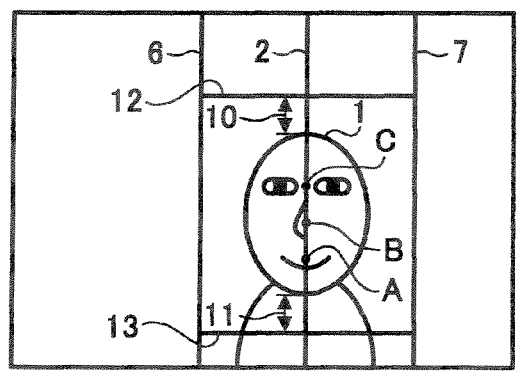
FIG. 36 is a diagram (3) which explains the face image.

FIG. 33 is a flowchart which explains the operation of the digital camera according to the fifth embodiment. FIG. 34 to FIG. 36 are diagrams which show a face image. The operation of the digital camera according to the fifth embodiment will be explained based on the flowchart in FIG. 33, with reference to FIG. 34 to FIG. 36.

In FIG. 33, the image data of the subject is photoelectrically exchanged by the CCD 3 in FIG. 1 (?) and image processed, and then stored in the image memory 20 in the face recognition processor 18 shown in FIG. 34. The image data is taken into the image fetch section 21 in a predetermined unit (frame, byte) (step S101). The image data is input to the recognition and judgment section 23, and subjected to face recognition and judgment of each portion of the face, from the data in the face characteristic storage section 24 which stores various face characteristic data stored in advance. This recognition method is carried out based on various algorithms. The result thereof is transmitted in detail to the control section 22, and the face image is recognized (step S102), and each portion (eyes, nose and mouth) is judged from the data (step S103). As a result, when the face image is recognized and each portion is judged (YES route), control proceeds to step S104.

The control section 22 divides the area of a face image 1 for each part. Specifically, as shown in FIG. 34, the control section 22 divides the face image into three parts, that is, mouth part 3, nose part 4, and eye part 5 (step S104). The control unit 22 then figures out center A of the mouth, center B of the nose and center C of the eyes (step S105), and calculates a straight line 2 closest to the three points A, B and C (step S106). The straight line 2 is cut out so that it becomes parallel with the vertical direction of a frame 14 of the cut out image. As described above, the most suitable portion for identifying a human object is a face, and hence a face image 1 is extracted from the subject image, and only when the respective parts such as the mouth 3, the nose 4 and the eyes 5 are judged from the face image, a clear image can be photographed. The respective parts are arranged substantially symmetrically with respect to the central line 2 of the face. Therefore, if the straight line 2 connecting the central points A, B and C of the respective parts is cut out so as to be parallel with the vertical direction of the frame 14 of the face image 1, the face can be cut out without being inclined.

As shown in FIG. 35, right and left blank spaces 8 and 9 are determined from the size of the face image 1, to figure out vertical cutout borders 6 and 7 (step S107). Subsequently, as shown in FIG. 38, top and bottom blank spaces 10 and 11 are determined from the size of the face image 1, to figure out horizontal cutout borders 12 and 13 (step S108) The face image 1 is then cut out along the cutout borders 6, 13, 7 and 12 figured out at steps S107 and S108 (step S109).

The most important point in the photograph for certificate is that the image quality is high and it is well balanced between the background and the face in the image face. The balance is determined by a ratio between the blank spaces right and left and top and bottom and the face on the face image face to be cut out. In general, the right and left blank spaces 8 and 9 are made equal, and the top and bottom blank spaces 10 and 11 are determined such that the bottom blank space 11 is made larger than the top blank space 10 This is because there are a neck and a breast at the bottom. As described above, since the blank spaces right and left and top and bottom in the face image face to be cut out are at a certain ratio with respect to the size of the face photographed on the face image face to be cut out, a well-balanced photograph can be produced.

A file of the cut out face image is prepared (step S110), and a file of the original image (photographed image) is prepared (step S111). When the cut out face image and the original image are filed, it is desired to associate these files with each other. As a method therefor, for example, there can be used a method in which the same file name is given thereto, but the type or extension is changed, such that the original image is named as Rimg0001.jpg, and the face image is named as Rimg0001.tif. The image file name is formed by 8 characters, and the upper 4 characters maybe formed by optional alphabets or figures, and the lower 4 characters may be formed by figures. Further, there may be adopted a method in which the upper 4 characters may be different between the original image and the face image, and the lower 4 characters may be the same value (original image, Rimg0001.jpg, face image, Rpic0001.jpg). As a result, the data of the recognized face image face and the data of the face image face cut out from the face image face are stored as files based on a predetermined relation, and hence organizing the original data and the cut out face data becomes easy.

The feature of the photographs for certificate is that the background is painted in a particular color. This is because the human object becomes remarkable thereby. However, when preparing a photograph for certificate from a normal photograph, in many cases, some background is photographed. Therefore, the background may be painted in a predetermined color. The face image referred to herein indicates also a body portion integral with the face.

If the image area to be cut out on the display section 8 can be made visual, the cut out area can be recognized most clearly. Therefore, it is desired to display the face image area to be cut out by a frame. As a result, the cut out area can be clearly recognized, and the operability is improved.

The photographed image and the cut out image are not always necessary images. Therefore, the configuration may be such that at this time, a user observes these images on the display section 8, and can select recording or deletion by the camera operation section 17. As a result, the operability can be improved, and the effective use of the memory becomes possible.

As described above, the most important point in the photograph for certificate is that the image quality is high and it is well balanced between the background and the face in the image face. Particularly, one index for judging the quality of the image is the area of the face. That is, it can be said that as this area increases, the image quality becomes better. Since the pixel density per unit area of the CCD, which photoelectrically exchanges the image, is constant, as this area increases, the sum total of number of pixels increases. Therefore, since the area and the image quality are in a proportional relation, the area of the face can be determined by the sum total of number of pixels which are occupied by the area, and hence the image quality can be judged accurately by a simple control. Therefore, when the area of the face in the image (image for one frame) displayed on the display section 8 is smaller than a predetermined area, this image may not be recorded. Thereby, wasteful use of the memory can be prevented, thereby it can be prevented to take a picture for certificate of poor quality.

According to the image pickup device of a first aspect, in an image pickup device which has an automatic focusing function, the image pickup device comprises, an image pickup unit which inputs image data corresponding to a subject, a face detection unit which detects a human face from the image data input from the image pickup unit, and an automatic focusing control unit which performs automatic focusing control, designating at least a part of the human face detected by the face detection unit as a ranging area. Therefore, the automatic focusing operation can be executed by designating the human face in the screen as a ranging area, to bring the human face into focus, regardless of the position of the human object in the screen. As a result, photographing of the human object becomes possible, without changing the composition between at the time of the automatic focusing operation and at the time of photographing.

According to the image pickup device of a second aspect, since a notification unit for notifying a user that a human face has been detected by the face detection unit is provided, it becomes possible to notify the user of the judgment result of face detection, so that the user can confirm whether the face detection has a malfunction, and hence photographing error by the user can be prevented, in addition to the effect of the invention according to the first aspect.

According to the image pickup device of a third aspect, when a plurality of faces are detected by the face detection unit, the automatic focusing control unit carries out the automatic focusing control, designating at least a part of the face closest to the central portion as the ranging area. Hence, a main subject can be brought into focus at a high probability. Even in an aggregate photograph, it is possible to increase the possibility that faces at the front, back, right, and left of the face in the center are also brought into focus at a high probability.

According to the image pickup device of a fourth aspect, the image pickup device comprises a ranging area selection unit by which, when a plurality of faces are detected by the face detection unit, a user selects the ranging area from the faces, and the automatic focusing control unit carries out the automatic focusing control, based on the ranging area selected by the ranging area selection unit. As a result, it is possible for a user to select which human object is to be focused.

According to the image pickup device of a fifth aspect, the image pickup device comprises a face detection operation setup unit, by which a user sets permission/inhibition of the face detection operation of the face detection unit. When permission of the face detection operation of the face detection unit is set by the face detection operation setup unit, the automatic focusing control unit allows the face detection unit to execute the face detection operation, to thereby perform the automatic focusing control by designating at least a part of the detected human face as the ranging area. On the other hand, when inhibition of the face detection operation of the face detection unit is set by the face detection operation setup unit, the automatic focusing control unit carries out the automatic focusing control, without allowing the face detection unit to execute the face detection operation. As a result, the user sets permission/inhibition of the face detection operation, and hence unnecessary face detection operation can be omitted, thereby enabling prompt photographing.

According to the image pickup device of a sixth aspect, the image pickup device comprises a mode setup unit which sets a first photographing mode for performing automatic focusing by executing the face detection operation of the face detection unit, or a second photographing mode for performing automatic focusing without executing the face detection operation of the face detection unit. When the first photographing mode is set by the mode setup unit, the automatic focusing control unit allows the face detection unit to execute the face detection operation, to thereby perform automatic focusing control by designating at least a part of the detected human face as the ranging area. On the other hand, when the second photographing mode is set by the mode setup unit, the automatic focusing control unit carries out the automatic focusing control, without allowing the face detection unit to execute the face detection operation. As a result, when the automatic focusing is to be performed, the human object photographing and the landscape photographing can be easily discriminated, by dividing the mode into a photographing mode in which face recognition is performed (first photographing mode) and a photographing mode in which face recognition is not performed (second photographing mode).

According to the image pickup device of a seventh aspect, when a human face is detected, the face detection unit further detects eyes, and when the eyes are detected by the face detection unit, the automatic focusing control unit carries out the automatic focusing control, designating at least a part of the eyes as the ranging area. As a result, it is possible to take a picture in which the eyes are focused.

According to the image pickup device of an eighth aspect, when a human face is detected, the face detection unit further detects the eyes, a nose and a mouth, and the image pickup device further comprises a second ranging area selection unit, by which when the eyes, the nose and the mouth are detected by the face detection unit, a user selects the ranging area from the eyes, the nose and the mouth. The automatic focusing control unit carries out the automatic focusing control, based on the ranging area selected by the second ranging area selection unit. Therefore, the user can bring a portion of a face into focus, where the user wants to focus, and hence the user's intention for photographing can be reflected.

According to the image pickup device of a ninth aspect, the automatic focusing control unit performs automatic focusing control by setting the size of the ranging area, based on the size of the human face detected by the face detection unit. As a result, it is possible to improve the focusing accuracy.

According to the image pickup device of a tenth aspect, the image pickup device further comprises a ranging area size selection unit for a user to select the size of the ranging area. The automatic focusing control unit performs the automatic focusing control by setting the ranging area of a size selected by the ranging area size selection unit. As a result, the focusing accuracy can be improved, when a particular portion in the face is brought into focus.

According to the image pickup device of an eleventh aspect, every time the automatic focusing control unit performs the automatic focusing control, designating at least apart of the human face detected by the face detection unit as the ranging area, the automatic focusing control unit stores the ranging result in a memory, and predicts the next focusing position from the past ranging results stored in the memory. As a result, the next focusing position is predicted from the past focusing position, and focusing can be performed promptly, thereby enabling prompt photographing.

According to an automatic focusing method of a twelfth aspect, the method comprises, an image input step of inputting image data corresponding to a subject, a face detection step of detecting a human face from the image data input at the image input step, and an automatic focusing control step of performing automatic focusing control, designating at least a part of the human face detected at the face detection step as a ranging area. Therefore, by executing the automatic focusing operation, designating the human face in the screen as the ranging area, the human face can be brought into focus, regardless of the position of the human object in the screen. As a result, photographing of a human object becomes possible, without changing the composition between at the time of the automatic focusing operation and at the time of photographing.

According to a program to be executed by a computer according to a thirteenth aspect, a computer executes the program to realize an image input step of inputting image data corresponding to a subject, a face detection step of detecting a human face from the image data input at the image input step, and an automatic focusing control step of performing automatic focusing operation, designating at least a part of the human face detected at the face detection step as a ranging area. Therefore, by executing the program by a computer, automatic focusing operation is executed, designating the human face in the screen as the ranging area, the human face can be brought into focus, regardless of the position of a human object in the screen. As a result, photographing of the human object becomes possible, without changing the composition between at the time of the automatic focusing operation and at the time of photographing.

According to an image pickup device of a fourteenth aspect, in an image pickup device which has an automatic exposure function, the device comprises, an image pickup unit which inputs image data corresponding to a subject, a face detection unit which detects a human face from the image data input from the image pickup unit, a photometric unit which measures optical intensity, designating the human face detected by the face detection unit as a photometric area, and an exposure control unit which calculates the exposure based on the photometric result of the human face by the photometric unit, and performs exposure control based on the calculated exposure. As a result, it is possible to properly expose the human object, regardless of the position and range of the human object in the screen.

According to the image pickup device of a fifteenth aspect, the photometric unit further measures the optical intensity by designating the whole screen as the photometric area, and the exposure control unit calculates the exposure by giving more weight to the photometric result of the human face compared with the photometric result of the whole screen, based on the photometric result of the human face and the photometric result of the whole screen by the photometric unit. As a result, it is possible to properly expose the background as well as the human object.

According to the image pickup device of a sixteenth aspect, the exposure control unit selects either of a first photometric method in which the exposure is calculated based on the photometric result of the human face, and a second photometric method in which the exposure is calculated by giving more weight to the photometric result of the human face compared with the photometric result of the whole screen, based on the photometric result of the human face and the photometric result of the whole screen, corresponding to the ratio of the face occupying in the screen or the position of the face or both. As a result, it becomes possible to prevent insufficient exposure for both the human object and the background.

According to the image pickup device of a seventeenth aspect, the device further comprises a photometric method selection unit, by which a user can select either of the first photometric method in which the exposure is calculated based on the photometric result of the human face, and the second photometric method in which the exposure is calculated by giving more weight to the photometric result of the human face compared with the photometric result of the whole screen, based on the photometric result of the human face and the photometric result of the whole screen. Therefore, the user can select which is given much weight to either the photometric result of the whole screen or the photometric result of the face portion. As a result, the user's intention for photographing can be reflected.

According to the image pickup device of an eighteenth aspect, the device comprises a weighting setup unit, by which a user sets weighting to the photometric result of the human face with respect to the photometric result of the whole screen. Therefore, when the exposure is adjusted based on the photometric result of the human face and the photometric result of the whole screen, the user's intention for photographing can be reflected.

According to the image pickup device of a nineteenth aspect, the exposure control unit sets weighting to the photometric result of the human face with respect to the photometric result of the whole screen, based on the ratio of the face occupying in the screen or the position of the face or both. Therefore, if the ratio of the face occupying in the screen is large, weighting to the photometric result of the face portion is increased, and if the ratio of the face occupying in the screen is small, weighting to the photometric result of the face portion is decreased, thereby enabling well-balanced exposure between the face and the background.

According to the image pickup device of a twentieth aspect, the device comprises a face detection operation setup unit, by which a user sets permission/inhibition of the face detection operation of the face detection unit. When permission of the face detection operation of the face detection unit is set, the exposure control unit allows the face detection unit to execute the face detection operation, to thereby perform the exposure control based on the photometric result of the detected human face. When inhibition of the face detection operation of the face detection unit is set, the exposure control unit performs the exposure control, without allowing the face detection unit to execute the face detection operation. As a result, the user can inhibit face detection, thereby the user can prevent execution of unnecessary face detection.

According to the image pickup device of a twenty-first aspect, the device comprises a mode setup unit for setting a first photographing mode in which exposure control is performed by executing the face detection operation of the face detection unit, or a second photographing mode in which exposure control is performed without executing the face detection operation of the face detection unit. When the first photographing mode is set, the exposure control unit allows the face detection unit to execute the face detection operation, to thereby perform exposure control based on the photometric result of the detected human face. When the second photographing mode is set, the exposure control unit performs exposure control without allowing the face detection unit to execute the face detection operation. As a result, by changing the photographing mode, the user can easily select acceptance or refusal of the face detection, and hence photographing suitable for the application of the user can be performed.

According to the image pickup device of a twenty-second aspect, since a notification unit for notifying a user of the detection result of the human face by the face detection unit is provided, the user can judge whether the face detection has been operated normally. When a malfunction occurs, photographing is stopped, thereby a photographing failure can be prevented.

According to the image pickup device of a twenty-third aspect, the notification unit is a monitor screen for displaying the image data. Therefore, it becomes possible to notify the user of the result of the face detection operation, such as the face in the screen and the position and range of the detected face, on the monitor screen.

According to the image pickup device of a twenty-fourth aspect, the notification unit is a sub-LCD for displaying the operation condition or the like of the image pickup device. As a result, in the image pickup device according to the ninth aspect, it becomes possible to notify a user of the face detection result in a cheap configuration.

According to the image pickup device of a twenty-fifth aspect, since the notification unit is an LED, in an image pickup device which has no monitor screen or even when the user does not use the monitor screen in an image pickup device which has a monitor screen, it becomes possible to notify the user of the face detection result.

According to the image pickup device of a twenty-sixth aspect, when a human face cannot be detected by the face detection unit, the exposure control unit performs exposure control based on the photometric result of another photometric method. Therefore, in addition to the effect of the image pickup device according to the first aspect, even if a face cannot be detected, photographing as good as the conventional image pickup device is made possible, without causing a big failure.

According to the exposure control method of a twenty-seventh aspect, there are provided, an image input step of inputting image data corresponding to a subject, a face detection step of detecting a human face from the image data input at the image input step, a photometric step of measuring optical intensity, designating the human face detected at the face detection step as a photometric area, and an exposure control step of calculating the exposure based on the photometric result of the human face at the photometric step, and performs exposure control based on the calculated exposure. As a result, it becomes possible to properly expose a human object, regardless of the position and range of the human object in the screen.

According to the program to be executed by a computer according to a twenty-eighth aspect, the computer executes the program to realize, an image input step of inputting image data corresponding to a subject, a face detection step of detecting a human face from the image data input at the image input step, a photometric step of measuring optical intensity, designating the human face detected at the face detection step as a photometric area, and an exposure control step of calculating the exposure based on the photometric result of the human face at the photometric step, and performing exposure control based on the calculated exposure As a result, it becomes possible to properly expose a human object, regardless of the position and range of the human object in the screen.

According to the image pickup device of a twenty-ninth aspect, in an image pickup device provided with an electronic flash function, the device comprises, an image pickup unit which inputs image data corresponding to a subject, a face detection unit which detects a human face from the image data input from the image pickup unit, an electronic flashing unit for emitting electronic flash light, and an electronic flash control unit which controls the electronic flashing unit based on the detection result of the human face by the face detection unit. As a result, there is the effect that it is judged whether a human object is to be photographed, and light emission suitable for the human object photographing can be automatically carried out.

According to the image pickup device of a thirtieth aspect, when a human face is detected by the face detection unit, the electronic flash control unit allows the electronic flashing unit to perform red-eye preventing emission, and then to perform the main emission. As a result, there is the effect that it is automatically judged whether a human object is to be photographed, to automatically perform the red-eye preventing emission, and hence it is not necessary for a user to change to the red-eye emission mode.

According to the image pickup device of a thirty-first aspect, the device comprises a red-eye preventing emission mode setup unit, by which a user sets a red-eye preventing emission mode in which red-eye preventing emission is carried out. When the red-eye preventing emission mode is set by the red-eye preventing emission mode setup unit, and when a human face is detected by the face detection unit, the electronic flash control unit allows the electronic flashing unit to perform red-eye preventing emission, and then to perform the main emission. When the red-eye preventing emission mode is not set by the red-eye preventing emission mode setup unit, and when a human face is detected by the face detection unit, the electronic flash control unit allows the electronic flashing unit to perform only the main emission, without allowing the electronic flashing unit to perform the red-eye preventing emission. Therefore, the user can select whether the red-eye photographing is to be performed or not, and when the user does not want to carry out the red-eye emission, the user can inhibit the red-eye emission. As a result, there is the effect that photographing using a good shutter chance becomes possible.

According to the image pickup device of a thirty-second aspect, when a human face is detected by the face detection unit, and when a ratio of the face occupying in the screen is not smaller than a predetermined value, the electronic flash control unit sets the electronic flash light quantity of the electronic flashing unit to a weak level. Therefore, there is the effect that when a ratio of the face occupying in the screen is not smaller than a predetermined value, it is judged that close-up of a face is to be shot, and the electronic flash light quantity is set to a weak level, thereby preventing a blanking which occurs because the electronic flash light is irradiated on the face strongly.

According to the image pickup device of a thirty-third aspect, since the device comprises a weak emission quantity setup unit, by which a user sets a quantity to weaken the electronic flash light quantity. Therefore, there is the effect that the user can set the quantity to weaken the electronic flash light, thereby enabling photographing corresponding to the situation.

According to the image pickup device of a thirty-fourth aspect, the device comprises a backlight judgment unit which compares the brightness of the face portion detected by the face detection unit with the ambient brightness, and judges to be backlight when the brightness of the face portion is darker than the ambient brightness by at least a predetermined value. When it is judged to be backlight by the backlight judgment unit, the electronic flash control unit allows the electronic flashing unit to emit electronic flash light. Therefore, even if a human object is not in the center of the screen, it can be judged to be backlight, and hence there is the effect that electronic flash light can be emitted for correcting the backlight.

According to the image pickup device of a thirty-fifth aspect, the device comprises a backlight electronic flash setup unit, by which a user sets whether the electronic flashing unit is allowed to emit electronic flash light, when it is judged to be backlight by the backlight judgment unit As a result, there is the effect that the user can select whether backlight correction is to be performed by the electronic flash light, and hence it becomes possible to correspond to the user's intention for photographing and the situation.

According to the image pickup device of a thirty-sixth aspect, the device comprises a face detection operation setup unit, by which a user sets whether the electronic flashing unit is to be controlled, based on the detection result of the human face by the face detection unit. Therefore, there is the effect that the user can inhibit the face detection operation, thereby enabling photographing corresponding to the situation.

According to the image pickup device of a thirty-seventh aspect, the device comprises a notification unit for notifying a user of the detection result of a human face by the face detection unit. Therefore, the user can judge whether the face recognition processing has been operated normally, and if a malfunction occurs, photographing is stopped. As a result, there is the effect that a photographing failure can be prevented.

According to an electronic flash control method of a thirty-eighth aspect, the method comprises an image input step of inputting image data corresponding to a subject, a face detection step of detecting a human face from the image data input by the image pickup unit, and an electronic flash control step of controlling the electronic flashing unit for emitting the electronic flash light, based on the detection result of a human face at the face detection step. As a result, there is the effect that it is automatically judged whether a human object photographing is to be performed, to automatically perform light emission suitable for human object photographing.

According to a program to be executed by a computer according to a thirty-ninth aspect, the computer executes the program to realize an image input step of inputting image data corresponding to a subject, a face detection step of detecting a human face from the image data input by the image pickup unit, and an electronic flash control step of controlling the electronic flashing unit for emitting the electronic flash light, based on the detection result of a human face at the face detection step. As a result, there is the effect that it is automatically judged whether a object photographing is to be performed, to automatically perform light emission suitable for human object photographing.

According to the image pickup device of a fortieth aspect, when each portion in the face image can be judged by the face portion judgment unit, a release button for executing photographing of the subject is automatically pressed, or the photographing operation is carried out. As a result, the operability is improved, and a clear image can be photographed, without losing a shutter chance.

According to the image pickup device of a forty-first aspect, when all of the respective portions in the face image cannot be judged, the operation of the face portion judgment unit is continued until all of the respective portions in the face image can be judged. As a result, a clear image can be photographed.

According to the image pickup device of a forty-second aspect, only when all of the respective portions in the face image can be judged, the image data is stored. As a result, the operability is improved, and wasteful use of the memory can be eliminated.

According to the image pickup device of a forty-third aspect, control waits until the edge detection value exceeds the threshold, or the operation of the edge detection unit is continued, until the edge detection value exceeds the threshold. As a result, an image of each portion can be clearly photographed reliably.

According to the image pickup device of a forty-fourth aspect, when the edge detection value of the edge detection unit exceeds a predetermined threshold for a predetermined period of time, the image data is taken in, or the release button is pressed. As a result, the operation time becomes fast.

According to the image pickup device of a forty-fifth aspect, when photographing conditions are satisfied, this matter is displayed on the display unit. As a result, a shutter chance can be caught precisely, thereby improving the operability.

According to the image pickup device of a forty-sixth aspect, when the photographing conditions are not satisfied, this matter is displayed on the display unit. As a result, the operation to be taken next by the photographer can be taken quickly.

According to the image pickup device of a forty-seventh aspect, when the photographing conditions are satisfied, sound is generated by the warning unit. As a result, a user does not fail to notice the display, thereby further improving the operability.

According to the image pickup device of a forty-eighth aspect, the warning unit generates sound, when the photographing conditions are not satisfied after a predetermined period of time has passed. As a result, the operation to be taken next by the photographer can be taken quickly.

According to the image pickup device of a forty-ninth aspect, a frequency or a melody of the sound is changed when the image pickup device satisfies the photographing conditions or does not satisfy the photographing conditions. As a result, the warning contents can be judged, thereby further improving the operability.

According to the image pickup device of a fiftieth aspect, when it is selected not to press the release button by the selection unit, the release button is to be pressed manually. Therefore, the operability of the operator is further improved.

According to the image pickup device of a fifty-first aspect, when the face image is recognized by the face image recognition unit, the face image portion is cut out and stored as a separate image file. As a result, even if the face is at the edge of the image at the time of photographing, a photograph for certificate can be produced therefrom.

According to the image pickup device of a fifty-second aspect, the face image portion is cut out so that a straight line connecting the substantial central points of each portion of the face becomes parallel with the vertical direction of an image frame to be cut out. As a result, the image can be cut out without the face being inclined.

According to the image pickup device of a fifty-third aspect, since the blank spaces right and left and top and bottom in the cut out face image face are at a certain ratio with respect to the size of the face picked up on the face image face to be cut out, a well-balanced photograph can be produced.

According to the image pickup device of a fifty-fourth aspect, the data of the recognized face image face and the data of the face image face cut out from the face image face are stored as a file, based on a predetermined relation. As a result, organizing the original data and the cut out face data becomes easy.

According to the image pickup device of a fifty-fifth aspect, since portions other than the cut out face image are painted over by a predetermined color, the human object can be made more remarkable.

According to the image pickup device of a fifty-sixth aspect, when the face image face is to be cut out, the face image face area to be cut out is displayed by a frame. As a result, the area to be cut out can be recognized clearly, thereby improving the operability.

According to the image pickup device of a fifty-seventh aspect, since recording or deletion of the image can be selected by the selection unit, the operability can be improved and the effective use of the memory can be realized.

According to the image pickup device of a fifty-eighth aspect, when the area of the face occupying in the photographed image is smaller than a predetermined area, the image is not recorded. As a result, wasteful use of the memory can be prevented, and a photograph for certificate having a poor quality can be prevented from being taken.

According to the image pickup device of a fifty-ninth aspect, the area of the face is determined by a sum total of the number of pixels occupied by the area. As a result, the image quality can be accurately judged by simple control.

The present document incorporates by reference the entire contents of Japanese priority documents, 2001-284162 filed in Japan on Sep. 18, 2001, 2001-284163 filed in Japan on Sep. 18, 2001, 2001-304342 filed in Japan on Sep. 28, 2001, 2001-304638 filed in Japan on Sep. 28, 2001 and 2001-304343 filed in Japan on Sep. 28, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image pickup device provided with an electronic flash function, comprising:
   an image pickup unit configured to input image data corresponding to a subject;
   a face detection unit configured to detect a human face from the image data input from the image pickup unit;
   an electronic flashing unit configured to emit electronic flash light; and
   an electronic flash control unit configured to control the electronic flashing unit based on the detection result of the human face by the face detection unit such that when a human face is detected by the face detection unit, when a ratio of an area of the face occupying a screen of the image pickup unit to an area of the screen is equal to or greater than a predetermined value, the electronic flash control unit initially sets the electronic flash light quantity of the electronic flashing unit to a weak level, and when the ratio of the area of the face occupying the screen of the image pickup unit to the area of the screen is less than the predetermined value, the electronic flash control unit does not initially set the electronic flash light quantity of the electronic flashing unit to the weak level.

2. The image pickup device according to claim 1, wherein when a human face is detected by the face detection unit, the electronic flash control unit allows the electronic flashing unit to perform red-eye preventing emission, and then to perform a main emission.

3. The image pickup device according to claim 1, further comprising:
   a red-eye preventing emission mode setup unit, by which a user sets a red-eye preventing emission mode in which red-eye preventing emission is carried out, wherein when the red-eye preventing emission mode is set by the red-eye preventing emission mode setup unit, and when a human face is detected by the face detection unit, the electronic flash control unit allows the electronic flashing unit to perform red-eye preventing emission, and then to perform a main emission, and when the red-eye preventing emission mode is not set by the red-eye preventing emission mode setup unit, and when a human face is detected by the face detection unit, the electronic flash control unit allows the electronic flashing unit to perform only the main emission, without allowing the electronic flashing unit to perform the red-eye preventing emission.

4. The image pickup device according to claim 1, further comprising:

a weak emission quantity setup unit, by which a user sets a quantity to weaken the electronic flash light quantity.

5. The image pickup device according to claim 1, further comprising:
a backlight judgment unit configured to compare the brightness of the face portion detected by the face detection unit with the ambient brightness, and to judge a need for backlight when the brightness of the face portion is darker than the ambient brightness by at least a predetermined value, wherein when the backlight judgment unit judges there is the need for the backlight, the electronic flash control unit allows the electronic flashing unit to emit electronic flash light.

6. The image pickup device according to claim 5, further comprising:
a backlight electronic flash setup unit, by which a user sets whether the electronic flashing unit is allowed to emit electronic flash light, when the backlight judgment unit judges there is the need for the backlight.

7. The image pickup device according to claim 1, further comprising:
a face detection operation setup unit, by which a user sets whether the electronic flashing unit is to be controlled, based on the detection result of the human face by the face detection unit.

8. The image pickup device according to claim 1, further comprising:
a notification unit configured to notify a user of the detection result of a human face by the face detection unit.

9. The image pickup device according to claim 1, wherein the electronic flash control unit further changes electronic flash control unit based on a factor other than the ratio of the area of the face occupying the screen of the image pickup unit to the area of the screen.

10. An electronic flash control method comprising:
inputting image data corresponding to a subject with an image pickup unit;
detecting a human face from the image data input by the image pickup unit;
calculating a ratio of an area of the face occupying a screen of the image pickup unit to an area of the screen when a human face is detected by the detecting; and
controlling an electronic flashing unit for emitting an electronic flash light, based on the detection result of a human face at the detecting such that if the ratio of the area of the face occupying a screen of the image pickup unit to the area of the screen is equal to or greater than a predetermined value, an electronic flash light quantity of the electronic flashing unit is initially set to a weak level, and when the ratio of the area of the face occupying a screen of the image pickup unit to the area of the screen is less than the predetermined value, the electronic flash light quantity of the electronic flashing unit is not initially set to the weak level.

11. A non-transitory computer readable medium including computer executable instructions, wherein the instructions, when executed by a processor, cause the processor to perform a method comprising:
inputting image data corresponding to a subject with an image pickup unit;
detecting a human face from the image data input by the image pickup unit;
calculating a ratio of an area of the face occupying a screen of the image pickup unit to an area of the screen when a human face is detected by the detecting; and
controlling an electronic flashing unit for emitting an electronic flash light, based on the detection result of a human face at the detecting such that if the ratio of the area of the face occupying a screen of the image pickup unit to the area of the screen is equal to or greater than a predetermined value, an electronic flash light quantity of the electronic flashing unit is initially set to a weak level, and when the ratio of the area of the face occupying a screen of the image pickup unit to the area of the screen is less than the predetermined value, the electronic flash light quantity of the electronic flashing unit is not initially set to the weak level.

* * * * *